(12) United States Patent
Neo et al.

(10) Patent No.: US 8,681,591 B2
(45) Date of Patent: Mar. 25, 2014

(54) SEMICONDUCTOR DEVICE, WRITE STRATEGY GENERATING METHOD, AND WRITE STRATEGY GENERATING PROGRAM

(75) Inventors: Atsushi Neo, Chiyoda-ku (JP); Yasuo Mutsuro, Chiyoda-ku (JP); Masakazu Ikeda, Chiyoda-ku (JP); Junichi Tanjima, Kawasaki (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 184 days.

(21) Appl. No.: 13/410,052

(22) Filed: Mar. 1, 2012

(65) Prior Publication Data
US 2012/0224466 A1 Sep. 6, 2012

(30) Foreign Application Priority Data
Mar. 4, 2011 (JP) ................................. 2011-047235

(51) Int. Cl.
*G11B 7/0045* (2006.01)
(52) U.S. Cl.
USPC ...................................... 369/59.11; 369/59.2
(58) Field of Classification Search
USPC ............ 369/44.27, 47.53, 53.2, 53.22, 59.11, 369/59.2, 100, 116
See application file for complete search history.

(56) References Cited

U.S. PATENT DOCUMENTS

| 7,139,230 B2 | 11/2006 | Shirota et al. | |
| 7,916,601 B2* | 3/2011 | Kim et al. | 369/59.11 |
| 2007/0047415 A1* | 3/2007 | Chang | 369/59.11 |
| 2008/0013431 A1* | 1/2008 | Yu et al. | 369/59.11 |
| 2008/0025179 A1* | 1/2008 | Fujita et al. | 369/59.11 |
| 2009/0316561 A1* | 12/2009 | Nishimura et al. | 369/112.01 |

FOREIGN PATENT DOCUMENTS

| JP | 2000-030254 | 1/2000 |
| JP | 2005-022841 | 1/2005 |
| JP | 2007-287229 | 11/2007 |
| JP | 2010-282695 | 12/2010 |

* cited by examiner

*Primary Examiner* — Brenda Bernardi
(74) *Attorney, Agent, or Firm* — Womble Carlyle

(57) ABSTRACT

A semiconductor device mounted in an optical disk apparatus controls writing and reading of data in and from an optical disk. The device performs first processing for adjusting a write strategy in such a manner that based on error information corresponding to a shift in the phase of a reproduction signal with respect to a channel clock signal for data reproduction, which is generated based on the reproduction signal read from the optical disk, the value of the error information related to a plurality of recording marks to be evaluated becomes minimum as a whole. The device also performs second processing for adjusting a write strategy in such a manner that the value of the error information related to a desired recording mark becomes small.

20 Claims, 25 Drawing Sheets

FIG. 7

| BEFORE FINE ADJUSTMENT I | | | | | AFTER FINE ADJUSTMENT I | | | | |
|---|---|---|---|---|---|---|---|---|---|
| SHIFT VALUES OF FORWARD MARK/ REARWARD SPACE [%] | | | | | SHIFT VALUES OF FORWARD MARK/ REARWARD SPACE [%] | | | | |
| FORWARD \ REARWARD | MARK [T] | | | | FORWARD \ REARWARD | SPACE [T] | | | |
| SPACE [T] | 3 | 4 | 5 | 6 | MARK [T] | 3 | 4 | 5 | 6 |
| 3 | −4.52 | 7.08 | 4.27 | 9.04 | 3 | −5.40 | 2.03 | 1.27 | 4.04 |
| 4 | 0.67 | −8.10 | −1.89 | 4.81 | 4 | 1.28 | 3.12 | 2.31 | 3.23 |
| 5 | −3.28 | −14.74 | −4.83 | 1.05 | 5 | 6.25 | 5.35 | 6.20 | 0.54 |
| 6 | −3.36 | −10.68 | (31.46) | −5.01 | 6 | 5.23 | −4.50 | (24.65) | 1.23 |
| JITTER OF FORWARD MARK/ REARWARD SPACE [%] | | | | | JITTER OF FORWARD MARK/ REARWARD SPACE | | | | |
| FORWARD \ REARWARD | MARK [T] | | | | FORWARD \ REARWARD | SPACE [T] | | | |
| SPACE [T] | 3 | 4 | 5 | 6 | MARK [T] | 3 | 4 | 5 | 6 |
| 3 | 13.06 | 10.66 | 11.15 | 15.27 | 3 | 12.06 | 8.66 | 9.15 | 10.24 |
| 4 | 11.47 | 10.03 | 9.74 | 11.12 | 4 | 10.47 | 9.55 | 9.96 | 10.12 |
| 5 | 10.17 | 15.31 | 8.90 | 8.70 | 5 | 10.17 | 9.31 | 9.10 | 8.89 |
| 6 | 11.59 | 12.24 | (31.46) | 10.22 | 6 | 10.69 | 9.89 | (25.65) | 9.21 |
| ENTIRE SHIFT VALUE OF FORWARD MARK/ REARWARD SPACE | | | 0.59 [%] | | ENTIRE SHIFT VALUE OF FORWARD MARK/ REARWARD SPACE | | | 2.36 [%] | |
| ENTIRE JITTER OF FORWARD SPACE/ REARWARD MARK | | | 13.33 [%] | | ENTIRE JITTER OF FORWARD SPACE/ REARWARD MARK | | | 11.15 [%] | |

US 8,681,591 B2

SEMICONDUCTOR DEVICE, WRITE STRATEGY GENERATING METHOD, AND WRITE STRATEGY GENERATING PROGRAM

CROSS-REFERENCE TO RELATED APPLICATIONS

The disclosure of Japanese Patent Application No. 2011-47235 filed on Mar. 4, 2011 including the specification, drawings and abstract is incorporated herein by reference in its entirety.

BACKGROUND

The present invention relates to a semiconductor device, a write strategy generating method, and a write strategy generating program, and particularly to a technology effective when applied to a semiconductor device mounted in an optical disk apparatus and for controlling writing of data in an optical disk.

In a writable or rewritable optical disk such as DVD-R (DVD-Recordable), DVD-RW (DVD-Re-Writable) or the like, laser light is applied onto a recording surface of the disk, so that a thermal change occurs in an optical storage medium to record information therein. As a method of controlling laser light for recording information in the optical disk, there is known, for example, a method of modulating laser light by a recording pulse having a time width corresponding to information to be recorded, thereby forming a recording mark having a length corresponding to the information to be recorded, on its corresponding optical disk.

On the other hand, there is also known a method of controlling laser power for forming a recording mark by a pulse train including a plurality of short pulses (multipulses) and not forming just one recording mark for recording information in the optical disk by one laser pulse as in the above method. This method is referred to as "write strategy". According to this method, thermal accumulation on a recording surface of the optical disk is reduced as compared with a method of applying a single recording pulse. Therefore, a temperature distribution on a recording surface with a recording mark formed thereon can be made uniform, so that the recording mark is prevented from being brought into a tear-shaped form. It is thus possible to form a recording mark having a preferred shape. In the multipulse-based write strategy, however, no problem arises at recording at a normal speed, but the amplitude of a pulse changes due to overshoot and undershoot at high-speed recording, thus causing a fear that the amount of heat of the optical disk may not be controlled accurately, and a recording mark having a suitable shape may not be formed.

As a method of solving this problem, there is known a write strategy of a system using a recording pulse including a top pulse for preheating the recording surface of the optical disk, an intermediate bias part at which a time width changes according to the length of a mark to be recorded, and a last pulse for adjusting the shape of a read end portion of the recording mark (e.g., Patent Document 1).

As a write strategy of another system, there is also known a write strategy in which the positions of a top pulse and a last pulse and their pulse widths are changed according to space lengths lying immediately before and after a mark to be recorded, in consideration of thermal interference at recording and optical interference at reproduction due to changes in space length before and after the recording mark. In addition to the above, there is also known a castle-type write strategy using a recording pulse configured as a unique shape including a top pulse, an intermediate bias part and a last pulse.

As described above, the optical disk apparatus generates a recording pulse of the optimum recording power at at least one predetermined write strategy and controls laser light by the recording pulse to thereby record information in the optical disk. Variations however occur in the optimum recording pulse timing position of the recording pulse and the like due to variations in performance of the optical disk apparatus itself, variations in optical disk, etc. When a recording pulse timing position and the like of a write strategy relative to the mounted optical disk are not appropriate, a mark length of a recording mark recorded in the optical disk and its edge position become inappropriate, so that the quality of reproduction such as jitter characteristics, an error rate or the like is degraded. As a related art for optimization of a write strategy, which is used for solving such a problem, there are known those disclosed in, for example, Patent Documents 2, 3, 4 and 5.

RELATED ART DOCUMENTS

Patent Documents

[Patent Document 1] Japanese Patent Laid-Open No. 2003-85753
[Patent Document 2] Japanese Patent Laid-Open No. 2005-228418
[Patent Document 3] Japanese Patent Laid-Open No. 2007-287229
[Patent Document 4] Japanese Patent Laid-Open No. 2000-30254
[Patent Document 5] Japanese Patent Laid-Open No. 2010-282695

Prior to the present invention, the present inventors have been involved in the study and development of signal processing large scale integrated circuits (LSI) each mounted in a multidrive-type optical disk apparatus capable of recording onto optical disks based on a plurality of standards, such as a CD (Compact Disc), a DVD (Digital Versatile Disc), a BD (Blue-ray Disc (registered trademark and the same shall apply hereinafter), etc. At the beginning of this study/development, the present inventors have studied the arts described in the Patent Documents 2 through 5.

In the art described in the Patent Document 2, a plurality of different recording strategies per disk manufacturer ID are stored in advance in a memory means. One of the recording strategies corresponding to the disk manufacturer ID of the mounted optical disk is read from the memory means, and a recording test based on the read write strategy is performed. It is then determined from the result of the recording test whether recording power is appropriate. The corresponding write strategy is set based on the result of its determination. When the recording power is determined to be proper at this time, the corresponding recording strategy is set as for recording. On the other hand, when the recording power is not appropriate, another write strategy is read from the memory means again and its recording test is performed. It is determined from the result of the recording test whether the recording power is proper, whereby the corresponding write strategy capable of obtaining the suitable recording power is searched. That is, the method described in the Patent Document 2 needs to store the different recording strategies per disk manufacturer ID in the memory means. Since the used storage portion of the memory means increases with an increase in the number of disk manufacturers, there is a possibility that the capacity of a non-volatile memory mounted in the optical disk apparatus will run short.

In the art described in the Patent Document 3, a system controller performs trial writing of test data in accordance with various recording strategies using a test area of an optical disk and evaluates the quality of a reproduction signal for the test data to thereby select the optimum write strategy. The system controller calculates an evaluation value Hst in accordance with a relational expression of $Hst=A \cdot Eb^2 + B \cdot We^2 + C \cdot (Peb-Pmb)^2$ and sets a recording strategy capable of obtaining the minimum Hst as the optimum write strategy. Here, Eb indicates the minimum error rate value for each write strategy, We indicates a recording power range in which a threshold error rate is obtained, Pmb indicates recording power at which a target beta ($\beta$) value is obtained, and Peb indicates recording power at which the minimum error rate is obtained. That is, the method described in the Patent Document 3 needs to perform trial writing in accordance with various recording strategies and thereafter evaluate the quality of the reproduction signal at each write strategy and calculate the size of the recording power range. Thus, in order to adjust the optimum write strategy, there is need to prepare as many recording strategies as possible and perform the reproduction signal quality evaluation and the calculation of the power range on all the recording strategies. There is therefore a high possibility that the time for its adjustment will be prolonged.

In the art described in the Patent Document 4, the corresponding write strategy is selected in such a manner that recording power at which a jitter of the shortest recording mark high in record frequency becomes minimum, and recording power at which a shift from a theoretical value of the longest recording mark most pronounced in terms of tear-shaped record marking (asymmetrization) becomes minimum, become approximately equal to each other. That is, the method described in the Patent Document 4 adjusts the write strategy by paying attention to the shortest recording mark and the longest recording mark to thereby adjust each jitter to be low as a whole. However, this method particularly does not taken into consideration recording marks of other lengths, which exist between the shortest and longest lengths, and causes a fear that jitter may become large at recording marks other than the shortest and longest recording marks.

In the art described in the Patent Document 5, the corresponding write strategy is adjusted in such a manner that the average jitter of the whole of a plurality of recording marks to be evaluated becomes minimum. That is, in the method described in the Patent Document 5, the average jitter of the whole of the recording marks becomes small, but a jitter's decision is not individually performed on the respective recording marks. There is therefore a fear that the recording marks large in jitter will remain without any adjustment.

As another matter of concern, may be mentioned, adaptation to a multilayer optical disk. With a great increase in the capacity of an optical disk, the study of a multilayer optical disk in which recording layers per optical disk are further increased, has been actively performed in recent years as in the case of a two-layer DVD, for example. Since the multilayer optical disk has a structure in which a signal at an inward layer is reproduced through a forward layer, reflectivity at each recording layer is reduced as compared with an optical disk having only one recording layer. Since it is difficult to make uniform the thickness of each recording layer, there is a fear that the reproduction quality will be degraded as the recording layers increase. In order to prevent degradation of the reproduction quality due to such an increase in the recording layer, recording marks better in quality than the optical disk of one layer are required to be formed in the respective recording layers. To this end, a write strategy capable of recording higher in quality is required. Thus, in order to adjust recording strategies for acquiring recording quality sufficient for a multilayer optical disk having a plurality of recording layers, a new technology is expected to come out as an alternative to the related art.

SUMMARY

An object of the present invention is to efficiently generate a write strategy capable of recording higher in quality.

The above and other objects and novel features of the present invention will be apparent from the description of the present specification and the accompanying drawings.

A summary of a typical one of the invention disclosed in the present application will be briefly described as follows:

A semiconductor mounted in an optical disk apparatus and for controlling writing and reading of data in and from an optical disk performs first processing for adjusting a write strategy in such a manner that based on error information corresponding to a shift in the phase of a reproduction signal with respect to a channel clock signal for data reproduction, which is generated based on the reproduction signal read from the optical disk, the value of the error information related to a plurality of recording marks to be evaluated becomes minimum as a whole, and second processing for adjusting a write strategy in such a manner that the value of the error information related to a desired recording mark becomes small.

An advantageous effect obtained by a typical one of the invention disclosed in the present application will briefly be explained as follows:

According to the present semiconductor device, a write strategy can efficiently be generated which is capable of recording higher in quality.

BRIEF DESCRIPTION OF THE DRAWINGS

FIG. 7 is an explanatory diagram illustrating one example of evaluation results of recording quality prior to and subsequent to processing related to a fine adjustment I;

DETAILED DESCRIPTION

1. Summary of the Embodiments

Figure 1:
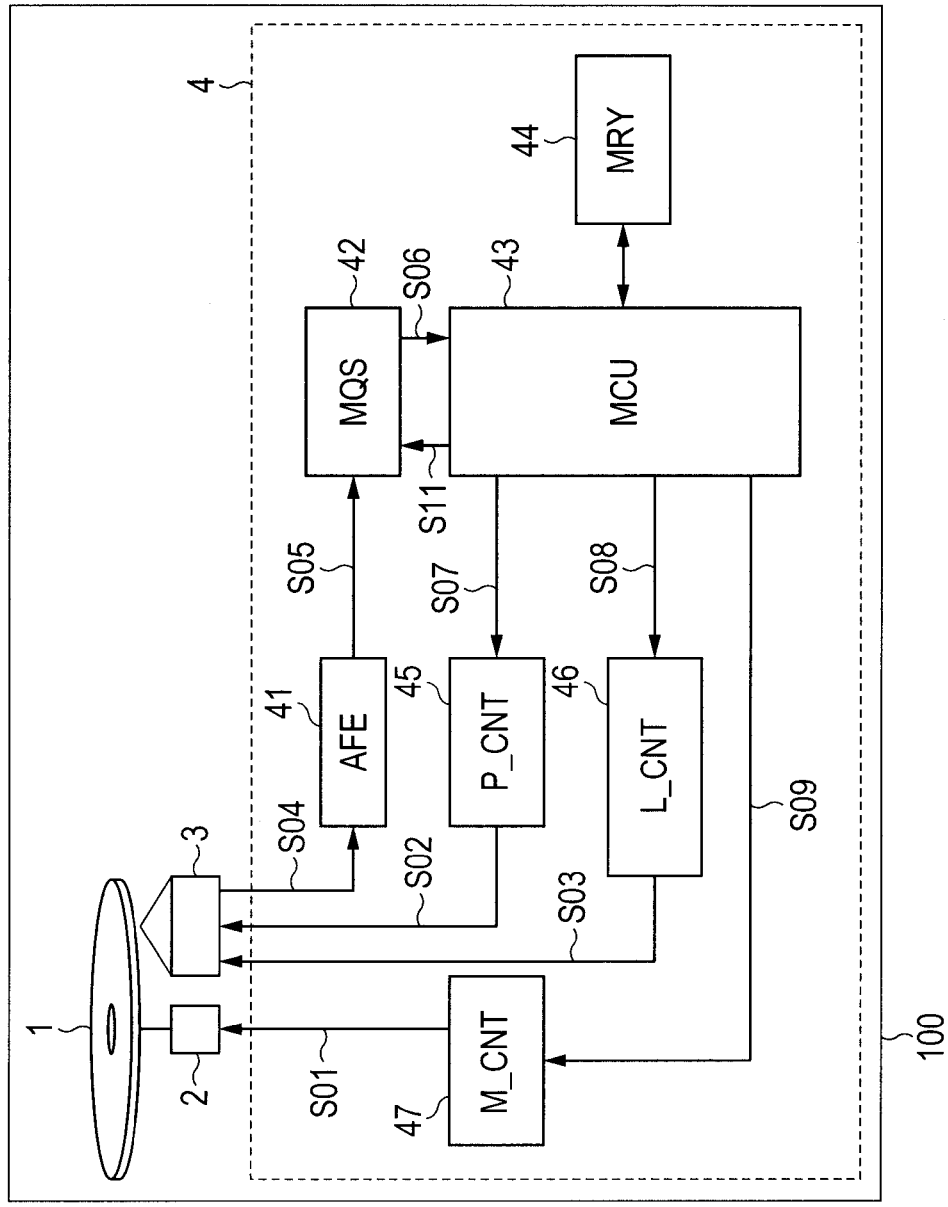
FIG. 1 is a block diagram showing one example of a configuration of an optical disk apparatus according to a first embodiment.

A summary of typical embodiments of the invention disclosed in the present application will first be explained. Reference numerals of the accompanying drawings referred to with parentheses in the description of the summary of the typical embodiments only illustrate elements included in the concept of components to which the reference numerals are given.

[1] (Overall Adjustment+Individual Adjustments)

A semiconductor device according to a typical embodiment of the present invention is a semiconductor device (4) which is mounted in an optical disk apparatus (100) and performs control on writing and reading of data in and from an optical disk (1). The semiconductor device has a data processing control unit (43) which executes data processing for the control, and a measurement unit (42) which generates evaluation information (S06) for evaluating recording quality related to the writing into the optical disk, based on a reproduction signal (S04) read from the optical disk. The evaluation information includes error information corresponding to a shift in the phase of the reproduction signal with respect to a channel clock signal (301) for data reproduction. The data processing control unit performs first processing (F01, F03) for adjusting recording strategies in such a manner that the value of the error information related to a plurality of recording marks to be evaluated becomes minimum as a whole, and second processing (F04) for adjusting a write strategy in such a manner that the value of the error information related to a desired recording mark becomes small.

According to this, the recording strategies are adjusted in such a manner that the value of the error information related to the entire recording mark is reduced and the value of the error information related to each individual recording mark becomes small. It is therefore possible to generate a write strategy capable of recording higher in quality. Since a long mark low in the rate of appearance of a recording mark at the recording of the optical disk exerts a small influence on the entire recording quality, the value of the error information of the long mark is not necessarily limited to the minimum only in the case of the first processing adjusted in such a manner that the value of the error information becomes small. Thus, if the second processing is performed in addition to the first processing to thereby adjust the write strategy such that the value of the error information related to a long mark, for example, becomes small, then a write strategy can be generated in which the value of the error information is small and the value of the error information is small even with respect to each individual recording mark.

[2] (Fine Adjustment II . . . Recording Marks Each Having Shift Value Greater Than or Equal to Predetermined Threshold Value)

In the semiconductor device described in the paragraph 1, the desired recording mark is a recording mark (J0511, J0512) at which the value of the error information is greater than or equal to the predetermined threshold value, of the recording marks (M0511, M0512) recorded by the recording strategies adjusted by the first processing.

The second processing performs the adjustment by paying attention to the recording mark low in recording quality, of the recording marks recorded in accordance with the recording strategies adjusted by the first processing without paying attention to all recording marks. It is therefore possible to more efficiently generate each write strategy capable of recording high in quality.

[3] (Fine Adjustment II . . . Adjustment to Front-End Edge Shift Amount or Rear-End Edge Shift Amount)

In the semiconductor device described in the paragraph 1 or 2, the adjustment to the write strategy by the second processing is an adjustment to a parameter (Tld, Ttr2) for shifting each edge of the desired recording mark at each of the recording strategies adjusted by the first processing.

According to this, a parameter for shifting each edge of a recording mark, of a plurality of parameters defining a laser pulse waveform at a write strategy is adjusted. It is therefore possible to efficiently adjust a shift in the phase of a reproduction signal related to the desired recording mark.

[4] (Fine Adjustment II . . . Concrete Adjustment Method)

In the semiconductor described in the paragraph 3, the error information includes a phase shift value (M0101, M0201, M0501, M0511) indicative of an amount of a shift in the edge of the reproduction signal and a shift direction thereof. The second processing is processing for changing the parameter in such a manner that the edge of the desired recording mark is shifted in the direction opposite to the shift direction thereof according to the amount of the shift in the edge and thereby reducing the phase shift value.

According to this, the shift in the phase of the reproduction signal related to the desired recording mark can be reduced.

[5] (Lt Adjustment . . . Adjustment to the Width of Last Pulse)

In the semiconductor device described in any of the paragraphs 1 through 4, the data processing control unit further performs third processing (F06) for adjusting a parameter (Lt) defining a pulse width of an unadjusted last pulse at the write strategy adjusted by the second processing, in such a manner that the value of the error information related to a recording mark (302) formed by a laser pulse including a last pulse located at an end of a laser pulse waveform (303, 304) becomes small.

According to this, the shift amount of the edge related to the desired recording mark is adjusted by the second processing, and further the last pulse width of the specific recording mark formed by the laser pulse waveform including the last pulse is adjusted. It is therefore possible to generate a write strategy capable of recording higher in quality.

[6] (Fine Adjustment II . . . Made Again After Lt Adjustment)

In the semiconductor device described in the paragraph 5, the data processing control unit performs again the second processing (F07) on a write strategy adjusted by the third processing.

For example, when a parameter for shifting a rear-end edge is adjusted in the second processing as well as a parameter for shifting a front-end edge of a recording mark, the rear-end edge of the recording mark may be shifted from the optimum value by the adjustment of a parameter defining a pulse width of a last pulse in the third processing. Therefore, the second processing is performed again after the third processing, thereby making it possible to generate a write strategy capable of recording higher in quality.

[7] (Coarse Adjustment)

In the semiconductor device described in any of the paragraphs 1 through 6, the error information includes a jitter (M0102, M0202, M0502, M0512) of a reproduction signal. The first processing includes fourth processing (F01) for generating a plurality of recording strategies at which parameters (Pw) for defining laser power, based on initial recording strategies are changed, and selecting a write strategy at which jitters related to a plurality of recording marks to be evaluated of recording marks based on the generated recording strategies become minimum as a whole.

According to this, the optimum laser power can be found efficiently as the entire recording mark.

[8] (Fine Adjustment I)

In the semiconductor device described in the paragraph 7, the first processing includes fifth processing (F03) for generating a plurality of recording strategies at which parameters for shifting the edges of the recording marks are changed, based on the write strategy selected by the fourth processing, and selecting a write strategy at which jitters related to a plurality of recording marks to be evaluated of recording marks based on the generated recording strategies become minimum as a whole.

According to this, it is possible to efficiently find out the optimum shift amount of edge as the entire recording mark.

[9] (Target β Adjustment of Jitter Index)

In the semiconductor device described in any of the paragraphs 3 through 8, the evaluation information includes a beta value of the reproduction signal. The data processing control unit further performs sixth processing (F08, F081101, F081102) for calculating a degree of allowance (BJ02) indicative of a range of a beta value capable of taking on a jitter that becomes not greater than a jitter set as a target of recording quality, based on a reproduction signal of data recorded by a write strategy at which a parameter for shifting each of the edges is adjusted and a parameter for defining laser power is changed, and determining a parameter (target beta) for defining laser power according to the degree of the allowance.

For example, when the pulse width of the laser pulse waveform is adjusted by the second processing or the third processing after the laser power has been set by the first processing, the laser power may be shifted from the optimum value. Therefore, after the second processing or the third processing, the laser power is determined according to the degree of allowance of beta for the jitter index, thereby making it possible to generate a write strategy capable of recording higher in quality.

[10] (Target β Adjustment of PI Error Index)

In the semiconductor device described in the paragraph 9, the evaluation information includes a PI error of the reproduction signal. The data processing control unit further performs seventh processing (F08, F081103 through F081107) for calculating a degree of allowance (BP02) indicative of a range of a beta value capable of taking on an PI error that becomes not greater than an PI error set as a target of recording quality, based on a reproduction signal of data recorded by a write strategy at which a parameter for shifting each of the edges is adjusted and a parameter for defining laser power is changed, and determining a parameter (target beta) for defining laser power according to the degree of the allowance.

According to this, the laser power is determined according to the degree of allowance of beta for the PI error index in addition to the degree of allowance of beta for the jitter index, thereby making it possible to generate a write strategy capable of recording higher in quality, which has taken the PI error into consideration.

[11] (Write Strategy Generating Method . . . Overall Adjustment+Individual Adjustments)

A write strategy generating method according to a typical embodiment of the present invention is a write strategy generating method of inputting evaluation information (S06) for evaluating recording quality related to writing into an optical disk to thereby generate a write strategy. The evaluation information includes error information which is generated according to a reproduction signal read from the optical disk and corresponds to a shift in the phase of the reproduction signal with respect to a channel clock signal for data reproduction. The write strategy generating method includes first processing (F01, F03, FIG. 22, FIG. 23) for selecting a write strategy at which the value of the error information related to each of a plurality of recording marks to be evaluated, of the input error information related to recording marks recorded in accordance with a plurality of recording strategies, becomes minimum as a whole, out of the recording strategies, and second processing (F04, FIG. 24) for generating a write strategy at which the parameter for the write strategy selected by the first processing is adjusted in such a manner that the value of the error information related to a desired recording mark, of the input error information becomes small.

According to this, in a manner similar to the paragraph 1, each write strategy is adjusted in such a manner that the value of the error information related to the entire recording mark is made small and the value of the error information related to each individual recording mark is made small, thereby making it possible to generate a write strategy capable of recording higher in quality. Since the write strategy is generated based on each write strategy selected by the first processing in the second processing, it is possible to generate a write strategy more efficiently.

[12] (Fine Adjustment II . . . Recording Mark Having Shift Value Greater Than or Equal to Predetermined Threshold Value)

In the write strategy generating method described in the paragraph 11, the desired recording mark is a recording mark (J0511, J0512) (See FIG. 7), at which the value of the error information is greater than or equal to a predetermined threshold value, of the recording marks (M0511, M0512) recorded in accordance with the write strategy selected by the first processing.

The second processing performs the adjustment by paying attention to the recording mark low in recording quality, of the recording marks recorded in accordance with the recording strategies adjusted by the first processing without paying attention to all recording marks. It is therefore possible to more efficiently generate each write strategy capable of recording high in quality.

[13] (Fine Adjustment II . . . Adjustment to Front-End Edge Shift Amount or Rear-End Edge Shift Amount)

In the write strategy generating method described in the paragraph 11 or 12, the adjustment to the parameter by the second processing is an adjustment to a parameter (Tld, Tr2) (See FIG. 5) for shifting an edge of the desired recording mark.

According to this, it is possible to efficiently adjust the shift in the phase of the reproduction signal related to the desired recording mark.

[14] (Fine Adjustment II . . . Concrete Adjustment Method)

In the write strategy generating method described in the paragraph 13, the error information includes a phase shift value (M0101, M0201, M0501, M0511) (See FIGS. 3 and 7) indicative of an amount of a shift in the edge of the reproduction signal and a shift direction thereof. The second processing is processing for changing a parameter for making the phase shift value small by shifting the edge of the desired recording mark in such a manner that the edge of the desired recording mark is shifted in the direction opposite to the shift direction according to the amount of the shift in the edge.

According to this, the shift in the phase of the reproduction signal related to the desired recording mark can easily be reduced.

[15] (Lt Adjustment . . . Adjustment to Width of Last Pulse)

The write strategy generating method described in any of the paragraphs 11 through 14 further includes third processing (F06, FIG. 25) (See also FIG. 6) for adjusting a parameter (Lt) defining a pulse width of an unadjusted last pulse at the write strategy adjusted by the second processing, in such a manner that the value of the error information related to a recording mark formed by a laser pulse including a last pulse located at an end of a laser pulse waveform (303, 304) becomes small.

According to this, a write strategy capable of recording higher in quality can be generated in a manner similar to the paragraph 5.

[16] (Fine Adjustment II Made Again After Lt Adjustment)

The write strategy generating method described in the paragraph 15 includes fourth processing (F07) for adjusting the parameter in such a manner that the value of error information related to a recording mark, at which the value of the error information is greater than or equal to a predetermined threshold value, of recording marks recorded by the write strategy adjusted by the third processing becomes small.

According to this, the second processing is performed again after the third processing in a manner similar to the paragraph 6, thereby making it possible to generate a write strategy capable of recording higher in quality.

[17] (Coarse Adjustment+Fine Adjustment I)

In the recording strategy generating method described in any of the paragraphs 11 through 16, the error information includes a jitter of a reproduction signal. The first processing includes fifth processing (F01, FIG. 22) for selecting a write strategy at which jitters related to edges of a plurality of recording marks to be evaluated of recording marks recorded in accordance with a plurality of recording strategies generated with being subjected to changes in parameters each defining laser power at each initial write strategy, become minimum as a whole, out of the recording strategies. The first processing includes sixth processing (F03, F23) for selecting a write strategy at which jitters related to a plurality of recording marks to be evaluated of recording marks recorded in accordance with a plurality of recording strategies at which parameters for shifting the edges of the recording marks at the write strategy selected by the fifth processing are changed and generated, become minimum as a whole, out of the recording strategies.

According to this, the optimum laser power and the optimum shift amount of edge can efficiently be found out as the entire recording mark.

[18] (Target Beta Adjustment of Jitter Index)

In the write strategy generating method described in any of the paragraphs 13 through 17, the evaluation information includes a beta value of the reproduction signal and further includes seventh processing (F08, FIG. 26) for calculating a degree of allowance indicative of a range of a beta value capable of taking on a jitter that becomes not greater than a jitter set as a target of recording quality, based on the reproduction signal of data recorded by a write strategy at which a parameter for shifting each of the edges is adjusted and a parameter for defining laser power is changed, and determining a parameter (target beta) for defining laser power according to the degree of the allowance.

According to this, the laser power is adjusted according to the degree of allowance of beta for a jitter index after the second processing or the third processing in a manner similar to the paragraph 9, thereby making it possible to generate a write strategy capable of recording higher in quality.

[19] (Write Strategy Generating Program . . . Overall Adjustment+Individual Adjustments)

A write strategy generating program according to a typical embodiment of the present invention includes one or more portions of program code executed by a computer device (5, 43). The write strategy generating program is a write strategy generating program for generating a new write strategy, based on evaluation information (S06) for evaluating recording quality, generated according to a reproduction signal (S04) read from an optical disk (1). The evaluation information includes error information corresponding to a shift in the phase of the reproduction signal with respect to a channel clock signal (301) for data reproduction. The write strategy generating program includes program code, including control data for controlling first processing (F01, F03) for adjusting parameters defining a laser pulse waveform for writing at a write strategy, in such a manner that the value of the error information related to a plurality of recording marks to be evaluated becomes minimum as a whole, and second processing (F04) for adjusting the parameters in such a manner that the value of the error information related to a desired recording mark becomes small.

According to this, in a manner similar to the paragraph 1, each write strategy is adjusted in such a manner that the value of the error information related to the entire recording mark is made small and the value of the error information related to each individual recording mark is made small, thereby making it possible to generate a write strategy capable of recording higher in quality.

[20] (Fine Adjustment II . . . Adjustment to Edge Shift Amount of Recording Mark Having Shift Value Greater Than or Equal to Predetermined Threshold Value)

In the write strategy generating program described in the paragraph 19, the adjustment to each write strategy by the second processing is an adjustment to a parameter for shifting the edge (J0511, J0512) (See FIG. 7) of a recording mark at which the value of the error information is greater than or equal to a predetermined threshold value, of the recording marks (M0511, M0512) (See FIG. 7) recorded by the recording strategies adjusted by the first processing.

According to this, a write strategy capable of recording high in quality can be generated more efficiently in a manner similar to the paragraph 2.

2. Further Detailed Description of the Embodiments

Embodiments will next be explained in further detail. First Embodiment (1) Configuration of Optical Disk Apparatus FIG. 1 is a block diagram showing one example of a configuration of an optical disk apparatus according to a first embodiment.

The optical disk apparatus 100 shown in the same drawing performs writing and reading of data to and from an optical disk 1. The optical disk 1 capable of recording/reproduction by the optical disk apparatus 100 is not limited in particular, but is an optical disk such as a CD, a DVD, a BD or the like. The writing of the data into the optical disk 1 is performed by control of a laser pulse corresponding to a write strategy. In order to enhance recording quality of the optical disk 1, the optical disk apparatus 100 adjusts a standard initial strategy stored in advance in the optical disk apparatus 100 before writing of data, for example to thereby generate a write strategy suitable for the optical disk 1 target for writing. A method of adjusting the write strategy will be described in detail later.

The optical disk apparatus 100 shown in FIG. 1 is equipped with a spindle motor 2 which rotatably drives the detachable optical disk 1, an optical pickup 3 and a signal processing large scale integration (hereinafter called "signal processing LSI (Large Scale Integration)") 4 which executes signal processing.

The spindle motor 2 is rotatably controlled by a motor control signal S01 outputted from the signal processing LSI 4 to thereby rotate the optical disk 1 at a predetermined number of revolutions.

The optical pickup 3 is position-controlled by a position control signal SO2 outputted from the signal processing LSI 4 so that the optical pickup 3 is moved in the radial direction of the optical disk 1 to shift to a predetermined recording/reproduction position. A semiconductor laser of the optical pickup 3 is controlled by a laser pulse control signal S03 outputted from the signal processing LSI 4, so that a laser pulse is applied onto the surface of the optical disk 1 for the purpose of recording or reproduction. Upon reproduction of the optical disk 1, the laser pulse applied from the semiconductor laser of the optical pickup 3 is reflected by the surface of the optical disk 1, and the reflected light is received by a light-receiving part of the optical pickup 3. The light-receiving part converts the reflected light to an electric signal S04 and outputs the same to the signal processing LSI 4.

The signal processing LSI 4 is equipped with an analog front end (AFE) 41, a signal quality measuring circuit (MQS) 42, a microcontroller (MCU) 43, a memory (MRY) 44, a position control circuit (P_CNT) 45, a laser pulse control circuit (L_CNT) 46 and a motor control circuit (M_CNT) 47. The signal processing LSI 4 is not limited in particular but configured in the form of an SIP (System in Package) or an MCM (Multi-chip Module) in which a plurality of semiconductor chips that configure the above functional parts 41 through 47 respectively are provided thereinside.

The AFE 41 executes analog signal processing such as the amplification of the electric signal S04 outputted from the optical pickup 3 to thereby generate an analog signal S05 and outputs it to the signal quality measuring circuit 42.

The signal quality measuring circuit 42 outputs evaluation information for evaluating recording quality of the optical disk to the microcontroller 43 as measurement result information S06, based on the analog signal S05. The measurement result information S06 may include, for example, a beta value, a shift value, a jitter, a PI (Parity Inner) error, etc. The beta value is a value based on the ratio between the maximum amplitude value of the playback analog signal S05 of the optical disk 1 and the minimum amplitude value and is used as, for example, an index used when recording power is defined. The PI error is the number of errors in internal code parity per 1ECC block, for example.

The shift value and the jitter will now be explained along with the operation of the signal quality measuring circuit 42.

Figure 2:
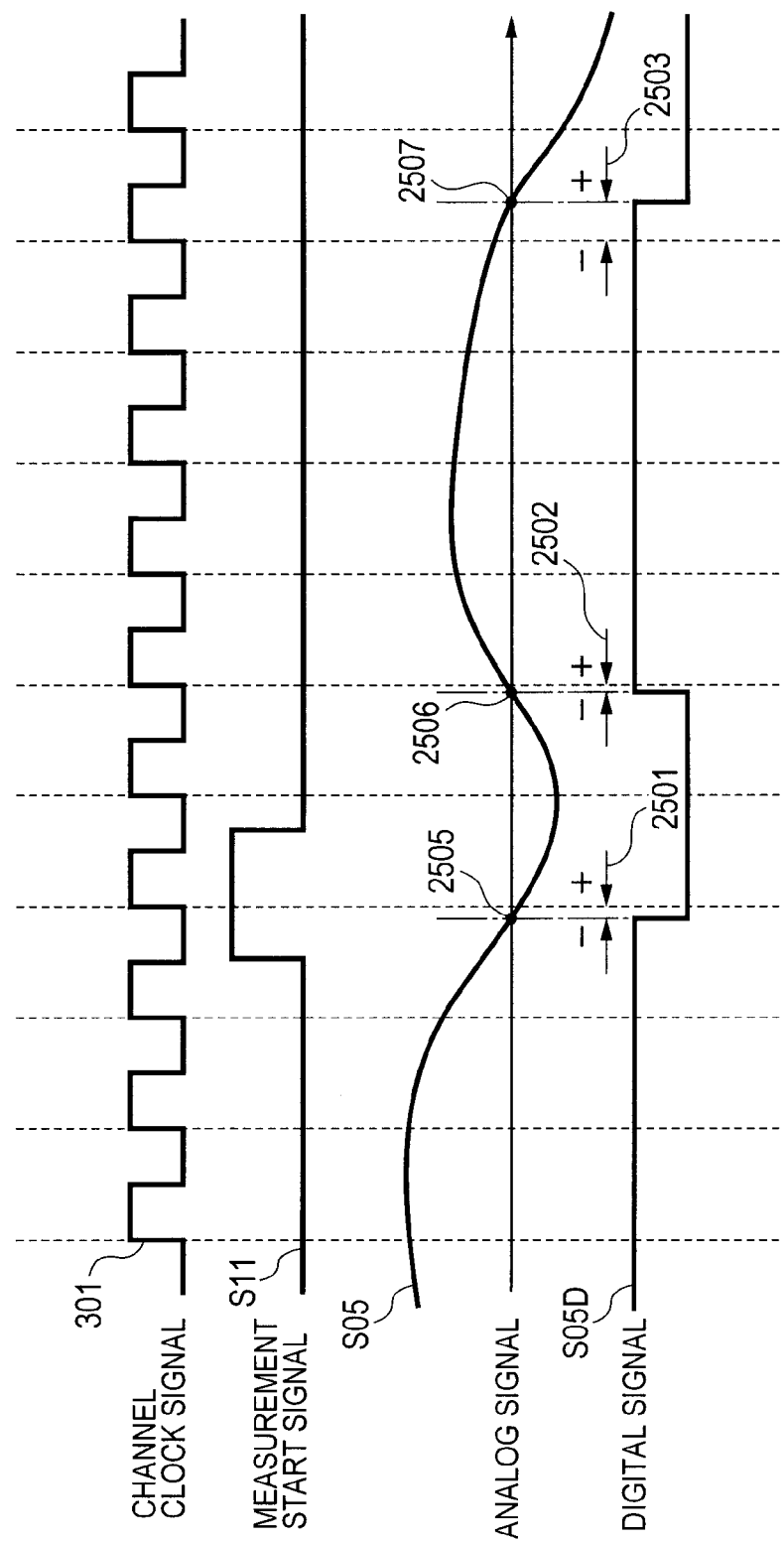
FIG. 2 is a timing chart illustrating one example of operation of a signal quality measuring circuit 42.

FIG. 2 is a timing chart showing one example of the operation of the signal quality measuring circuit 42.

In FIG. 2, a signal designated at reference numeral 301 is a channel clock signal. A signal designated at reference numeral S11 is a measurement start signal for instructing the start of a signal quality measurement. A signal designated at reference numeral S05 is an analog signal outputted from the AFE 41. A signal designated at reference numeral S05D is a signal obtained by converting the analog signal S05 to digital form. Ranges designated at reference numerals 2501 through 2503 are phase errors. Points designated at reference numerals 2505 through 2507 are zero crossing points of the analog signal S05.

When the signal quality measuring circuit 42 receives the measurement start signal S11 from the microcontroller 43, it starts a signal quality measurement. When the signal quality measuring circuit 42 detects a predetermined number of zero crossing points, it ends the signal quality measurement. Signal quality is calculated based on the phase errors 2501 through 2503 indicative of shifts in time-axis direction, of the zero crossing points 2505 through 2507 with respect to the channel clock signal 301. The phase errors 2501 through 2503 are indicated assuming that, for example, the shift in the direction of the time axis is taken as a positive phase error with respect to the channel clock signal 301, and the phase error in the direction opposite to the time axis is taken as a negative phase error. The phase errors 2501 through 2503 are measured by, for example, a method in which the signal quality measuring circuit 42 performs sampling of the analog signal S05 at a clock shorter in cycle (i.e., having higher frequency) than the channel clock signal 301 and measures shifts in time between the zero crossing points at the reference numerals 2505 through 2507 and the channel clock signal as phase errors. As another measuring method, for example, a method may be adopted in which the signal quality measuring circuit 42 performs sampling of the analog signal S05 in accordance with the channel clock signal 301 to thereby calculate zero-crossing times from the result of sampling and determines shifts in time between the zero crossing points and the channel clock signal from the result of calculations, such as by interpolation. The phase error measuring method is not limited to the above methods in particular.

The signal quality measuring circuit 42 generates shift values and jitters, based on the measured phase errors. Each of the shift values is, for example, an integral of a phase error at a front end edge or a rear end edge of a recording mark. The jitter is, for example, an integral of an absolute value of a phase error at the front end edge or rear end edge of a recording mark.

Figure 3:
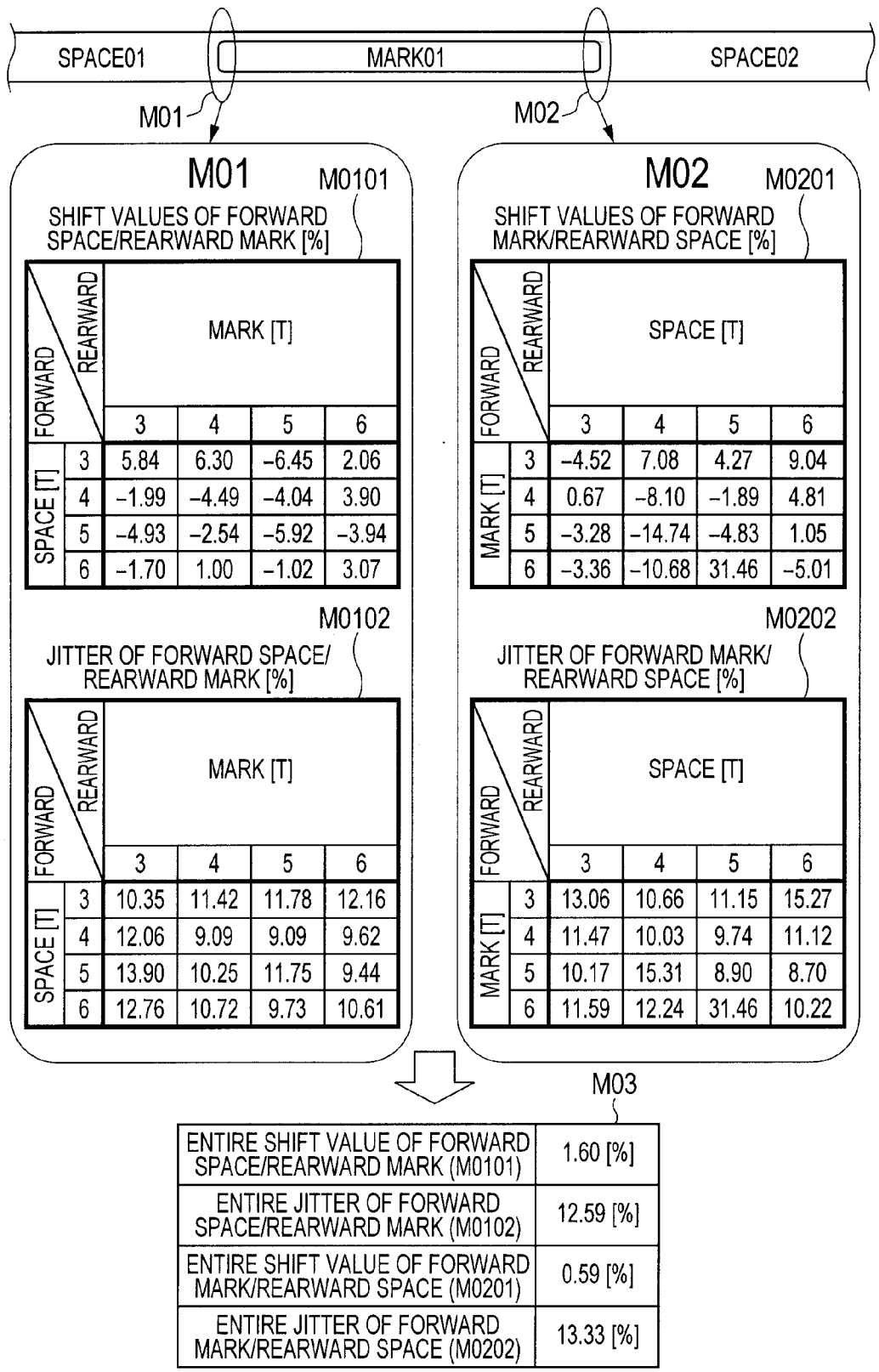
FIG. 3 is an explanatory diagram showing one example illustrative of shift values and jitters.

FIG. 3 shows one example illustrative of shift values and jitters. As shown in the same drawing, zero crossing points correspond to, for example, changeover points M01 and M02 between a recording mark and spaces at a recording surface of the optical disk. Based on the interval between the sampled zero crossing points, a mark length of a recording mark can be determined, and forward and rearward space lengths of the recording mark can be determined. Thus, as designated at reference numerals M0101, M0102, M0201 and M0202, shift values and jitter values can be measured for every combination of mark and space lengths. The signal quality measuring circuit 42 outputs measurement result information S06 including these measures of shift and jitter values to the microcontroller 43. Incidentally, although numerical examples of shift values and jitters are illustrated for every combination of mark and space lengths of 3T through 6T as one example in FIG. 3, the values of the mark and space lengths and their combinations are not limited to the above.

Signal quality is evaluated by, for example, the entire shift values (entire jitters) calculated based on shift values (or jitters) of a recording mark target for evaluation of the signal quality and the rate of appearance in the recording mark. The recording mark target for evaluation of the signal quality is specified by, for example, a combination of a mark length, a forward space length and a rearward space length. That is, each of the edges of the recording mark is set as target for evaluation of the signal quality. As shown in FIG. 3, the edges of the recording marks target for evaluation of the signal quality may be 32 edges specified by the mark lengths of 3T through 6T and the forward and rearward space lengths of 3T through 6T or may be edges specified by all mark lengths of 3T through 14T and all space lengths thereof.

The entire shift values are calculated in parts as in two cases of the forward space/rearward mark (M01) and the forward mark/rearward space (M02) as designated at reference numeral M03 of FIG. 3, for example. The calculated values respectively indicate an average value of shift values corresponding to all combinations of mark and space lengths, for example. Accordingly, the shift values of the mark lengths high in the appearance rate rather exert a large influence on the entire shift value. The shift values of the mark lengths low in the appearance rate rather exert a small influence on the entire shift value. The entire jitter and the jitters are similar to the above.

Figure 4:
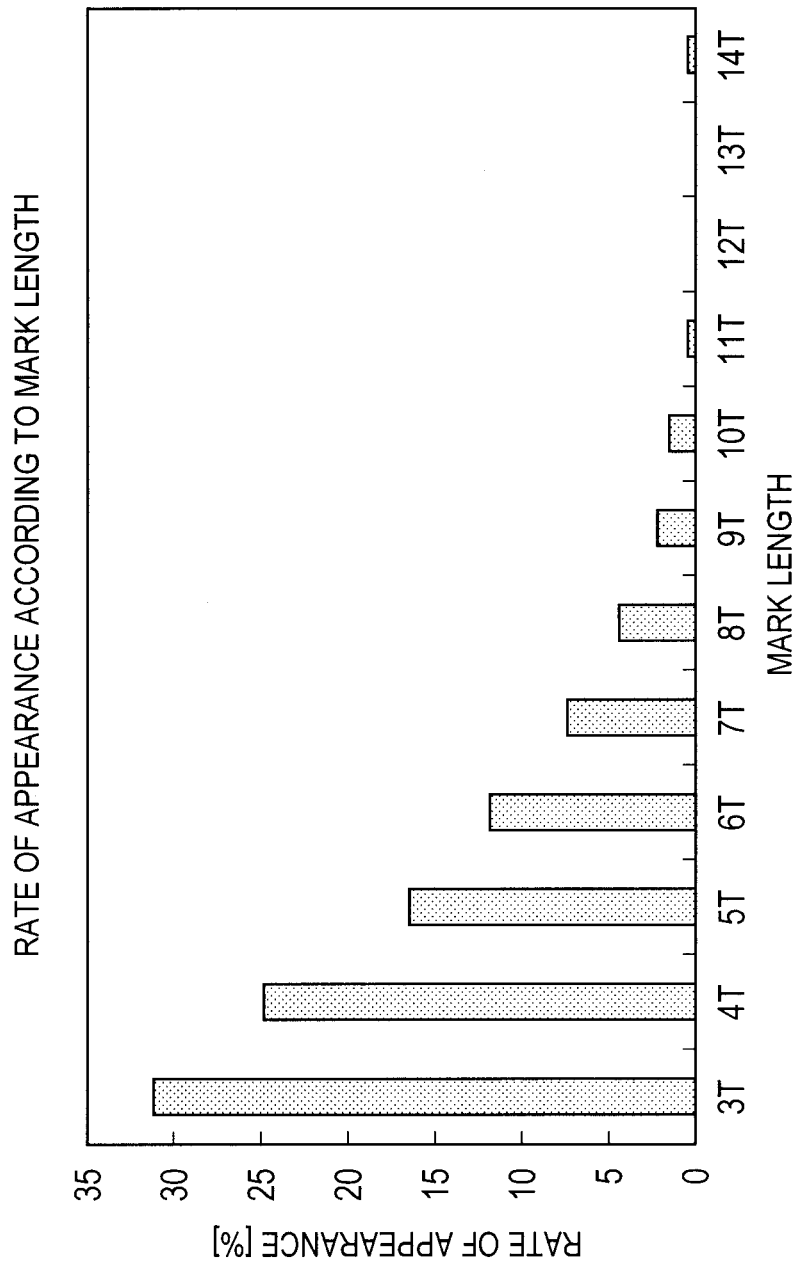
FIG. 4 is an explanatory diagram illustrating one example of the rate of appearance in each recording mark in an optical disk with information recorded therein.

FIG. 4 is an explanatory diagram showing one example of the rate of appearance of each individual recording mark length in the optical disk with information recorded therein.

The same figure shows the rate of appearance where the optical disk is a DVD. As shown in the same figure, there is a tendency that as the mark length becomes short, the rate of appearance in each recording mark recorded in the optical disk becomes high. Thus, the more the shift value of the recording mark short in mark length is applied, the larger the influence exerted on the entire shift value. The more the shift value of the recording mark long in mark length is applied, the smaller the influence exerted on the entire shift value. The entire shift value and shift values are similar to the above.

The microcontroller 43 executes a program comprising program code stored in the memory 44 to thereby perform control for writing and reading of data in and from the optical disk. For example, upon writing of data in the optical disk 1, the microcontroller 43 executes data processing, based on the measurement result information S06 outputted from the signal quality measuring circuit 42 in accordance with the program stored in the memory 44 and performs an adjustment to a write strategy corresponding to the mounted optical disk 1. At this time, the microcontroller 43 outputs a position control signal S07, a laser pulse control signal S08 and a motor control signal S09 to the position control circuit 45, the laser pulse control circuit 46 and the motor control circuit 47 respectively to thereby perform hardware control for writing and reading of the data in and from the optical disk.

The microcontroller 43 executes reading and writing of data from and to the memory 44 appropriately. The memory 44 is equipped with, for example, a volatile memory such as a synchronous dynamic random access memory (SDRAM) or the like, or a non-volatile memory such as a flash memory or the like. The memory 44 stores therein, for example, a standard initial strategy, data about the result of data processing by the microcontroller 43, and a software program comprising program code or the like.

In response to the position control signal S07 outputted from the microcontroller 43, the position control circuit 45 outputs the position control signal S02 so as to cause the optical pickup 3 to move to a recording position or a reproduction or playback position.

In response to the laser pulse control signal S08 outputted from the microcontroller 43, the laser pulse control circuit 46 outputs a laser pulse control signal S03 to the optical pickup 3 in such a manner that its recording is done in a write strategy designated by the microcontroller 43.

In response to the motor control signal S09 outputted from the microcontroller 43, the motor control circuit 47 outputs a motor control signal S01 to the spindle motor 2 to cause the optical disk 1 to rotate at a speed designated by the microcontroller 43.

(2) Summary of Write Strategy Adjustment Method by Optical Disk Apparatus 100

As described above, before the writing of the data in the optical disk 1, the optical disk apparatus 100 adjusts the standard initial strategy to thereby generate a write strategy suitable for the mounted optical disk 1. Upon the adjustment to the write strategy, for example, parameters for defining each laser pulse waveform at the write strategy are adjusted.

A description will now be made of the parameters for designing the laser pulse waveforms at the write strategy.

Figure 5:
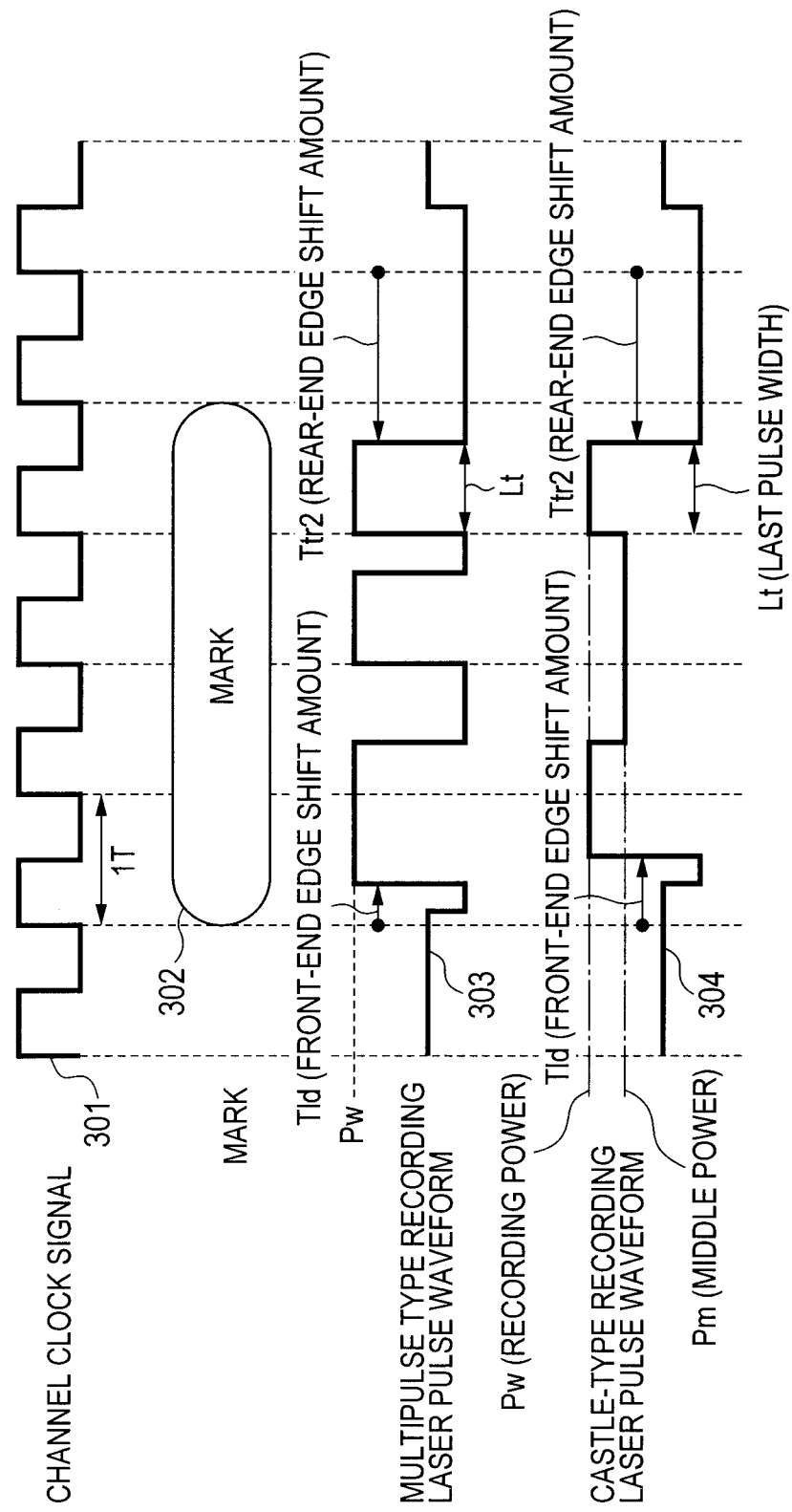
FIG. 5 is an explanatory diagram showing one example illustrative of laser pulse waveforms related to recording strategies of the optical disk apparatus.

FIG. 5 is an explanatory diagram showing one example illustrative of laser pulse waveforms related to individual recording strategies of the optical disk apparatus 100. Incidentally, the shape of each of the laser pulse waveforms shown in the same drawing is one example and not limited to such a shape.

In the same drawing, there are shown a waveform 301 of a channel clock signal having a period 1T, a waveform 302 of a recording mark to be recorded in the optical disk 1, a laser pulse waveform 303 related to a multipulse type write strategy, and a laser pulse waveform 304 related to a castle-type write strategy.

Parameters adjusted upon a write strategy adjustment at the optical disk apparatus 100 include, for example, a front-end edge shift amount Tld, a rear-end edge shift amount Ttr2, recording power (recording power) Pw and a write pulse Lt. Incidentally, the parameters to be adjusted are not limited to the above. In the case of the castle-type write strategy, for example, middle power Pm may further be adjusted. Whether either of the multipulse type write strategy and the castle-type write strategy should be used as the laser pulse waveform for recording may be determined depending on the type of optical disk 1 or may be determined depending on the double speed at high-speed recording.

As shown in FIG. 5, the front edge shift amount Tld of the front-edge pulse at the multipulse type write strategy corresponds to the time from the rise of the channel clock signal 301 to the first rising edge of the multipulse type laser pulse waveform 303. The rear edge shift Ttr2 of the rear-end edge pulse at the multipulse type write strategy corresponds to the time from the rise of the channel clock signal 301 subsequent to the recording mark 302 to the last falling edge of the multipulse type laser pulse waveform 303. The multipulse type recording power Pw is the maximum value of the laser pulse waveform. The multipulse type last pulse width Lt corresponds to the width of a last pulse located at the end of the laser pulse waveform.

As shown in the same drawing as well, the edge shift amount Tld of the front-end edge pulse at the castle-type write strategy corresponds to the time from the rise of the channel clock signal 301 to the first rising edge of the castle-type recording laser pulse waveform 304. The edge shift amount Ttr2 of the rear-end edge pulse at the castle-type recording strategy corresponds to the time from the rise of the channel clock signal 301 subsequent to the recording mark 302 to the last falling edge of the castle-type recording laser pulse waveform 304. The castle-type recording power Pw is the maximum value of the laser pulse waveform. The castle-type last pulse width Lt corresponds to the time taken to hold the recording power Pw located at the end of the laser pulse waveform.

The optical disk apparatus 100 adjusts the above parameters by a predetermined processing procedure to thereby adjust the write strategy. A summary of a processing flow for the write strategy adjustment by the optical disk apparatus 100 will be explained below.

Figure 6:
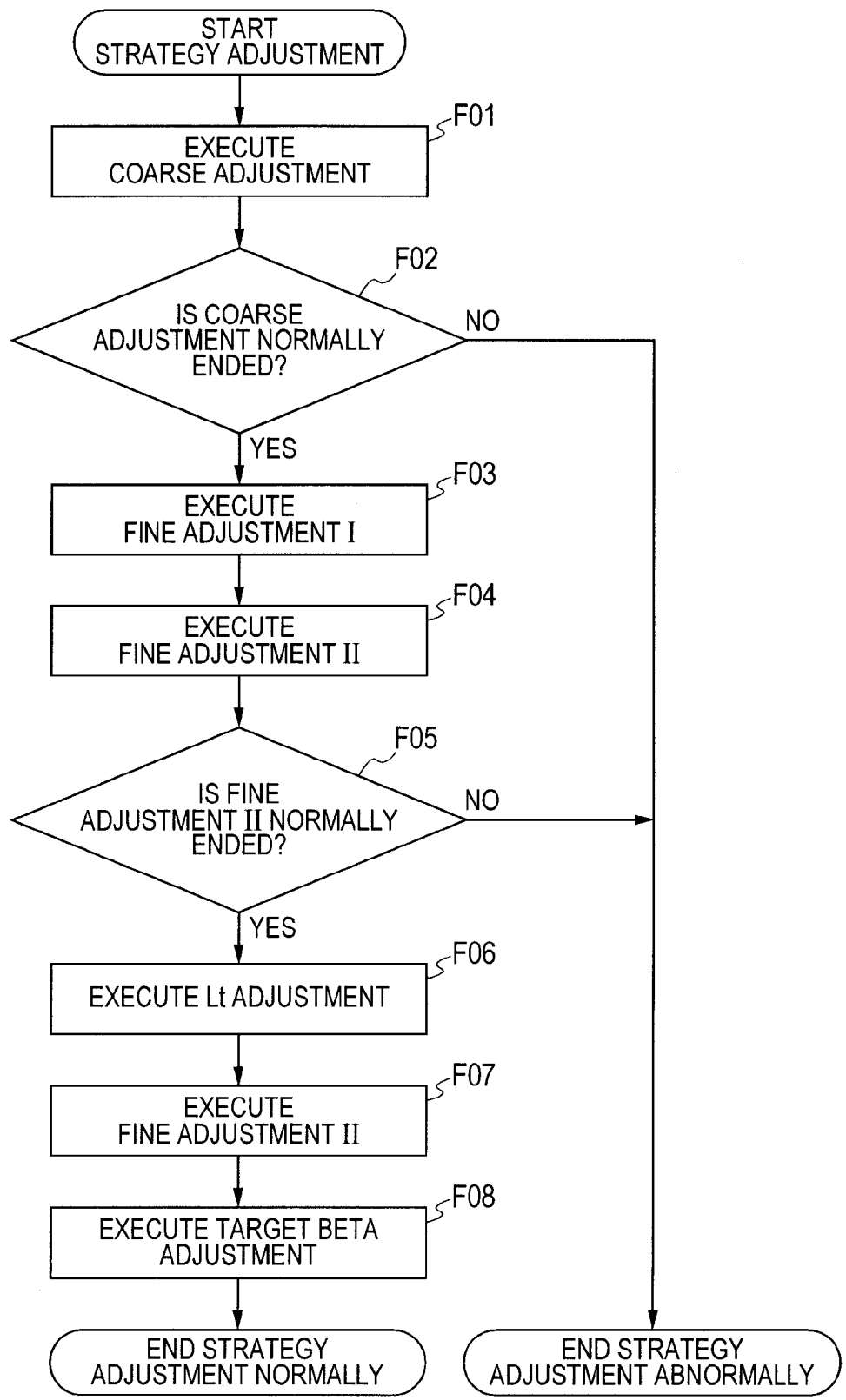
FIG. 6 is a flow diagram showing one example of a flow of processing for a write strategy adjustment of the optical disk apparatus 100.

FIG. 6 is a flow diagram showing one example of processing for the write strategy adjustment by the optical disk apparatus 100.

Although the processing flow shown in the same drawing is illustrated as a processing flow based on software processing of the microcontroller 43, some or all of the processing can also be realized by dedicated hardware.

In the write strategy adjustment processing shown in the same drawing, a coarse adjustment is first executed and an adjustment start strategy is selected (F01). In the coarse adjustment, a plurality of initial strategies are first generated based on one standard initial strategy. The recording laser power (recording power Pw) is changed using the initial strategies, so that "test recording marks" in the form of random data for use as evaluation data are recorded onto the surface of the optical disk 1. Thereafter, the recorded data is reproduced to perform the measurement of signal quality. An evaluation function operation is executed based on the result of measurement. If the operation result is normal, one kind of write strategy for the optimal recording power Pw is selected out of the initial strategies as the adjustment start strategy, whereby the processing for the coarse adjustment is normally ended. If the operation result is abnormal, the coarse adjustment is determined not to be adjustable and the processing is abnormally ended. The detailed contents of the coarse adjustment will be described later.

When the coarse adjustment of Step F01 is ended, it is determined whether the coarse adjustment is normally ended (F02). When it is determined at Step F02 that the coarse adjustment has normally been ended, a fine adjustment I is then executed (F03). On the other hand, when it is determined at Step F02 that the coarse adjustment has abnormally been ended, the write strategy adjustment is abnormally ended. It is thus possible to determine, at an early stage, the optical disk at which the write strategy adjustment cannot be made and reduce a processing load at the microcontroller 43.

At the fine adjustment I of Step F03, a first adjustment write strategy is generated at which the parameters (front-end edge shift amount Tld and rear-end edge shift amount Ttr2) for shifting the edges of each recording mark at the adjustment start strategy selected at the coarse adjustment of Step F01 have been adjusted. Concretely, there is generated a plurality of recording strategies at which the front-end edge shift amount Tld or the read-end edge shift amount Ttr2 of each individual recording mark at the adjustment start strategy selected at the coarse adjustment is changed. Test recording marks such as random data for use as evaluation data is recorded in the optical disk in accordance with those recording strategies. Then, the recorded data is reproduced to measure signal quality. Thus, a write strategy at which the value of the entire jitter (Jadj) contained in the result of measurement becomes minimum, is selected out of the recording strategies, which is assumed to be a first adjustment write strategy. Incidentally, as the value of the entire jitter (Jadj) at the evaluation result becomes smaller, the signal quality is assumed to be good. A detailed processing procedure of the fine adjustment I will be described later.

When the fine adjustment I of Step F03 is ended, a fine adjustment II is executed (F04). At the fine adjustment II of Step F04, a second adjustment write strategy is generated at which a parameter (front-end edge shift amount Tld or rear-end edge shift amount Ttr2) for shifting the edge of a desired recording mark at the first adjustment start strategy selected at the fine adjustment I of Step F03 has been adjusted. A concrete method therefor is as follows:

Since the edge shift amount of each recording mark is adjusted based on the entire jitter at the fine adjustment I, there is a case where a reduction in jitter related to a long mark low in the rate of its appearance (i.e., which occurs infrequently) is insufficient. For example, one example of the result of evaluation of recording quality prior to and subsequent to the execution of the fine adjustment I is shown in FIG. 7.

In FIG. 7, reference numeral M0501 indicates shift values of respective combinations of forward spaces/rearward marks prior to the execution of the fine adjustment I. Reference numeral M0502 indicates jitters of respective combinations of forward spaces/rearward marks prior to the execution of the fine adjustment I. Reference numeral M0503 indicates the entire shift value and the entire jitter of the respective combinations of the forward spaces/rearward marks prior to the execution of the fine adjustment I. Reference numeral M0511 indicates shift values of respective combinations of forward spaces/rearward marks subsequent to the execution of the fine adjustment I. Reference numeral M0512 indicates jitters of respective combinations of forward spaces/rearward marks subsequent to the execution of the fine adjustment I. Reference numeral M0513 indicates the entire shift value and the entire jitter of the respective combinations of the forward spaces/rearward marks subsequent to the execution of the fine adjustment I.

As designated at reference numerals M0503 and M0513, the entire jitter becomes small before and after the fine adjustment I. However, as designated at reference numerals J0501, J0502, J0511 and J0512, for example, there is a case where since a mark length 5T at a forward space length 6T indicates a long mark low in its appearance rate, the degree of influence on the entire jitter is low and the jitter is not so small. Thus, at the fine adjustment II of Step F04, for example, a write strategy (second adjustment write strategy) is generated at which the adjustment of edge shift amounts (front-end edge shift amount Tld and rear-end edge shift amount Ttr2) has been made to the edges of all recording marks at which the absolute values of shift values exceed a predetermined threshold value, of the edges of the respective recording marks at the result of evaluation of the recording strategies adjusted at the fine adjustment I of Step F03, in such a manner that the absolute values of the shift values become smaller. Incidentally, a detailed processing procedure of the fine adjustment II will be described later, but the fine adjustment II may also be separated into a case in which it is normally ended and a case in which it is abnormally ended.

When the fine adjustment II of Step F04 is ended, it is determined whether the fine adjustment II is normally ended (F05). When the fine adjustment II is determined to be normally ended, an Lt adjustment is executed (F06). When it is determined at Step F05 that the fine adjustment II has abnormally been ended, the write strategy adjustment is abnormally ended. Thus, in a manner similar to Step F02, a processing load at the microcontroller 43 can be reduced.

At the Lt adjustment of Step F06, a third adjustment write strategy is generated at which a parameter of a last pulse width Lt at the second adjustment write strategy adjusted at the fine adjustment II of Step F04 has been optimized. A detailed processing content of the Lt adjustment will be described later.

When the Lt adjustment of Step F06 is ended, the fine adjustment II is executed again (F07). At the fine adjustment II of Step F07, the readjustment of edge shift amounts is made to the edges of all recording marks at which the absolute values of shift values exceed a predetermined threshold value within respective mark lengths at the result of evaluation of the write strategy at which the last pulse width Lt has been optimized at Step F06, in such a manner that the absolute values of the shift values become smaller. Thus, a fourth adjustment write strategy is decided.

When Step F07 is ended, a target beta adjustment is performed, and the optimization of recording laser power at the fourth adjustment write strategy adjusted at the fine adjustment II of Step F07 and the decision of a target beta value are carried out (F08). Here, the target beta is a target value for a beta value. The target beta value is stored in the memory 44. Thus, when the recording laser power is adjusted based on the operation of the optimum power calibration (OPC), its adjustment is executed with the beta value stored in the memory 44 as the target beta, so that the optimum recording laser power is determined. That is, the optimum recording laser power (recording power) Pw can be determined by deciding the target beta. When the characteristic of jitter amount vs. recording laser power is obtained upon the determination of the target beta, power taken as the center of a power margin is set to the recording laser power, and the beta value at the recording laser power can also be set as the target beta. A detailed processing content of the target beta adjustment at Step F08 will be described later.

When Step F08 is ended, the processing of the write strategy adjustment is normally completed. After its normal completion, the optical disk apparatus 100 performs a predetermined recording on the recording surface of the optical disk 1 in accordance with the write strategy optimized by the above method, in response to an actual recording command outputted from an unillustrated external PC (Personal Computer) or the like.

The respective processing contents of FIG. 6 will hereinafter be explained in detail.

(3) Coarse Adjustment (Selection of Adjustment Start Strategy)

Figure 8:
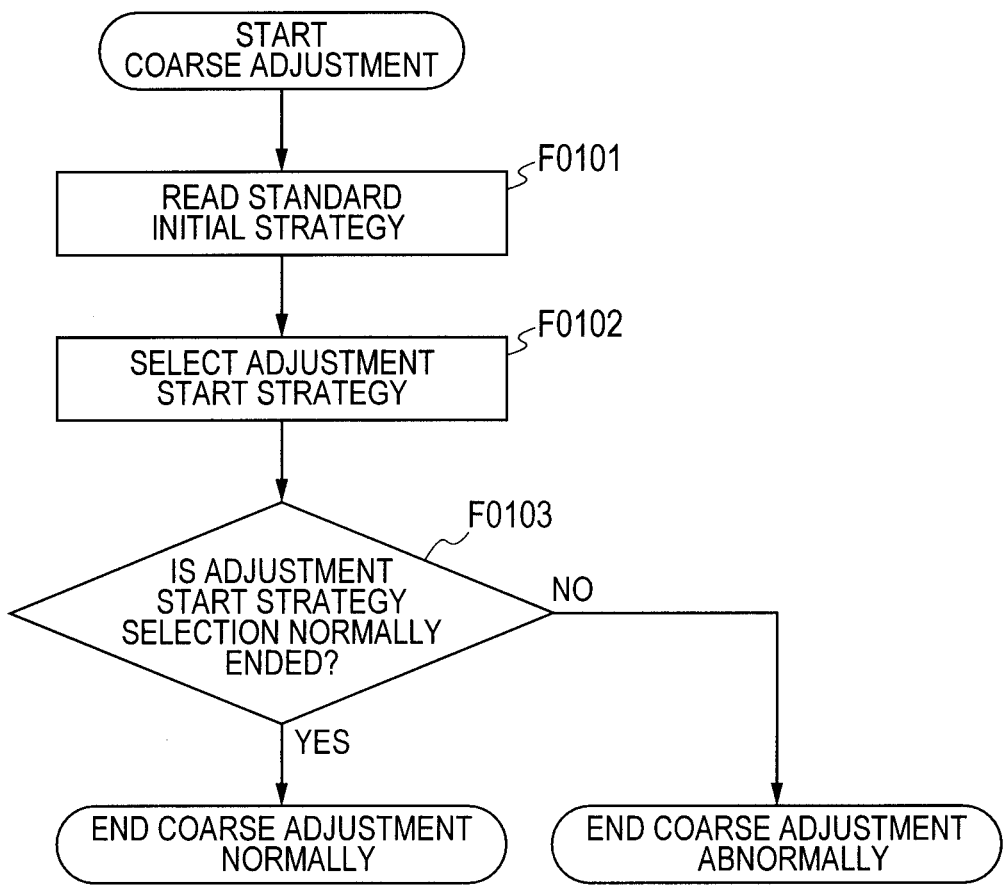
FIG. 8 is a flow diagram showing one example of a flow of a coarse adjustment.

FIG. 8 is a flow diagram showing one example of a flow of the coarse adjustment.

The reading of a standard initial strategy is first executed (F0101). The reading of the standard initial strategy is made by the microcontroller 43 which reads the standard initial strategy held in the memory 44 in advance. This standard initial strategy may be, for example, a write strategy to which the statistical average value of recommended strategies recorded in disk management information of various optical disks or may be a write strategy most high in frequency within the recommended recording strategies of the various optical disks. The standard initial strategy is not limited to these.

When Step F0101 is ended, the choice of an adjustment start strategy is done (F0102). The processing of Step F0102 will be explained in detail using FIG. 9.

Figure 9:
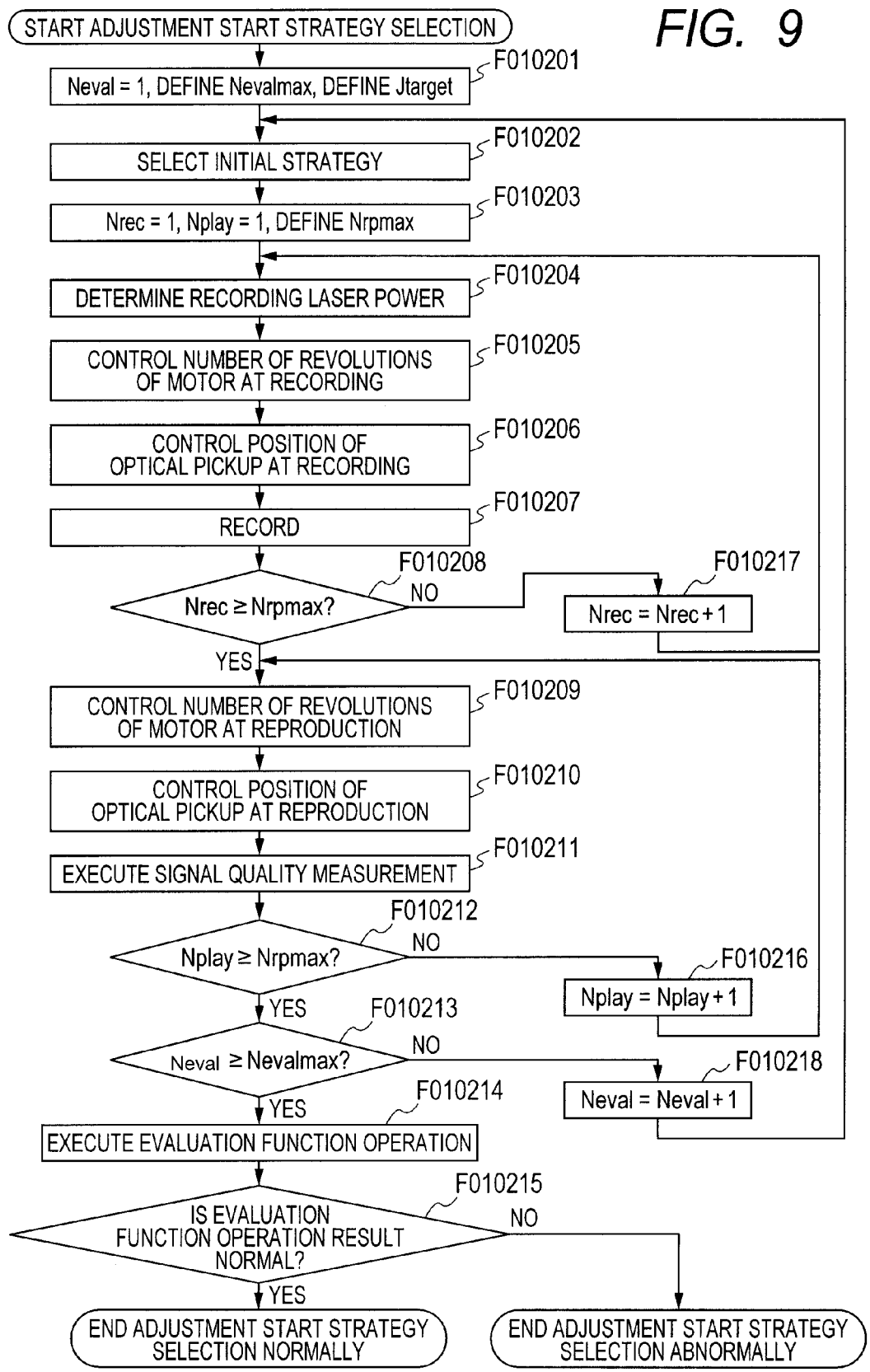
FIG. 9 is a flow diagram depicting one example of a flow of processing related to the selection of an adjustment start strategy of Step F0102.

FIG. 9 is a flow diagram showing one example of a flow of processing related to the selection of the adjustment start strategy of Step F0102.

As shown in the same drawing, the microcontroller 43 first resets the value of an adjustment start strategy selection counter Neval to "1" and defines the maximum value Nevalmax of the number of times that the adjustment start strategy is selected, and a target jitter value Jtarget (F010201). The maximum value Nevalmax thereof and the target jitter value Jtarget are stored in a register, for example. The maximum value Nevalmax of the number of times that the adjustment start strategy is selected, is set to, for example, a value that coincides with the number of initial strategies and varies according to a method for calculating the initial strategy. The adjustment start strategy selection counter Neval is, for example, a counter that is incremented when processing for adjusting one initial strategy is ended.

When Step F010201 is ended, the microcontroller 43 performs the selection of an initial strategy (F010202). Concretely, the microcontroller 43 calculates initial strategies equal to a number corresponding to the maximum value Nevalmax of the number of times that the adjustment start strategy is selected, and selects at which initial strategy of the calculated initial strategies signal quality evaluation should be done. This selection is determined according to the value of the adjustment start strategy selection counter Neval at that time.

Each of the calculated initial strategies may be, for example, a recording strategy to which the front-end edge shift amount Tld of each recording mark at the standard initial strategy read at Step F0101 is uniformly added by a predetermined quantity (also including a negative number) or may be a write strategy to which the rear-end edge shift amount Ttr2 of each recording mark is uniformly added by a predetermined quantity (also including a negative number). The initial strategies target for selection may include the standard initial strategy itself. Incidentally, at the initial strategies, parameters other than the front-end edge shift amount Tld, rear-end edge shift amount Ttr2 and reference recording power of each mark may be changed, and they may be set as fixed values.

When the selection of the initial strategy at Step F010202 is ended, the microcontroller 43 resets a number-of-times-of-recording counter Nrec and a number-of-times-of-reproduction counter Nplay to "1" respectively and defines the maximum number-of-times-of-recording/reproduction Nrpmax (F010203). The value of the maximum number-of-times-of-recording/reproduction Nrpmax is stored in, for example, a register or the like and determined based on a recording laser power range and a laser power interval. Assuming that, for example, the reference recording power Pw of the standard initial strategy is 100%, a recording laser power variable range is from 40% to 150%, and a recording laser power interval is 10%, the set values of recording laser power include twelve types of 40%, 50%, 60%, 70%, 80%, 90%, 100%, 110%, 120%, 130%, 140% and 150%. The maximum number-of-times-of-recording/reproduction is therefore defined as "12". Incidentally, the recording laser power range and the laser power interval may be set to fixed values regardless of the type of optical disk 1 or may be values that differ, as appropriate, according to the type of optical disk 1 or the like.

Next, the microcontroller 43 determines recording laser power (F010204). Upon this recording laser power decision, the recording laser power (recording power Pw) is determined to be any of 40%, 50%, 60%, 70%, 80%, 90%, 100%, 110%, 120%, 130%, 140% and 150% indicative of the above-described recording laser power range, for example.

When the recording power Pw is determined at Step F010204, the microcontroller 43 executes control on the number of revolutions of the motor at recording (F010205). At this motor number-of-revolutions control at recording, the microcontroller 43 outputs a motor control signal S09 to the motor control circuit 47 to reach a predetermined recording speed. In response to the motor control signal S09, the motor control circuit 47 outputs a motor control signal S01 to the spindle motor 2 to control the number of revolutions of the spindle motor in such a manner as to reach the predetermined recording speed.

When the control of the number of the revolutions of the spindle motor 2 to the desired number of revolutions is completed at Step F010205, the microcontroller 43 executes control on the position of the optical pickup at recording (Step F010206). At this optical pickup position control at recording, the microcontroller 43 outputs a position control signal S07 to the position control circuit 45 to move the optical pickup 3 to a recording area of the optical disk 1 that performs recording for carrying out signal quality evaluation. In response to the position control signal S07, the position control circuit 45 outputs a position control signal SO2 to the optical pickup 3 to move the optical pickup 3 to the recording area.

When the movement of the optical pickup 3 to the desired position is completed at Step F010206, the microcontroller 43 starts the recording of test recording marks such as random data for use as evaluation data in the optical disk 1 in accordance with the initial strategy selected at Step F010202 (F010207). At Step F010207, the microcontroller 43 outputs a laser pulse control signal S08 corresponding to the initial strategy selected at Step F010202 to the laser pulse control circuit 46. In response to the laser pulse control signal S08, the laser pulse control circuit 46 outputs a laser pulse control signal S03 to the optical pickup 3 at a predetermined address position on the optical disk 1, where the recording of evaluation data of a predetermined size is carried out.

When the recording of the predetermined size is completed at Step F010207, the microcontroller 43 executes a comparison between the number-of-times-of-recording counter Nrec and the maximum number-of-times-of-recording/reproduction Nrpmax (F010208). If the value of the number-of-times-of-recording counter Nrec is larger than or equal to the maximum number-of-times-of-recording/reproduction Nrpmax, the microcontroller 43 determines that recording based on a predetermined laser power range has been ended, and starts the playback of the recorded evaluation data (F010209). On the other hand, if the value of the number-of-times-of-recording counter Nrec is smaller than the maximum number-of-times-of-recording/reproduction Nrpmax, the number-of-times-of-recording counter Nrec is incremented by "1" (F010217) and the microcontroller 43 returns to Step F010204, where the recording power Pw is changed and the recording of evaluation data of a predetermined size is performed again (F010204 through F010207). At this time, the recording area on the optical disk 1 in which the data is recorded is an area different from the recording area first recorded with the recording power Pw.

At Step F010209, control on the number of revolutions of the motor at reproduction is performed to reproduce the evaluation data. Upon the motor number-of-revolutions control at reproduction, the microcontroller 43 outputs a motor control signal S09 to the motor control circuit 47 in such a manner that a predetermined playback speed is reached. In response to the motor control signal S09, the motor control circuit 47 outputs a motor control signal S01 to the spindle motor 2 to control the number of revolutions of the spindle motor 2 in such a manner that a predetermined playback speed is reached.

When the control of the number of revolutions of the spindle motor 2 to the desired number of revolutions is completed at Step F010209, the microcontroller 43 executes control on the optical pickup position at reproduction (F010210). At Step F010210, the microcontroller 43 outputs a position control signal S07 to the position control circuit 45 in such a manner that the optical pickup 3 is moved to the area of the optical disk 1 to which recording for performing signal quality evaluation has been made. In response to the position control signal S07, the position control circuit 45 outputs a position control signal S02 in such a manner that the optical pickup 3 is moved to this area.

When the processing of the optical pickup position control at reproduction is ended at Step F010210, the microcontroller 43 reproduces the optical disk 1 to thereby execute a signal quality measurement (F010211). At Step F010211, the microcontroller 43 outputs a laser pulse control signal S08 to the laser pulse control circuit 46 to execute reproduction for performing signal quality evaluation. In response to the laser pulse control signal S08, the laser pulse control circuit 46 outputs a laser pulse control signal S03 to the optical pickup 3 at a predetermined address position on the optical disk 1 to thereby execute reproduction. The optical pickup 3 applies laser onto the optical disk 1 and receives light reflected from the optical disk 1, and converts the reflected light into an electric signal S04 and outputs the same to the AFE 41 of the signal processing LSI 4. The AFE 41 executes analog signal processing such as the amplification of the electric signal S04 to thereby generate an analog signal S05 and outputs it to the signal quality measuring circuit 42. The signal quality measuring circuit 42 measures a jitter of the analog signal S05 by the above method to calculate the result of measurement and outputs measurement result information S06 to the microcontroller 43. The microcontroller 43 stores the measurement result information S06 in the memory 44.

When the signal quality measurement of Step F010211 is ended, the microcontroller 43 compares the number-of-times-of-reproduction counter Nplay and the maximum number-of-times-of-recording/reproduction Nrpmax (F010212). If the value of the number-of-times-of-reproduction counter Nplay is smaller than the maximum number-of-times-of-recording/reproduction Nrpmax at Step F010212, the microcontroller 43 increments the number-of-times-of-reproduction counter Nplay by "1" (F010216), and returns to Step F010209, where the playback of evaluation data recorded with another recording power Pw is executed (F010209 through F010211).

On the other hand, if the value of the number-of-times-of-reproduction counter Nplay is larger than or equal to the maximum number-of-times-of-recording/reproduction Nrpmax at Step F010212, the microcontroller 43 compares the counter Neval and the maximum value Nevalmax of the number of times that the adjustment start strategy is selected (F010213). If the value of the adjustment start strategy selection counter Neval is smaller than the maximum value Nevalmax thereof, the microcontroller 43 counts up the adjustment start strategy selection counter Neval by "1" (F010218) and returns to the initial strategy selection of Step F010202.

On the other hand, if the value of the adjustment start strategy selection counter Neval is larger than or equal to the maximum value Nevalmax at Step F010213, the microcontroller 43 executes an evaluation function operation and stores the result of operation in the memory 44 (F010214).

Upon the evaluation function operation of Step F010214, the operation is performed using, for example, an evaluation function Feval=SUM (Jtarget−J (k)). Here, k is a sample point at a signal quality measurement result that meets the relation of J (k)≤Jtarget in relation to the jitter. Jtarget is a target jitter value, and J (k) is a jitter value at the sample point k. For example, when a plurality of recording marks target for evaluation of recording quality are assumed to be mark lengths 3T through 6T as shown in FIG. 3, sample points k are thirty two edges specified by combinations (16×2=32) of forward space lengths 3T through 6T of the recording marks and rearward space lengths 3T through 6T thereof. J (k) indicates the value of a jitter at which the jitter is less than or equal to the target jitter Jtarget within the thirty two target edges. Incidentally, the target jitter value Jtarget is stored in a predetermined memory area of the memory 44 in advance. The microcontroller 43 reads the corresponding area of the memory 44 to thereby determine a target jitter value Jtarget. The result of operation by the evaluation function Feval is set as a value directly proportional to a power margin for the recording power Pw and inversely proportional to the jitter. Thus, the signal quality is enhanced as the value of the operation result becomes larger.

When the evaluation function operation of Step F010214 is ended, the microcontroller 43 determines whether the result of the evaluation function operation is normal (F010215). If the evaluation function Feval is 0 at all the initial strategies at Step F010215, the microcontroller 43 determines that the result of arithmetic operation of the evaluation function is abnormal and causes the adjustment start strategy selection processing (F0102) to be abnormally ended. On the other hand, if there exists even one initial strategy at which the evaluation function Feval is not 0 at Step F010215, the microcontroller 43 determines the result of arithmetic operation of the evaluation function at Step F010214 to be normal. Thus, the microcontroller 43 selects the write strategy corresponding to the maximum evaluation function Feval as an adjustment start strategy and allows the adjustment start strategy selection processing (F0102) to be normally ended.

When the adjustment start strategy selection processing (F0102) is ended, the microcontroller 43 then determines whether the adjustment start strategy is normally ended (F0103). When it is determined at Step F0103 that the adjustment start strategy selection has normally been ended, the microcontroller 43 normally ends the processing of the coarse adjustment. On the other hand, when it is determined that the adjustment start strategy selection has abnormally been ended, the microcontroller 43 abnormally ends the processing of the coarse adjustment. When the processing of the coarse adjustment is abnormally ended, it is determined at Step F02 as shown in FIG. 6 that the coarse adjustment has abnormally been ended, and the write strategy adjustment is abnormally ended.

According to the coarse adjustment of Step F01, it is possible to generate the write strategy at which the recording power Pw has been adjusted in such a manner that the entire jitter at the target edges becomes minimal.

(4) Fine Adjustment I (Selection of First Adjustment Write Strategy)

Figure 10:
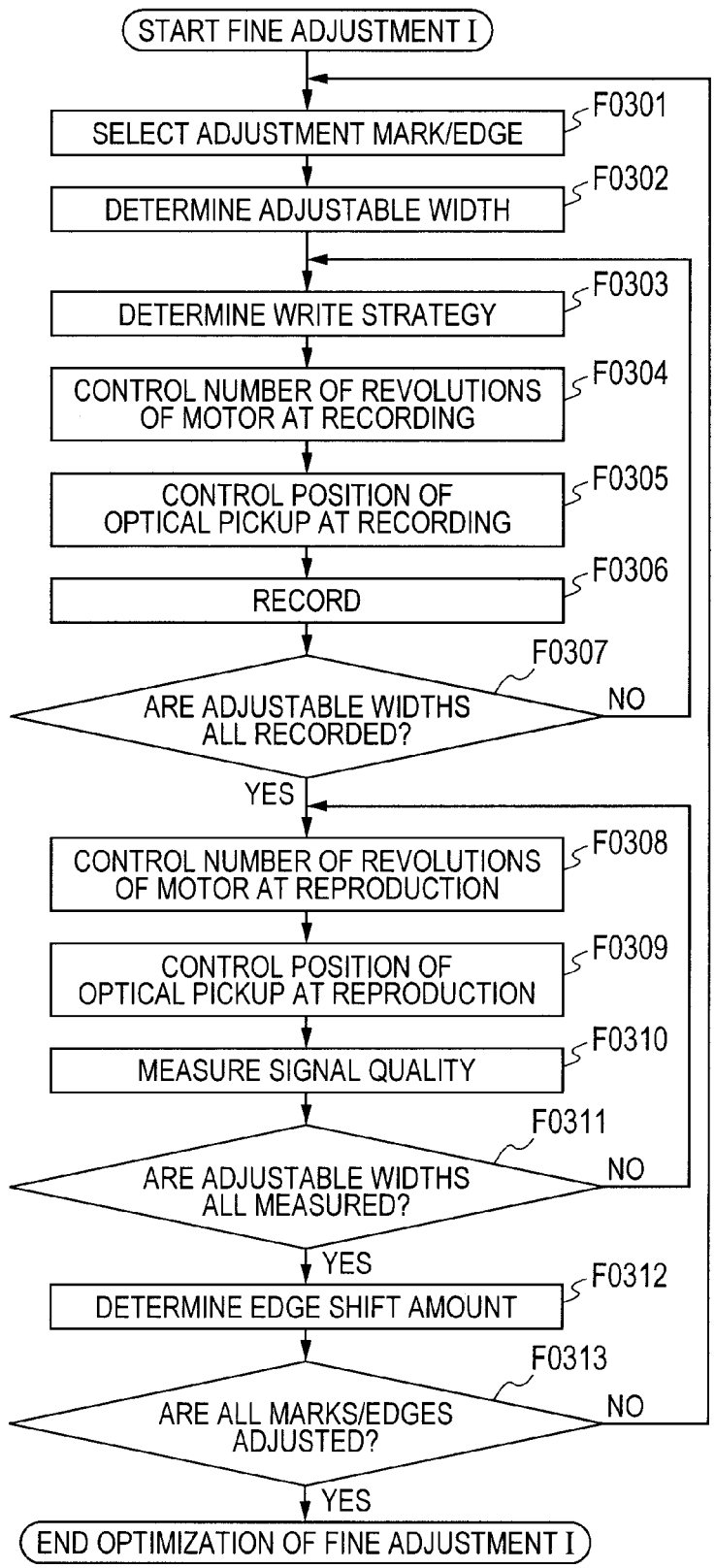
FIG. 10 is a flow diagram showing one example of a flow of the fine adjustment I.

FIG. 10 is a flow diagram showing one example of a flow of the fine adjustment I.

The microcontroller 43 first selects a predetermined target edge out of a plurality of edges specified by combinations of mark lengths, forward space lengths and rearward space lengths of recording marks recorded in the optical disk 1 (F0301). The target edge selected here may be one edge or plural edges. As shown in FIG. 3, for example, the thirty two edges specified by the combinations of the forward space lengths 3T through 6T and the rearward space lengths 3T through 6T at the time that the mark lengths 3T through 6T are set, can also be selected as target edges. If the plural edges are selected as the target edges in this way, the following advantages are obtained. At Step F0313 to be described later, for example, the processing of Steps F0301 through F0312 is repeatedly executed until recording is performed on all target edges. Therefore, if a plurality of target edges are selected at the first Step F0301, then the number of times that the processing of Steps F0301 through F0312 is repeated can be reduced and thereby the processing load of the fine adjustment I on the microcontroller 43 can be reduced.

Next, the microcontroller 43 determines an adjustable width or span of an edge shift amount (front-end edge shift amount Tld, rear-end edge shift amount Ttr2) related to the target edge selected at Step F0301 (F0302). The adjustable width is, for example, a range in which the edge shift amount (front-end edge shift amount Tld, rear-end edge shift amount Ttr2) related to the target edge at the adjustment start strategy selected at the coarse adjustment of Step F01 is changed. The unit of the adjustable width of the edge shift amount is assumed to be one step. For example, the unit thereof is assumed to be one step=$\frac{1}{16}$T (where T: channel clock period). The adjustable width can be, for example, up to five steps in either direction on the basis of the edge shift amount at the adjustment start strategy, for example.

After the adjustable width of the edge shift amount has been decided at Step F0302, the microcontroller 43 determines an edge shift amount (front-end edge shift amount Tld or rear-end edge shift amount Ttr2) related to the selected target edge within the range of the adjustable width and thereby decides a write strategy (F0303). When the adjustable width is assumed to be five steps, for example, a write strategy is generated in which the edge shift amount related to the target edge of the adjustment start strategy is set to an edge shift amount changed by any of one to five steps. Incidentally, when the processing of Step F0303 is first executed, a parameter such as an edge shift amount related to another recording mark is set to the same value as the adjustment start strategy selected by the coarse adjustment of Step F01. Other cases will be described later at Step F0313.

When the write strategy is determined at Step F0303, the microcontroller 43 executes control on the number of revolutions of the motor at recording (F0304). At Step F0304, the microcontroller 43 outputs a motor control signal S09 to the motor control circuit 47 in such a manner that a predetermined recording speed is reached. In response to the motor control signal S09, the motor control circuit 47 outputs a motor control signal S01 for controlling the number of revolutions of the spindle motor 2 to the spindle motor 2 in such a manner that the predetermined recording speed is reached.

When the control of the number of revolutions of the spindle motor 2 to the desired number of revolutions is completed at Step F0304, the microcontroller 43 executes control on the position of the optical pickup at recording (F0305). At Step F0305, the microcontroller 43 outputs a position control signal S07 to the position control circuit 45 in such a manner that the optical pickup 3 is moved to its corresponding area of the optical disk 1 on which recording for the fine adjustment I is performed. The position control circuit 45 outputs a position control signal S02 to the optical pickup 3 in such a manner that the optical pickup 3 is moved to this area.

When the movement of the optical pickup 3 to the desired position is completed at Step F0305, the microcontroller 43 executes recording of test recording marks such as random data for use as evaluation data in the optical disk 1 in accordance with the write strategy decided at Step F0305 (F0306). At Step F0306, the microcontroller 43 outputs a laser pulse control signal S08 to the laser pulse control circuit 46 in such a manner that the recording is carried out with the write strategy determined at Step F0303. In response to the laser pulse control signal S08, the laser pulse control circuit 46 outputs a laser pulse control signal S03 to the optical pickup 3 at a predetermined address position on the optical disk 1 to thereby execute recording of a predetermined size.

When the execution of the recording of the predetermined size is completed at Step F0306, the microcontroller 43 determines whether recording is completed with respect to all adjustable widths determined at Step F0302 (F0307). When it is determined at Step F0307 that the recording has not been completed with respect to all the adjustable widths, the microcontroller 43 returns to Step F0303, where recording strategies corresponding to the recording-uncompleted adjustable widths are generated and the recording of evaluation data of a predetermined size is performed again (F0304 through F0306). At this time, the recording area on the optical disk in which data is recorded, is an area different from the recording area on which the recording is first performed with the adjustable width.

On the other hand, when it is determined at Step F0307 that the recording has been completed with respect to all the adjustable widths, the reproduction of the evaluation data is performed by processing subsequent to Step F0308. First, the microcontroller 43 executes control on the number of revolutions of the motor at playback (F0308). At Step F0308, the microcontroller 43 outputs a motor control signal S09 to the motor control circuit 47 in such a manner that a predetermined playback speed is obtained. In response to the motor control signal S09, the motor control circuit 47 outputs a motor control signal S01 for controlling the number of revolutions of the spindle motor 2 to the spindle motor 2 in such a manner that the predetermined playback speed is reached.

When the control of the number of revolutions of the spindle motor 2 to the desired number of revolutions is completed at Step F0308, the microcontroller 43 executes optical pickup position control at playback (F0309). At Step F0309, the microcontroller 43 outputs a position control signal S07 to the position control circuit 45 in such a manner that the optical pickup 3 is shifted to the area of the optical disk 1 in which the recording has been completed. In response to the position control signal S07, the position control circuit 45 outputs a position control signal S02 to the optical pickup 3 in such a manner that the optical pickup 3 is moved to this area.

When the processing of the position control at Step F0309 is ended, the microcontroller 43 reproduces the optical disk 1 and executes a signal quality measurement (F0310). At Step F0310, the microcontroller 43 outputs a laser pulse control signal S08 to the laser pulse control circuit 46 to execute reproduction for performing signal quality evaluation. In response to the laser pulse control signal S08, the laser pulse control circuit 46 outputs a laser pulse control signal S03 to the optical pickup 3 at a predetermined address position on the optical disk 1 to carry out the reproduction. That is, the optical pickup 3 applies laser onto the optical disk 1 and receives light reflected from the optical disk 1, and converts the reflected light into an electric signal S04 and outputs the same to the AFE 41 of the signal processing LSI 4. The AFE 41 executes analog signal processing such as the amplification of the electric signal S04 to thereby generate an analog signal S05 and outputs it to the signal quality measuring circuit 42. The signal quality measuring circuit 42 measures the entire jitter of the analog signal S05 to calculate the result of measurement and outputs measurement result information S06 to the microcontroller 43. The microcontroller 43 stores the measurement result information S06 in the memory 44.

When the processing of the signal quality measurement of Step F0310 is ended, the microcontroller 43 determines whether the signal quality measurement of the evaluation data corresponding to all the adjustable widths decided at Step F0302 is completed (F0311). When it is determined at Step F0311 that the signal quality measurement of the evaluation data corresponding to all the adjustable widths has not been completed, the microcontroller 43 returns to Step F0308, where the uncompleted signal quality measurement of evaluation data corresponding to each of the adjustable widths is executed.

On the other hand, when it is determined that the signal quality measurement of the evaluation data corresponding to all the adjustable widths has been completed, the microcontroller 43 determines a write strategy taken as the optimum edge shift amount (F0312). At Step F0312, the microcontroller 43 reads the measurement result information stored in the memory 44 and determines a write strategy related to an adjustable width of an edge shift amount (front-end edge shift amount Tld, rear-end edge shift amount Ttr2) at which the entire jitter becomes the smallest. When one target edge is selected at Step F0301, for example, a write strategy of an edge shift amount at which the entire jitter becomes minimal when an edge shift amount of the target edge (one recording mark determined by a mark length, a forward space length and a rearward space length) is changed. When a plurality of target edges (e.g., thirty two target edges referred to above) are selected at Step F0301, a write strategy of an edge shift amount at which the entire jitter becomes minimal when the edge shift amounts of those target edges are changed, is determined. Incidentally, upon decision of the write strategy at Step F0312, the microcontroller 43 may also acquire the characteristics of the jitter vs. edge shift amount, calculate an edge shift amount at which the jitter becomes a minimum value, from an approximated curve analogous to the characteristics and determine a write strategy corresponding to the calculated edge shift amount as the optimum write strategy.

When the process of determining the edge shift amount at Step F0312 is completed, the microcontroller 43 determines whether the adjustments to the edge shift amounts are completed with respect to all target edges (F0313). When it is determined at Step F0313 that the adjustments to the edge shift amounts have not been completed with respect to all the target edges, the microcontroller 43 returns to the processing subsequent to Step F0301 to adjust the unadjusted mark lengths and edges, and similar processing is executed (F0301 through F0312). On the other hand, when it is determined at Step F0313 that the adjustments to the edge shift amounts have been completed with respect to all target edges, the processing of the fine adjustment I is ended.

According to the above fine adjustment I, it is possible to generate the write strategy at which the edge shift amount is adjusted in such a manner that the entire jitter for the target edges becomes minimal.

(5) Fine Adjustment II (Selection of Second Adjustment Write Strategy)

Figure 11:
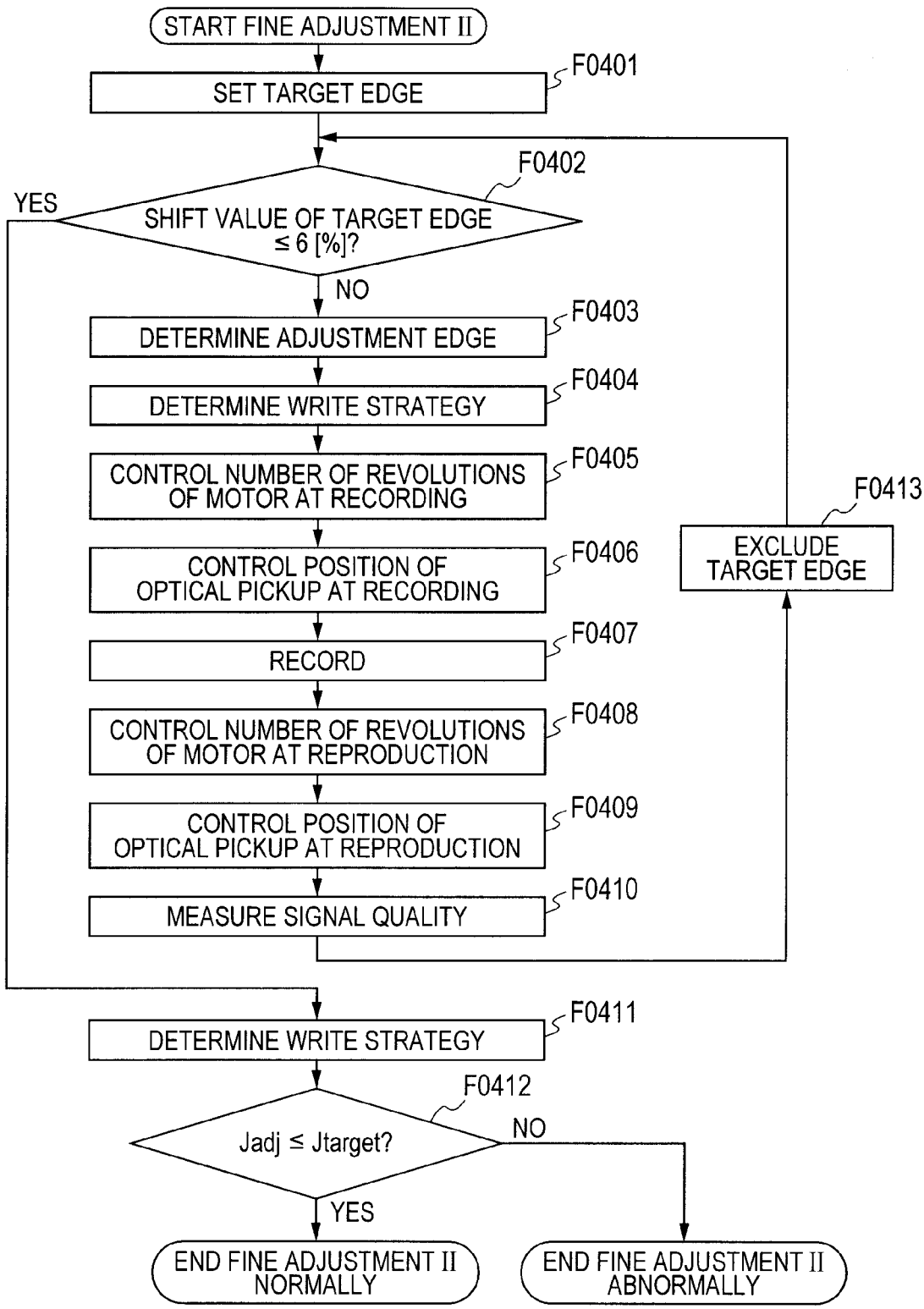
FIG. 11 is a flow diagram illustrating one example of a flow of a fine adjustment II.

FIG. 11 is a flow diagram showing one example of a flow of a fine adjustment II.

The microcontroller 43 first determines a target edge to which the fine adjustment II is made (F0401). The target edge may be, for example, a plurality of target edges selected at the fine adjustment I or may be all edges specified by combinations of all mark lengths and all space lengths. Here, as one example, all the edges specified by combinations of all mark lengths and all space lengths are taken as target edges.

Next, the microcontroller 43 determines whether there exist edges whose absolute values of the shift values exceed a predetermined threshold value, among the respective edges set as the target edges within the signal quality measurement result of the first adjustment write strategy selected at the fine adjustment I (F0402). The predetermined threshold value is a value calculated from the maximum amount of change in shift value changed when the adjustable width of an edge shift amount is changed by one step where, for example, one step=1/16k T (where T: channel clock period) or the like. When an adjustment to an edge shift amount is made to the edge of a recording mark at which the absolute value of the shift value is less than 6%, where the maximum amount of change in shift value at the time that the edge of any recording mark is changed by one step, is 12%, for example, there is a possibility that the shift value will be degraded. Thus, the aim of performing the processing of Step F0402 is to prevent the absolute value of the shift value from being degraded due to subsequent processing. Therefore, the predetermined threshold value may be such a value that the aim is achieved. Here, the predetermined threshold value is assumed to be 6%, for example.

Incidentally, the signal quality measurement result target for determination at Step F0402 corresponds to the signal quality measurement result of the first adjustment write strategy selected at the fine adjustment I where the processing of Step F0402 is first executed. When the processing of Step F0402 is performed twice or more, the signal quality measurement result is a signal quality measurement result obtained at a signal quality measurement of Step F0410 to be described later.

If the absolute value of the shift value of the target edge falls within 6% at Step F0402, then the microcontroller 43 determines the first adjustment write strategy as the optimum strategy and decides it as a second adjustment write strategy (F0411).

On the other hand, when there exist target edges at which the absolute value of the shift value exceeds 6%, the microcontroller 43 executes processing for adjusting an edge shift amount related to the corresponding edge after Step F0403. First, the microcontroller 43 selects a desired target edge out of the target edges at which the absolute value of the shift value exceeds 6% (F0403). Here, the microcontroller 43 may select, for example, one of the target edges at which the absolute value of the shift value exceeds 6%, or may select plural edges therefrom.

When Step F0403 is ended, the microcontroller 43 next generates a recording strategy at which the edge shift amount of the first adjustment write strategy has been adjusted (F0404). Concretely, in regard to the edges of the recording mark determined at Step F0403, the microcontroller 43 adjusts an edge shift amount such that the absolute value of the shift value becomes minimum, based on the shift value of the present situation and the maximum amount of change in shift value at the time that the edge shift amount is varied by one step. As described above, the shift value is an integral of a phase error at a front end edge or a rear end edge of a recording mark and is calculated on the basis of the period T of the channel clock signal. On the other hand, the adjustable width (one step) of the edge shift amount is also based on the period T of the channel clock signal. Thus, if the maximum amount of change in shift value at the time that the edge shift amount is changed by one step is known, it is possible to determine whether the shift value reaches a minimum depending on what steps should be shifted with respect to the edge shift amount of the present situation. When, for example, the present existing shift value of an edge of a predetermined recording mark is 18%, and the maximum amount of change in shift value at the time that the edge shift amount is changed by one step is 12%, the edge shift amount is changed by two steps in the direction in which the shift value becomes small. Consequently, the shift value is changed −24% at maximum, but the shift value subsequent to the change in the edge shift amount becomes −6% even where the shift value is changed −24%. Thus, the absolute value of the shift value is not degraded as compared with 8% prior to the change in the edge shift amount.

Incidentally, at the adjustment to the edge shift amount at Step F0404, edges other than the edges of the recording mark decided at Step F0403 inherit the edge shift amount of the first adjustment write strategy and remain unchanged in the edge shift amount.

After the determination of the write strategy at Step F0404, the microcontroller 43 executes control on the number of revolutions of the motor at recording (F0405). At Step F0405, the microcontroller 43 outputs a motor control signal S09 to the motor control circuit 47 in such a manner that a predetermined recording speed is reached. In response to the motor control signal S09, the motor control circuit 47 outputs a motor control signal S01 for controlling the number of revolutions of the spindle motor 2 to the spindle motor 2 in such a manner that the predetermined recording speed is reached.

When the control of the number of revolutions of the spindle motor 2 to the desired number of revolutions is completed at Step F0405, the microcontroller 43 executes control on the position of the optical pickup at recording (F0406). At Step F0406, the microcontroller 43 outputs a position control signal S07 to the position control circuit 45 in such a manner that the optical pickup 3 is moved to its corresponding area of the optical disk 1 on which recording for the fine adjustment II is performed. The position control circuit 45 outputs a position control signal S02 to the optical pickup 3 in such a manner that the optical pickup 3 is moved to this area.

When the movement of the optical pickup 3 to the desired position is completed at Step F0406, the microcontroller 43 performs recording of test recording marks such as random data for use as evaluation data on the optical disk 1 in accordance with the write strategy adjusted at Step F0404 (F0407). At Step F0407, the microcontroller 43 outputs a laser pulse control signal S08 to the laser pulse control circuit 46 in such a manner that recording is performed with the write strategy determined at Step F0404. In response to the laser pulse control signal S08, the laser pulse control circuit 46 outputs a laser pulse control signal S03 to the optical pickup 3 at a predetermined address position on the optical disk 1 to thereby perform recording of a predetermined size.

When the execution of the recording of the predetermined size is completed at Step F0407, the microcontroller 43 executes control on the number of revolutions of the motor at playback (F0408). At Step F0408, the microcontroller 43 outputs a motor control signal S09 to the motor control circuit 47 in such a manner that a predetermined reproduction speed is reached. In response to the motor control signal S09, the motor control circuit 47 outputs a motor control signal S01 for controlling the number of revolutions of the spindle motor 2 to the spindle motor 2 in such a manner that the predetermined playback speed is reached.

When the control of the number of revolutions of the spindle motor 2 to the desired number of revolutions is completed at Step F0408, the microcontroller 43 executes control on the position of the optical pickup at reproduction (F0409). At Step F0409, the microcontroller 43 outputs a position control signal S07 to the position control circuit 45 in such a manner that the optical pickup 3 is moved to its corresponding area of the optical disk 1 in which the recording has been completed. In response to the position control signal S07, the position control circuit 45 outputs a position control signal S02 to the optical pickup 3 in such a manner that the optical pickup 3 is moved to this area.

When the processing of the position control at Step F0409 is ended, the microcontroller 43 reproduces the optical disk 1 and executes a signal quality measurement (F0410). At Step F0410, the microcontroller 43 outputs a laser pulse control signal S08 to the laser pulse control circuit 46 to execute reproduction for performing signal quality evaluation. In response to the laser pulse control signal S08, the laser pulse control circuit 46 outputs a laser pulse control signal S03 to the optical pickup 3 at a predetermined address position on the optical disk 1 to carry out the reproduction. That is, the optical pickup 3 applies laser onto the optical disk 1 and receives light reflected from the optical disk 1, and converts the reflected light into an electric signal S04 and outputs the same to the AFE 41 of the signal processing LSI 4. The AFE 41 executes analog signal processing such as the amplification of the electric signal S04 to thereby generate an analog signal S05 and outputs it to the signal quality measuring circuit 42. The signal quality measuring circuit 42 measures a jitter Jadj and a shift value of the analog signal S05 to calculate the result of measurement and outputs measurement result information S06 to the microcontroller 43. The microcontroller 43 stores the measurement result information S06 in the memory 44.

When the processing of the signal quality measurement at Step F0410 is ended, the microcontroller 43 next executes the exclusion of each target edge (F0413). Concretely, the microcontroller 43 defines in advance, the number of times that an adjustment to an edge shift amount by the fine adjustment II is performed for every edge of each recording mark. When the adjustment to each edge of the recording mark to be adjusted in the edge shift amount is made at Step F0403, the number of times that each edge of the recording mark is adjusted is counted up. When the number of times that its adjustment is done reaches a prescribed number of times, the corresponding edges are eliminated or excluded from the target edges to be determined at Step F0402, and the adjustment of the edge shift amount is not performed on the excluded edges again. When the number of times that each edge of a predetermined recording mark is adjusted is defined as once, each edge of the recording mark is adjusted once in edge shift amount. Consequently, the recording mark is excluded from the target edges at Step F0402 and no edge shift amount is performed again. When the exclusion of each target edge at Step F0413 is ended, the microcontroller 43 returns to Step F0402, where processing similar to the above is carried out (F0402 through F0410). Incidentally, at Step F0404 subsequent to the second time, the edge shift amount is adjusted on the basis of the write strategy adjusted at the previous Step F0404.

When the processing of Steps F0402 through F0413 is carried out plural times and the absolute values of the shift values of the target edges are all determined to fall within 6% at Step F0402, the processing proceeds to Step F0411, where a write strategy finally adjusted by the processing of Steps F0402 through F0413 is decided as a second write strategy.

When the decision of the write strategy is ended at Step F0411, the microcontroller 43 compares the value Jadj of the entire jitter for the edges of all recording marks targeted for evaluation, and a target jitter value Jtarget (F0412). If the entire jitter value Jadj is smaller than or equal to the target jitter value Jtarget at Step F0412, the fine adjustment II is normally ended. On the other hand, if the value Jadj of the entire jitter is larger than the target jitter value Jtarget, the fine adjustment II is abnormally ended. As shown in the flow of FIG. 6, the fine adjustment II is determined to be abnormally ended at Step F05, and the write strategy adjustment is abnormally ended.

According to the above fine adjustment II, it is possible to efficiently generate the write strategy for reducing the phase shift of the long mark or the like, which was hard to adjust during the fine adjustment I.

(6) Lt Adjustment (Selection of Third Adjustment Write Strategy)

Figure 12:
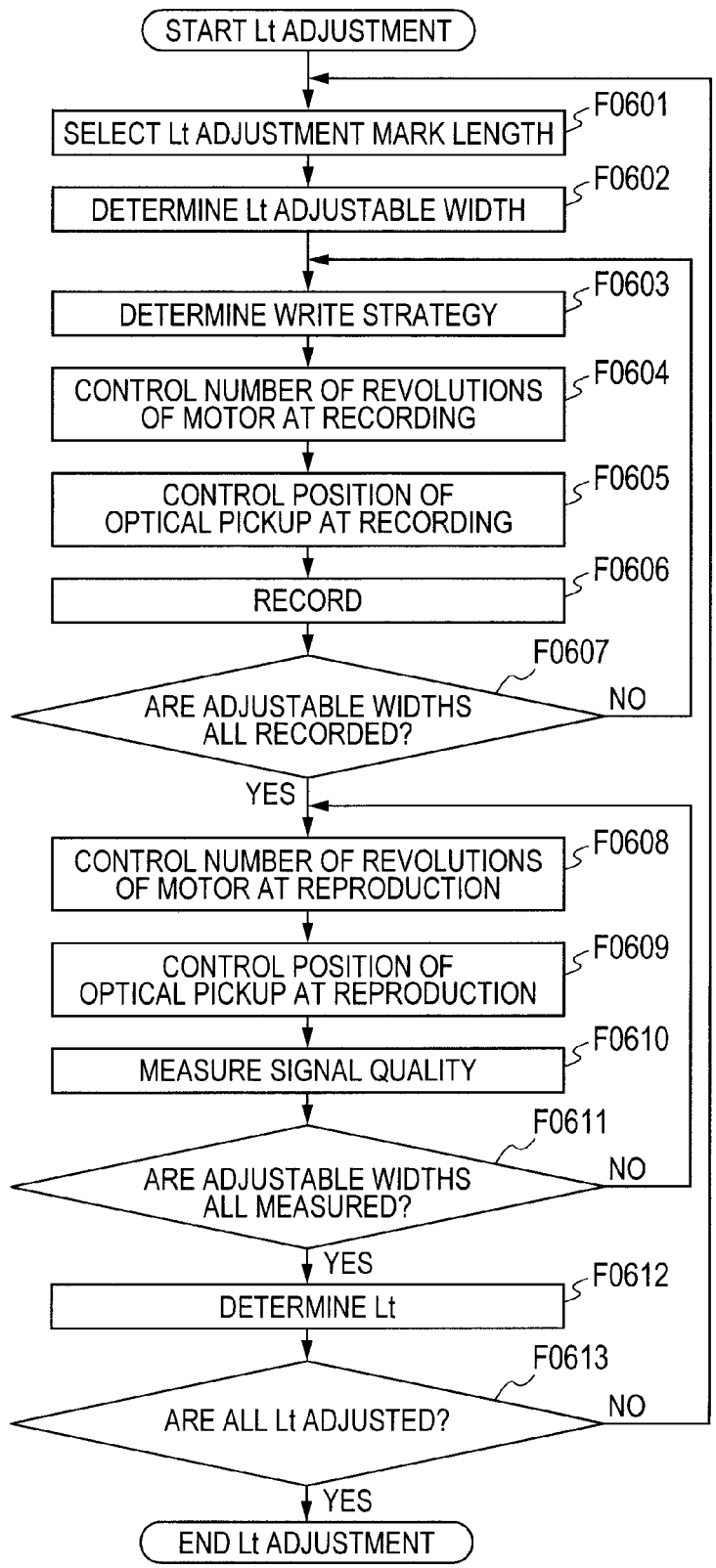
FIG. 12 is a flow diagram showing one example of a flow of an adjustment (Lt adjustment) to a last pulse width Lt.

FIG. 12 is a flow diagram showing one example of a flow of an adjustment (Lt adjustment) to a last pulse width Lt.

First, the microcontroller 43 selects a recording mark at which the Lt adjustment is executed, out of recording marks formed by recording strategies of laser pulses each including a last pulse located at the end of a laser pulse waveform (F0601). In general, a recording mark formed by a laser pulse including a last pulse is a recording mark relatively long in mark length, e.g., a recording mark having a mark length such as 5T, 6T or the like.

Next, the microcontroller 43 determines an adjustable width of a last pulse width Lt of the target recording mark selected at Step F0601 (F0602). The adjustable width is, for example, a range in which the last pulse width Lt of the target recording mark at the second adjustment start strategy selected at the fine adjustment II of Step F03 is changed. For example, the adjustable width can be up to sixteen steps in either direction on the basis of the last pulse width of the second adjustment start strategy. Here, one step is assumed to be ¹⁄₁₆T (where T: channel clock period) or the like.

After the adjustable width of the last pulse Lt has been decided at Step F0602, the microcontroller 43 generates a write strategy adjusted in last pulse Lt within the range of the adjustable width (F0603). When the adjustable width is set to the sixteen steps, for example, a write strategy may be generated in which a last pulse width Lt of a target recording mark is shifted by one step, or a write strategy in which a last pulse width Lt is shifted by four steps, for example. According to the above, when the Lt adjustment is performed upon subsequent processing, the recording of evaluation data is performed on recording strategies (eight set every four back-and-forth steps) in which the Lt adjustment is performed every four steps, for example. It is therefore possible to reduce an amount of recorded data as compared with the case where the Lt adjustment is performed every one step to record evaluation data. Thus, if the adjustable width is an adjustable width characterized by the relation between the adjustable width of Lt and recording quality, in-process records thereof may also be omitted. Incidentally, last pulse widths Lt of recording marks other than the target recording mark, and other parameters are set identical to the second adjustment start strategy adjusted at the fine adjustment II where the processing of Step F0603 is first executed. Processing subsequent to the second time will be explained at Step F0613 to be described later. The recording mark adjusted in last pulse width Lt at Step F0603 may be one type or plural types.

After the write strategy has been determined at Step F0603, the microcontroller 43 executes control on the number of revolutions of the motor at recording (F0604). At Step F0604, the microcontroller 43 outputs a motor control signal S09 to the motor control circuit 47 in such a manner that a predetermined recording speed is reached. In response to the motor control signal S09, the motor control circuit 47 outputs a motor control signal S01 for controlling the number of revolutions of the spindle motor 2 to the spindle motor 2 in such a manner that the predetermined recording speed is reached.

When the control of the number of revolutions of the spindle motor 2 to the desired number of revolutions is completed at Step F0604, the microcontroller 43 executes control on the position of the optical pickup at recording (F0605). At Step F0605, the microcontroller 43 outputs a position control signal S07 to the position control circuit 45 in such a manner that the optical pickup 3 is moved to its corresponding area of the optical disk 1 on which recording for the Lt adjustment is performed. The position control circuit 45 outputs a position control signal S02 to the optical pickup 3 in such a manner that the optical pickup 3 is moved to this area.

When the movement of the optical pickup 3 to the desired position is completed at Step F0605, the microcontroller 43 performs recording of test recording marks such as random data for use as evaluation data on the optical disk 1 in accordance with the write strategy determined at Step F0603 (F0606). At Step F0606, the microcontroller 43 outputs a laser pulse control signal S08 to the laser pulse control circuit 46 in such a manner that recording is performed with the write strategy determined at Step F0603. In response to the laser pulse control signal S08, the laser pulse control circuit 46 outputs a laser pulse control signal S03 to the optical pickup 3 at a predetermined address position on the optical disk 1 to thereby perform recording of a predetermined size.

When the execution of the recording of the predetermined size is completed at Step F0606, the microcontroller 43 determines whether the recording of the evaluation data about all the adjustable widths determined at Step F0602 has been completed (F0607). When it is determined at Step F0607 that the recording of the evaluation data about all the adjustable widths has not been completed, the microcontroller 43 returns to Step F0603, where a write strategy corresponding to a last pulse width Lt at which the recording has not been completed is generated, and the recording of evaluation data of a predetermined size is performed again (F0603 through F0606). At this time, the recording area on the optical disk in which data is recorded is an area different from a recording area in which data is recorded with the first adjustable width.

When it is determined at Step F0607 that the recording of the evaluation data about all the adjustable widths has been completed, the microcontroller 43 performs the playback of the evaluation data by processing subsequent to Step F0608. First, the microcontroller 43 executes control on the number of revolutions of the motor at playback (F0608). At Step F0608, the microcontroller 43 outputs a motor control signal S09 to the motor control circuit 47 in such a manner that a predetermined playback speed is reached. Then the motor control circuit 47 outputs, in response to the motor control signal S09, a motor control signal S01 for controlling the number of revolutions of the spindle motor 2 to the spindle motor 2 in such a manner that the predetermined reproduction speed is reached.

When the control of the number of revolutions of the spindle motor 2 to the desired number of revolutions is completed at Step F0608, the microcontroller 43 executes control on the position of the optical pickup at reproduction (F0609). At Step F0609, the microcontroller 43 outputs a position control signal S07 to the position control circuit 45 in such a manner that the optical pickup 3 is moved to its corresponding area of the optical disk 1 in which the recording has been completed. In response to the position control signal S07, the position control circuit 45 outputs a position control signal S02 to the optical pickup 3 in such a manner that the optical pickup 3 is moved to this area.

When the processing of the position control at Step F0609 is ended, the microcontroller 43 reproduces the optical disk 1 and executes a signal quality measurement (F0610). At Step F0610, the microcontroller 43 outputs a laser pulse control signal S08 to the laser pulse control circuit 46 to execute reproduction for performing signal quality evaluation. In response to the laser pulse control signal S08, the laser pulse control circuit 46 outputs a laser pulse control signal S03 to the optical pickup 3 at a predetermined address position on the optical disk 1 to carry out the reproduction. That is, the optical pickup 3 applies laser onto the optical disk 1 and receives light reflected from the optical disk 1, and converts the reflected light into an electric signal S04 and outputs the same to the AFE 41 of the signal processing LSI 4. The AFE 41 executes analog signal processing such as the amplification of the electric signal S04 to thereby generate an analog signal S05 and outputs it to the signal quality measuring circuit 42. The signal quality measuring circuit 42 measures a jitter of the analog signal S05 to calculate the result of measurement and outputs measurement result information S06 to the microcontroller 43. Then, the microcontroller 43 stores the measurement result information S06 in the memory 44.

When the processing of the signal quality measurement at Step F0610 is ended, the microcontroller 43 determines whether all signal quality measurements in the adjustable width range decided at Step F0602 have been completed (F0611). When it is determined at Step F0611 that all the signal quality measurements in the adjustable width range have not been completed, the microcontroller 43 returns to Step F0608, where uncompleted signal quality measurements of evaluation data are carried out.

On the other hand, when it is determined at Step F0611 that all the signal quality measurements in the adjustable width range have been completed, the last pulse width Lt is decided (F0612). Concretely, the microcontroller 43 reads the measurement result information stored in the memory 44 and determines the last pulse width Lt, based on the read measurement result information. A method of determining the last pulse width Lt will be explained in detail using FIG. 9.

Figure 13:
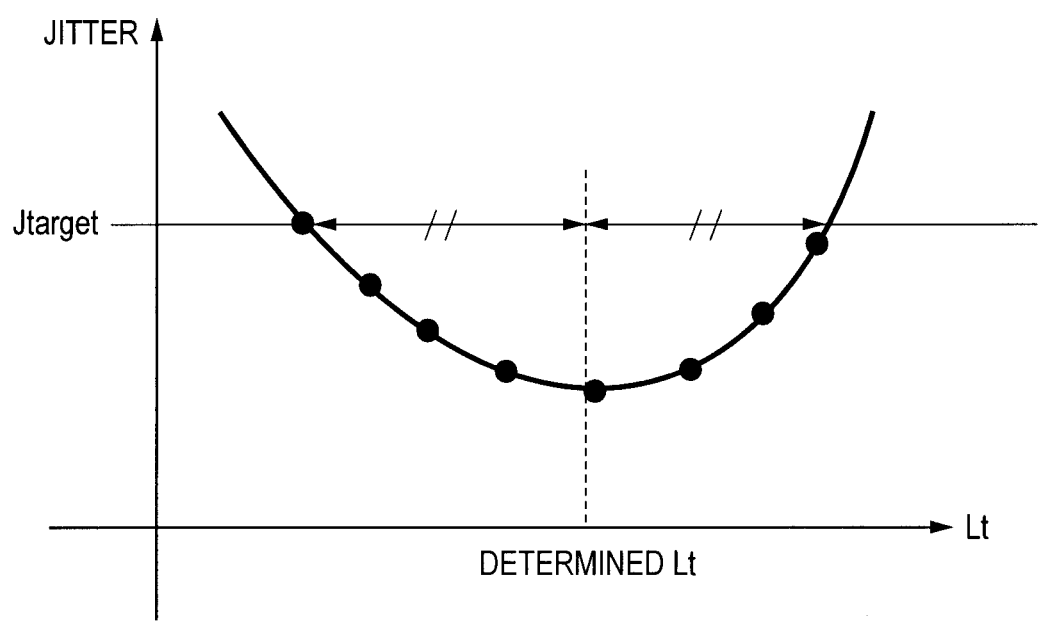
FIG. 13 is an explanatory diagram illustrating the concept of a method for determining the last pulse width Lt.

FIG. 13 is an explanatory diagram illustrating the concept of a method for determining the last pulse width Lt. In the same drawing, the horizontal axis indicates the last pulse width Lt, and the vertical axis indicates the jitter. Jtarget is a target jitter value as described above.

When recording is performed while changing the last pulse width Lt, such a jitter vs. last pulse width Lt characteristic as shown in the same figure is obtained. At Step F0612, for example, a central value in the range of the last pulse width Lt in which a jitter value not greater than Jtarget can be taken, is determined as a desired last pulse width Lt. Thus, a write strategy at which a last pulse width Lt most suitable for a target recording mark is brought about, is determined as a third adjustment write strategy. Incidentally, at Step F0612, it is also possible to acquire the characteristic of a jitter vs. last pulse width Lt, calculate a last pulse width Lt at which the jitter becomes a minimum value, from an approximated curve analogous to the characteristic and determine a write strategy corresponding to the calculated last pulse width Lt as the optimum write strategy.

When the process of determining Lt at Step F0612 is ended, the microcontroller 43 determines whether an Lt adjustment to all of recording marks formed by recording strategies of laser pulses each including a last pulse locate at the end of a laser pulse waveform has been completed (F0613). When it is determined at Step F0613 that the Lt adjustment has not been completed, the microcontroller 43 proceeds to Step F0601 to adjust the last pulse width Lt of each unadjusted recording mark and executes processing similar to the above. On the other hand, when it is determined at Step F0613 that the Lt adjustment has been completed, the processing of the Lt adjustment is ended.

According to the above Lt adjustment, the edge shift amount is adjusted by each of the fine adjustment I and the fine adjustment II, and further the last pulse width Lt is adjusted in such a manner that the jitter of the specific target edge formed by the laser pulse waveform including the last pulse becomes small. It is therefore possible to generate a write strategy capable of recording higher in quality.

(7) Fine Adjustment II (After Lt Adjustment)

The microcontroller 43 performs again the fine adjustment II on the third adjustment write strategy at which the last pulse width Lt is optimized by the Lt adjustment of Step F06. A concrete processing method is similar to (5) fine adjustment II referred to above.

When an edge shift amount of a rear-end edge of a recording mark is adjusted by the first fine adjustment II as well as an edge shift amount of a front-end edge thereof, there is a possibility that the rear-end edge of the recording mark will be slightly shifted from the optimum value due to the adjustment of the pulse width Lt of the last pulse by the Lt adjustment. Therefore, the fine adjustment II is performed based on the write strategy subsequent to the Lt adjustment, thereby making it possible to generate a write strategy capable of recording higher in quality.

The write strategy adjusted by the corresponding processing is determined as a fourth adjustment write strategy.

(8) Target Beta Adjustment

Figure 14:
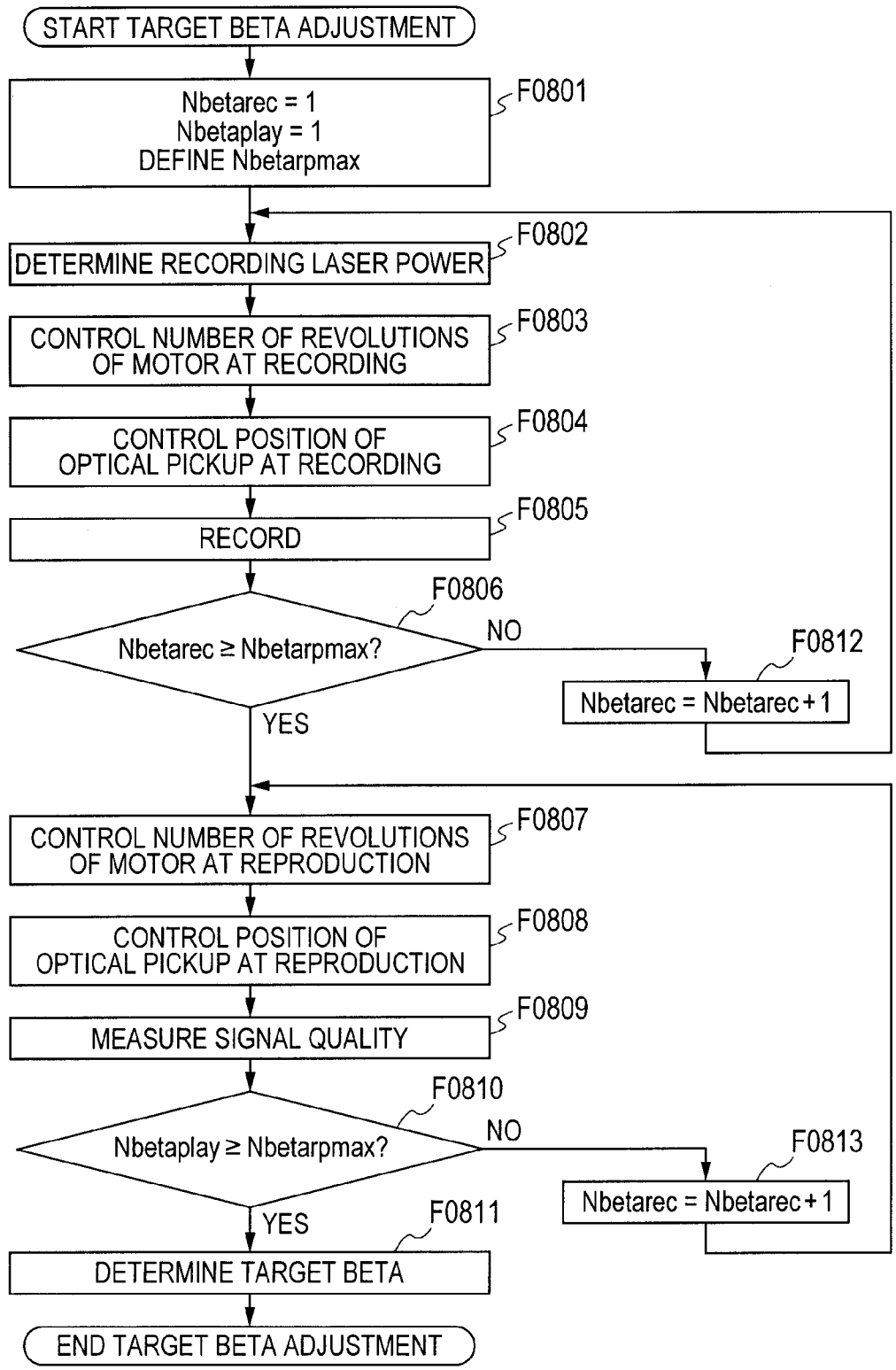
FIG. 14 is a flow diagram showing one example of a flow of a target beta adjustment.

FIG. 14 is a flow diagram showing one example of a flow of a target beta adjustment.

First, the microcontroller 43 resets the value of a number-of-times-of-recording counter Nbetarec and the value of a number-of-times-of-reproduction counter Nbetaplay to "1" respectively and defines the maximum number-of-times-of-recording/reproduction Nbetarpmax that defines the number of times that recording and playback are performed (F0801). The value of the maximum number-of-times-of-recording/reproduction Nbetarpmax is stored in a register or the like, for example.

Next, the microcontroller 43 determines recording laser power (recording power Pw) (F0802). Concretely, the microcontroller 43 selects any recording laser power within the range of the recording laser power determined at Step F010204 for the above coarse adjustment, for example (See FIG. 9). The microcontroller 43 generates a write strategy in which the parameter value of the recording power Pw at the fourth adjustment write strategy adjusted at Step F07 is changed to a value corresponding to the selected recording laser power.

Next, the microcontroller 43 executes control on the number of revolutions of the motor at recording (F0803). At Step F0803, the microcontroller 43 outputs a motor control signal S09 to the motor control circuit 47 in such a manner that a predetermined recording speed is reached. In response to the motor control signal S09, the motor control circuit 47 outputs a motor control signal S01 for controlling the number of revolutions of the spindle motor 2 to the spindle motor 2 in such a manner that the predetermined recording speed is reached.

When the control of the number of revolutions of the spindle motor 2 to the desired number of revolutions is completed at Step F0803, the microcontroller 43 executes control on the position of the optical pickup at recording (F0804). At Step F0804, the microcontroller 43 outputs a position control signal S07 to the position control circuit 45 in such a manner that the optical pickup 3 is moved to its corresponding area of the optical disk 1 on which recording for carrying out the target beta adjustment is performed. In response to the position control signal S07, the position control circuit 45 outputs a position control signal SO2 to the optical pickup 3 in such a manner that the optical pickup 3 is moved to this area.

When the movement of the optical pickup 3 to the desired position is completed at Step F0804, the microcontroller 43 performs recording of test recording marks such as random data for use as evaluation data on the optical disk 1 in accordance with the write strategy adjusted in recording laser power at Step F0802 (F0805). At Step F0805, the microcontroller 43 outputs a laser pulse control signal S08 to the laser pulse control circuit 46 in such a manner that recording is performed in accordance with the write strategy adjusted in recording laser power at Step F0802. In response to the laser pulse control signal S08, the laser pulse control circuit 46 outputs a laser pulse control signal S03 to the optical pickup 3 at a predetermined address position on the optical disk 1, so that recording of a predetermined size is carried out.

When the recording of the predetermined size is completed at Step F0805, the microcontroller 43 executes a comparison between the number-of-times-of-recording counter Nbetarec and the maximum number-of-times-of-recording/reproduction Nbetarpmax (F0806). If the value of the number-of-times-of-recording counter Nbetarec is smaller than the maximum number-of-times-of-recording/reproduction Nbetarpmax, the microcontroller 43 increments the number-of-times-of-recording counter Nbetarec by "1" (F0812) and returns to Step F0802 to change the recording power Pw and perform recording of evaluation data of a predetermined size again (F0802 through F0805). At this time, the recording area on the optical disk in which the data is recorded is an area different from the recording area recorded with the first recording power Pw.

On the other hand, if the value of the number-of-times-of-recording counter Nbetarec is larger than or equal to the maximum number-of-times-of-recording/reproduction Nbetarpmax at Step F0806, the microcontroller 43 determines that recording based on the predetermined laser power range has been ended, and reproduces evaluation data recorded after Step F0807.

At the reproduction of the evaluation data, the microcontroller 43 executes control on the number of revolutions of the motor at playback (F0807). At Step F0807, the microcontroller 43 outputs a motor control signal S09 to the motor control circuit 47 in such a manner that a predetermined reproduction speed is reached. In response to the motor control signal S09, the motor control circuit 47 outputs a motor control signal S01 for controlling the number of revolutions of the spindle motor 2 to the spindle motor 2 in such a manner that the predetermined reproduction speed is reached.

When the control of the number of revolutions of the spindle motor 2 to the desired number of revolutions is completed at Step F0807, the microcontroller 43 executes control on the position of the optical pickup at reproduction (F0808). At Step F0808, the microcontroller 43 outputs a position control signal S07 to the position control circuit 45 in such a manner that the optical pickup 3 is moved to its corresponding area of the optical disk 1 on which recording for the target beta adjustment is performed. In response to the position control signal S07, the position control circuit 45 outputs a position control signal S02 to the optical pickup 3 in such a manner that the optical pickup 3 is moved to this area.

When the processing of the pickup position control at Step F0808 is ended, the microcontroller 43 reproduces the optical disk 1 and executes a signal quality measurement (F0809). Concretely, the microcontroller 43 outputs a laser pulse control signal S08 to the laser pulse control circuit 46 to execute reproduction for performing signal quality evaluation. In response to the laser pulse control signal S08, the laser pulse control circuit 46 outputs a laser pulse control signal S03 to the optical pickup 3 at a predetermined address position on the optical disk 1 to carry out the reproduction. The optical pickup 3 applies laser onto the optical disk 1 and receives light reflected from the optical disk 1, and converts the reflected light into an electric signal S04 and outputs the same to the AFE 41 of the signal processing LSI 4. The AFE 41 executes analog signal processing such as the amplification of the electric signal S04 to thereby generate an analog signal S05 and outputs it to the signal quality measuring circuit 42. The signal quality measuring circuit 42 measures a jitter, beta and PI error of the analog signal S05 to calculate the result of measurement and outputs measurement result information S06 to the microcontroller 43. The microcontroller 43 stores the measurement result information S06 in the memory 44.

When the signal quality measurement of Step F0809 is ended, the microcontroller 43 performs a comparison between the number-of-times-of-reproduction counter Nbetaplay and the maximum number-of-times-of-recording/reproduction Nbetarpmax (F0810). If it is determined at Step F0809 that the value of the number-of-times-of-reproduction counter Nbetaplay is smaller than the maximum number-of-times-of-recording/reproduction Nbetarpmax, the microcontroller 43 increments the number-of-times-of-reproduction counter Nbetaplay by "1" (F0813) and returns to Step F0807, where a signal quality measurement for evaluation data recorded based on a write strategy of another recording power Pw is executed (F0807 through F0809).

On the other hand, if the value of the number-of-times-of-reproduction counter Nbetaplay is larger than or equal to the maximum number-of-times-of-recording/reproduction Nbetarpmax at Step F0810, signal quality measurement results based on all recording laser power (recording power Pw) determined at Step F0802 are acquired. Therefore, the microcontroller 43 then starts the process of determining a target beta (F0811). A method of determining the target beta at Step F0811 will be explained in detail using FIG. 15.

Figure 15:
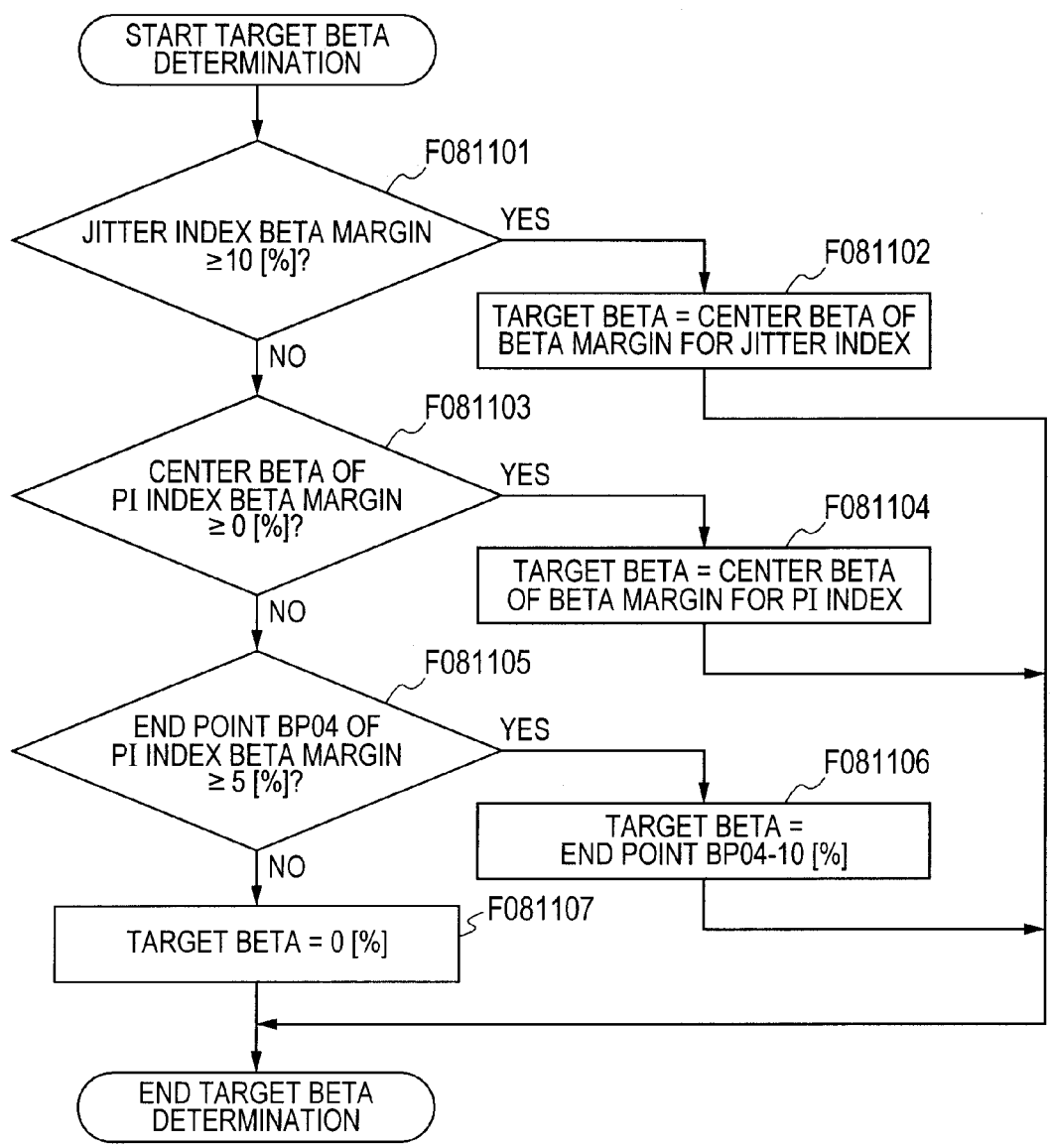
FIG. 15 is a flow diagram illustrating one example of a flow of target beta determination processing at Step F0811.

FIG. 15 is a flow diagram illustrating one example of a flow of target beta determination processing at Step F0811.

First, the microcontroller 43 reads the measurement result information S06 measured at Step F0809 of FIG. 14 from the memory 44, calculates a beta margin BJ02 for a jitter index, and determines whether the beta margin is greater than or equal to 10% (F081101).

Figure 16:
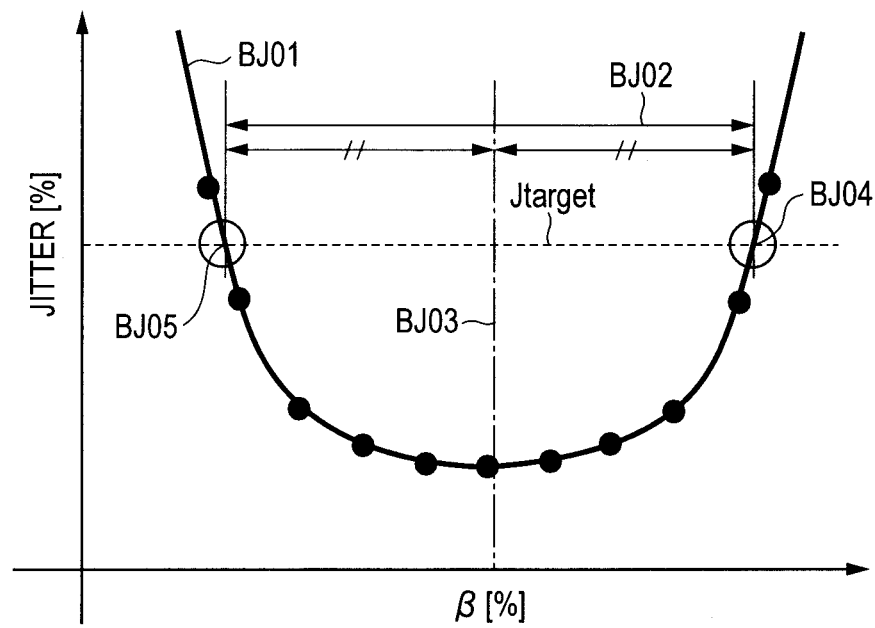
FIG. 16 is an explanatory diagram showing the concept of a beta margin for a jitter index.

A conceptual diagram of a beta margin for a jitter index is shown in FIG. 16. In the same drawing, the horizontal axis indicates a beta, and the vertical axis indicates a jitter. Reference numeral BJ01 indicates an approximated curve showing an entire jitter vs. beta characteristic based on the entire jitter of target edges target for evaluation within the measurement result information obtained prior to Step F8011. Reference numeral BJ02 indicates a beta margin indicative of a range of a beta less than or equal to a target jitter Jtarget. Reference numeral BJ03 indicates a center beta indicative of the center value of the beta margin BJ02. Reference numerals BJ04 and BJ05 are points where the approximated curve BJ01 and Jtarget intersect. The reference numeral BJ04 indicates a point having a larger beta value, and the reference numeral BJ05 indicates a point having a smaller beta value.

If it is determined at Step F081101 that the beta margin BJ02 is greater than or equal to 10%, the target beta is determined to be the center beta BJ03 at Step F081102, and the process of determining the target beta is ended. On the other hand, if it is determined that the beta margin BJ02 is less than 10[%], the microcontroller 43 reads the measurement result information S06 measured at Step F0809 of FIG. 14 from the memory 44, calculates a beta margin BJ03 for a PI error index, and determines whether the beta margin is greater than or equal to 0% (F081103).

Figure 17:
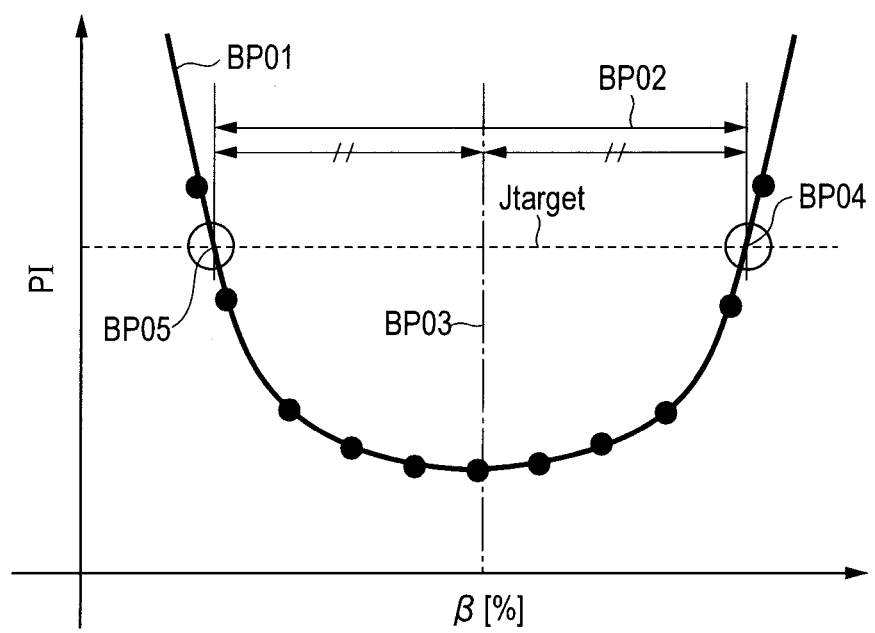
FIG. 17 is an explanatory diagram illustrating the concept of a beta margin for a PI error index.

A conceptual diagram of a beta margin for a PI error index is shown in FIG. 17. In the same figure, the horizontal axis indicates a beta, and the vertical axis indicates a PI error. Reference numeral BP01 indicates an approximated curve showing a PI error vs. beta characteristic based on a PI error of a target edge target for evaluation within the measurement result information obtained prior to Step F8011. Reference numeral BP02 indicates a beta margin indicative of a range of a beta less than or equal to a target jitter Jtarget. Reference numeral BP03 indicates a center beta indicative of the center value of the beta margin BP02. Reference numerals BP04 and BP05 are points where the approximated curve BP01 and Jtarget intersect. The reference numeral BP04 indicates a point having a larger beta value, and the reference numeral BP05 indicates a point having a smaller beta value.

If it is determined at Step F081103 that the center beta BP03 is greater than or equal to 0%, the microcontroller 43 determines a target beta as the center beta BP03 at Step F081104 and ends the process of determining the target beta.

On the other hand, if it is determined that the beta margin BP02 is less than 0[%], the microcontroller 43 determines whether the value of the point BP04 between the approximated curve BP01 and Jtarget is greater than or equal to 5% at the PI error vs. beta characteristic shown in FIG. 17 (F081105). If it is determined at Step F081105 that the BP04 is greater than or equal to 5[%], the microcontroller 43 determines a target beta as a value obtained by subtracting 5% from the BP04 at Step F081106 and ends the process of determining the target beta.

When it is determined at Step F081105 that the value of the BP04 is less than 5[%], the microcontroller 43 determines a target beta as 0% at Step F081107 and ends the process of determining the target beta.

According to the target beta determination processing as described above, the edge shift amounts are adjusted by the fine adjustment I and the fine adjustment II. Thus, even when the recording laser power set at the coarse adjustment is slightly shifted from the optimum value, the write strategy that provides the optimum recording power can be generated by determining the target beta after the fine adjustment I and the fine adjustment II. Incidentally, in the above description, in order to cope with degradation of recording quality, which is caused by an OPC error during the recording of data, the threshold values used for judgment criterion at Steps F081102, F081104 and F081106 are defined as described above in consideration of the fact that the beta margin BJ02 is set so as to be ensured to be 10% or more, the lower limit value BJ03 of the target beta is set to 0%, and the beta margin on the positive side is set so as to be ensured to be 5% or more, but are not limited to it.

According to the optical disk apparatus 100 according to the first embodiment as described above, the write strategy is adjusted by the coarse adjustment and the fine adjustment I in consideration of the recording quality of the entire recording mark. Further, the edge shift amounts of the individual recording marks like the long marks low in appearance rate are selectively adjusted by the fine adjustment II. It is thus possible to efficiently generate the write strategy at which recording quality can be made high as the entire recording mark, and the recording quality of each individual recording mark can also be made high. Further, the write strategy higher in recording quality can be generated by executing the Lt adjustment, the target beta adjustment and the second fine adjustment II.

After the optimum write strategy has been generated at Step F08 (see FIG. 6), the corresponding write strategy can also be held in the memory 44. According to it, the write strategy adjustment processing of FIG. 6 can be omitted at the startup subsequent to the next time, of the system by power-on of the optical disk apparatus 100, or the like, and recording can be done using the optimum write strategy stored in the memory 44. Further, information (e.g., information about the difference in the edge shift amount related to the combination of each mark length and each space length) may be stored in the memory 44 without storing the optimum write strategy itself in the memory 44.

Second Embodiment

Figure 18:
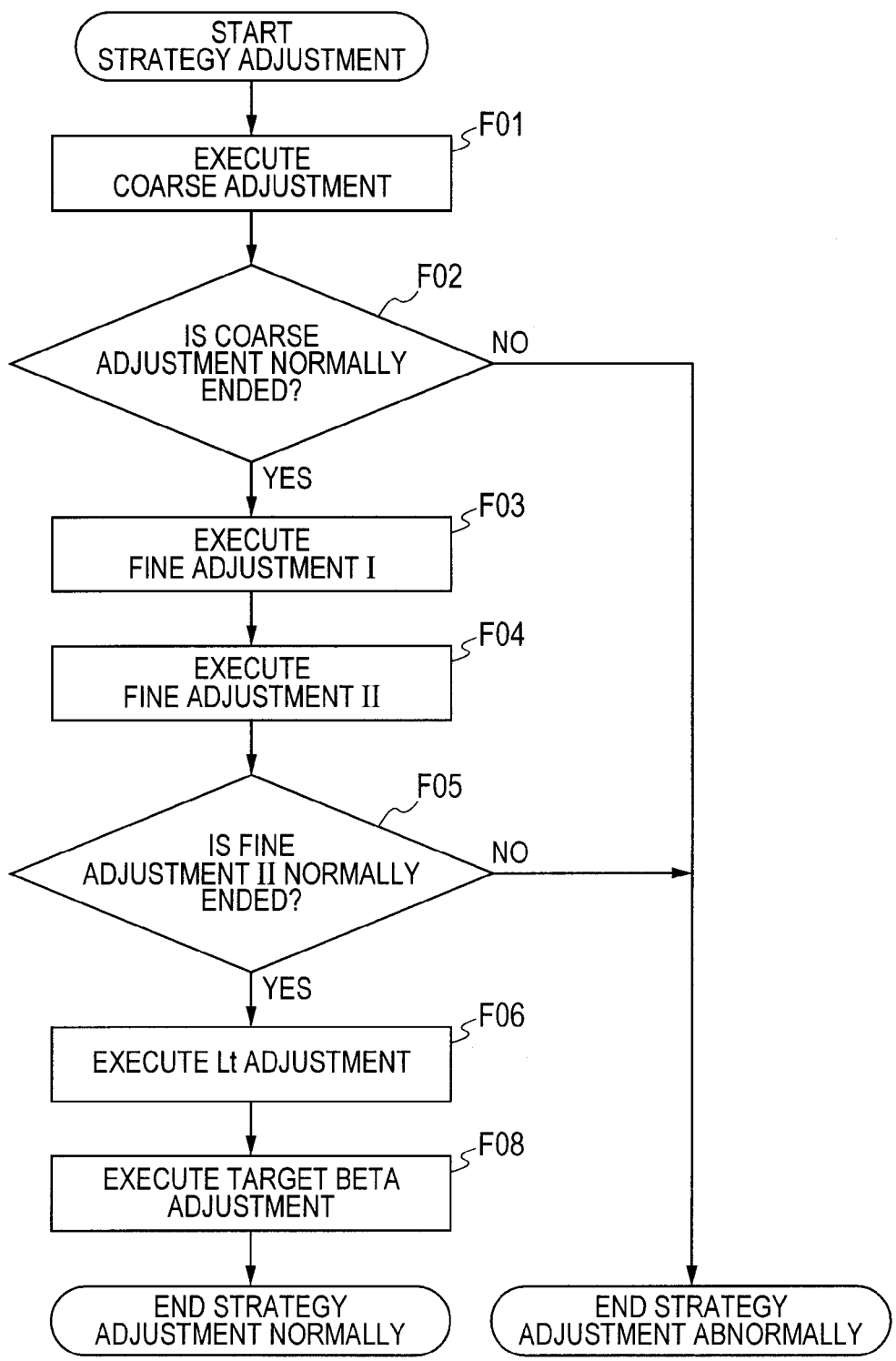
FIG. 18 is a flow diagram showing another example of a flow of processing for a write strategy adjustment according to a second embodiment.

FIG. 18 is a flow diagram showing another example of a flow of processing for a write strategy adjustment in the optical disk apparatus 100. The processing flow shown in the same drawing is illustrated as a processing flow based on software processing of the microcontroller 43, but some or all of the processing can also be achieved by dedicated hardware.

The write strategy adjustment according to the second embodiment is different from the write strategy adjustment according to the first embodiment shown in FIG. 6 in that the processing of the second fine adjustment II (F07) is not performed. That is, in the write strategy adjustment according to the second embodiment, the fine adjustment II is not performed after the Lt adjustment of Step F06, and the target beta adjustment is executed without first executing the second fine adjustment II, as seen in the first embodiment flow diagram of FIG. 6. The write strategy adjustment according to the second embodiment is similar in other processing to the write strategy adjustment according to the first embodiment.

The method of adjusting the write strategy according to the second embodiment is effective particularly in executing an adjustment to a write strategy corresponding to an optical disk good in quality even within a number of optical disks each having a difference in quality. That is, the second fine adjustment II is omitted with respect to the optical disk good in quality, and a processing load at the write strategy adjustment is reduced, thereby making it possible to generate a write strategy good in recording quality efficiently.

Third Embodiment

Figure 19:
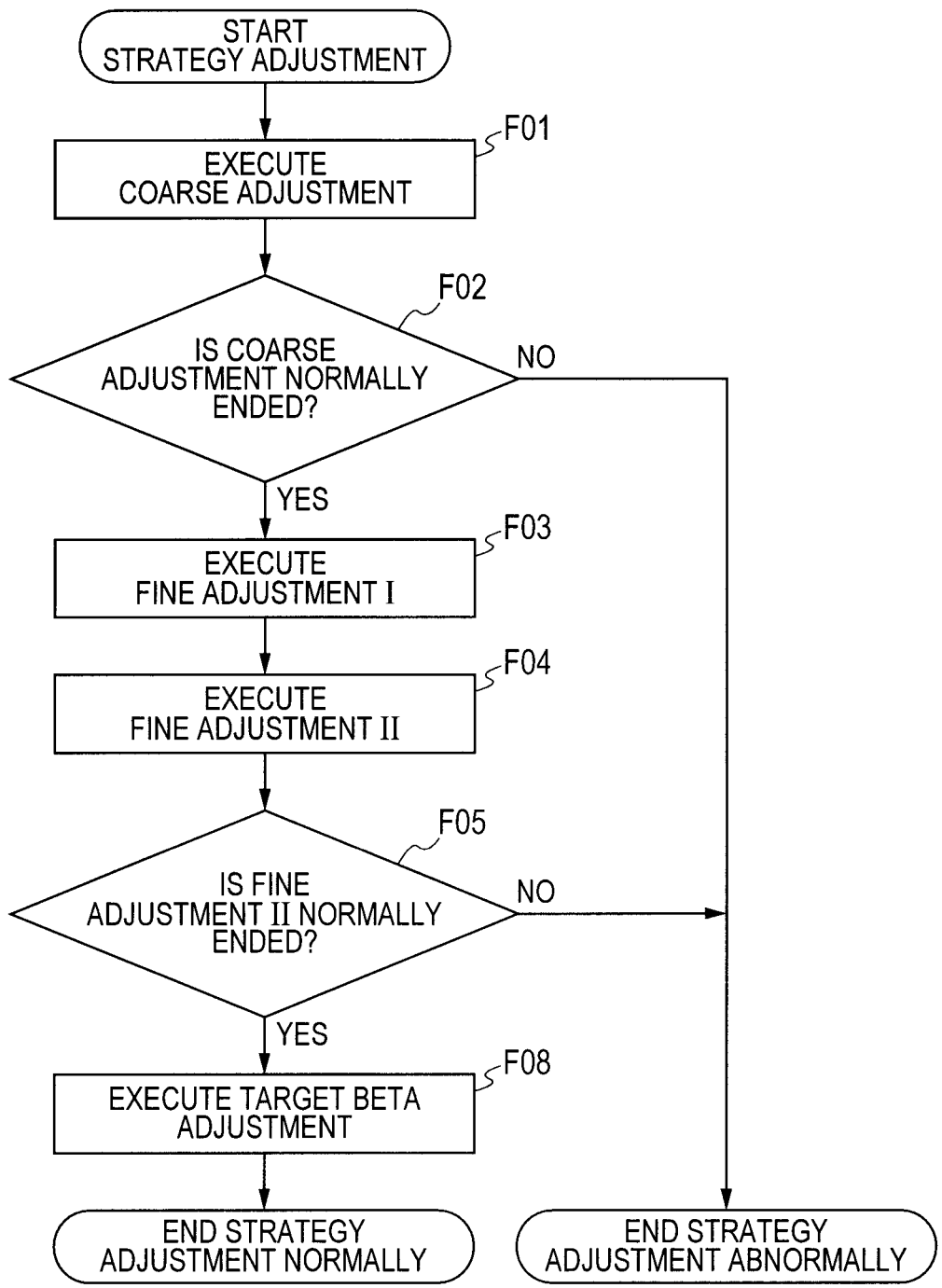
FIG. 19 is a flow diagram illustrating another example of a flow of processing for a write strategy adjustment according to a third embodiment.

FIG. 19 is a flow diagram illustrating another example of a flow of processing for a write strategy adjustment in the optical disk apparatus 100. The processing flow shown in the same drawing is illustrated as a processing flow based on software processing of the microcontroller 43, but some or all of the processing can also be achieved by dedicated hardware.

The write strategy adjustment according to the third embodiment is different from the write strategy adjustment according to the first embodiment shown in FIG. 6 in that both the Lt adjustment (F06) and the processing of the second fine adjustment II (F07) are not performed. That is, in the write strategy adjustment according to the third embodiment, the Lt adjustment is not performed after the first fine adjustment II, and the target beta adjustment is executed without executing the second fine adjustment II. The write strategy adjustment according to the third embodiment is similar in other processing to the write strategy adjustment according to the first embodiment.

The method of adjusting the write strategy according to the third embodiment is effective particularly in executing an adjustment to a write strategy not including a last pulse at recording. A processing load at the write strategy adjustment is reduced and thereby a write strategy good in recording quality can efficiently be adjusted.

Fourth Embodiment

Figure 20:
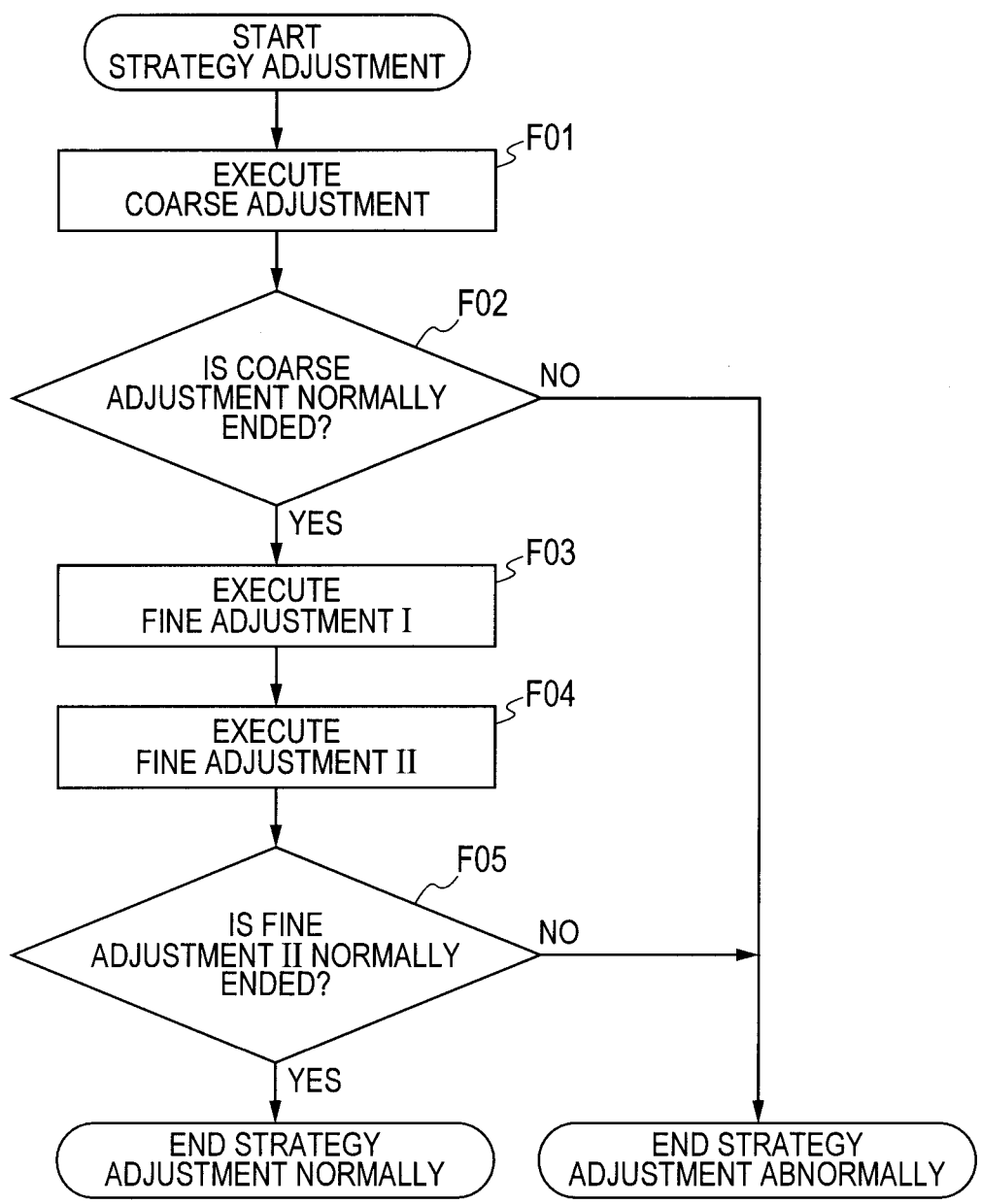
FIG. 20 is a flow diagram showing another example of a flow of processing for a write strategy adjustment according to a fourth embodiment.

FIG. 20 is a flow diagram showing another example of a flow of processing for a write strategy adjustment in the optical disk apparatus 100. The processing flow shown in the same drawing is illustrated as a processing flow based on software processing of the microcontroller 43, but some or all of the processing can also be achieved by dedicated hardware.

The write strategy adjustment according to the fourth embodiment is different from the write strategy adjustment according to the first embodiment shown in FIG. 6 in that al three of the processing of the Lt adjustment (F06), the second fine adjustment II (F07) and the target beta adjustment (F08) are not performed. That is, in the write strategy adjustment according to the fourth embodiment, the processing of the write strategy adjustment is normally ended if it is determined that the fine adjustment II is normally ended after the (first and only) fine adjustment II. The write strategy adjustment according to the fourth embodiment is similar in other processing to the write strategy adjustment according to the first embodiment.

According to the method of adjusting the write strategy according to the fourth embodiment, a processing load at the write strategy adjustment can be more reduced, and a write strategy can be adjusted in a shorter period of time.

Fifth Embodiment (1) Configuration of Optical Disk Apparatus

Figure 21:
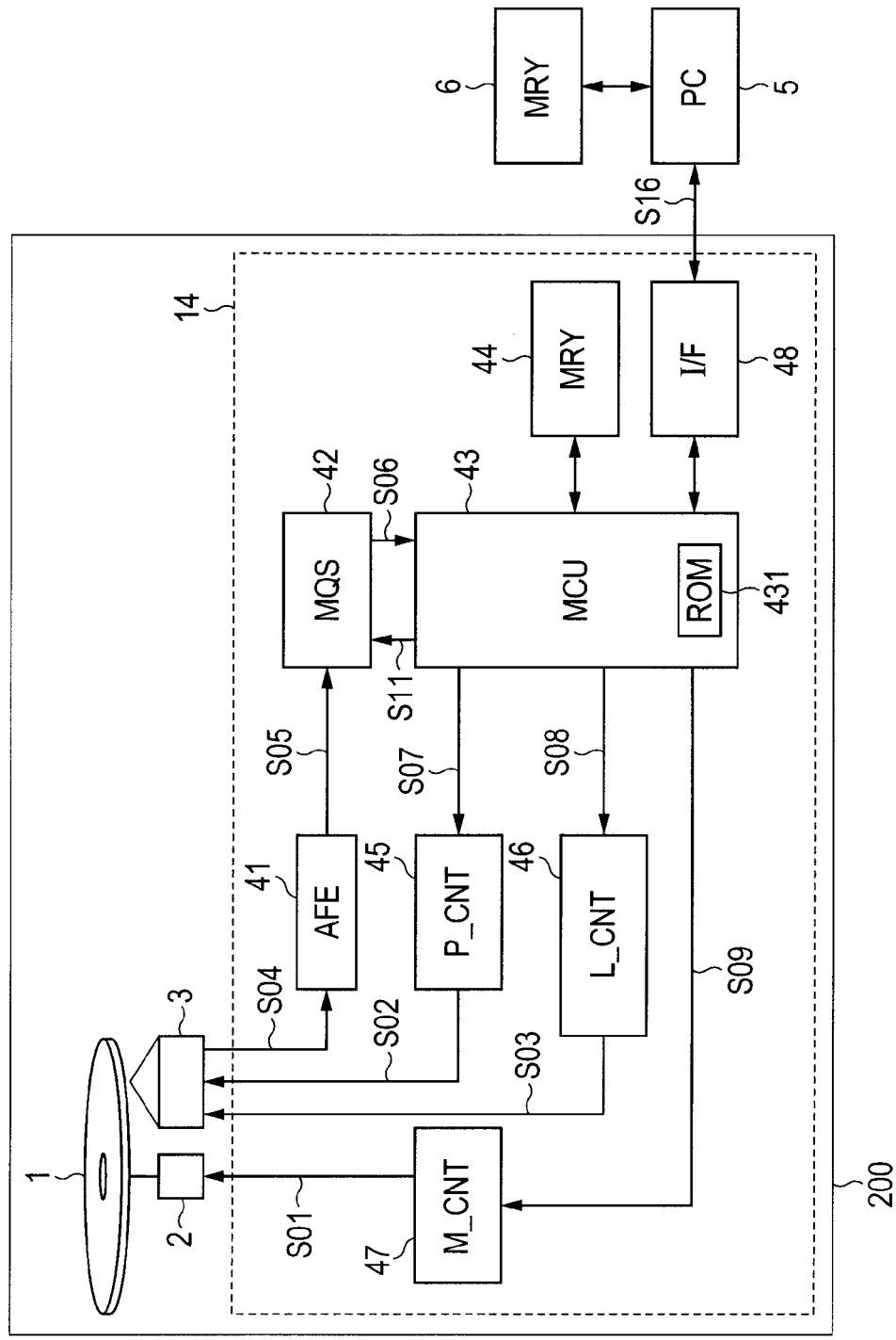
FIG. 21 is a block diagram depicting one example of a configuration of an optical disk apparatus 200 according to a fifth embodiment.

FIG. 21 is a block diagram showing one example of a configuration of an optical disk apparatus according to a fifth embodiment. The same reference numerals are respectively attached to components similar to those in the optical disk apparatus 100 according to the first embodiment of FIG. 1, and their detailed description will be omitted.

The optical disk apparatus 200 shown in the same figure performs writing and reading of data in and from an optical disk 1 in a manner similar to the optical disk apparatus 100 according to the first embodiment, but is capable of communication using an external host PC 5 and a communication path S16 of a standard communication system via an interface circuit (I/F) 48 provided thereinside. The communication path S16 includes, for example, SATA (Serial ATA), a USB (Universal Serial Bus), IEEE1394 or the like. A memory 6 is provided with, for example, a volatile memory such as a synchronous dynamic random access memory (SDRAM) or the like, or a non-volatile memory such as a flash memory or the like. The memory 6 stores therein, for example, a standard initial strategy, data about the result of data processing by the host PC 5, and a software program comprising program code, or the like.

In the first through fourth embodiments, the microcontroller 43 of the optical disk apparatus 100 has principally achieved the write strategy adjustment processing. In the fifth embodiment, however, the process of adjusting each write strategy is achieved by cooperative processing by the host PC 5 and the optical disk apparatus 200.

The process of adjusting the write strategy according to the fifth embodiment is executed at a product evaluation stage or the like at the time of shipment of the optical disk apparatus 200, for example. The host PC 5 executes processing in accordance with a write strategy adjusting program stored in the memory 6 to control the optical disk apparatus 200, so that an adjustment to each write strategy is realized. The optimum recording strategies determined for every type of optical disk, which have been generated by the corresponding processing, are stored in an ROM 431 provided inside the microcontroller 43. When a user actually performs writing of data into an optical disk through the optical disk apparatus 200 after its shipment, the microcontroller 43 of the optical disk apparatus 200 reads a write strategy corresponding to the type of mounted optical disk from the ROM 431 in response to a command or the like for the writing of data from a PC or the like, and executes the writing of data into the mounted optical disk in accordance with the read write strategy.

A method of adjusting the write strategy according to the fifth embodiment will be described below in detail with the execution of the write strategy adjustment processing shown in FIG. 6 taken as one example.

(2) Summary of Write Strategy Adjustment Method by the Optical Disk Apparatus 200 and the Host PC 5

The summary of the method of adjusting the write strategy by the optical disk apparatus 200 and the PC 5 is similar to FIG. 6 referred to above.

(3) Coarse Adjustment

A rough processing flow of a coarse adjustment by the optical disk apparatus 200 and the host PC 5 is similar to the processing flow of FIG. 8 according to the first embodiment, but the process of selecting an adjustment start strategy at Step F0102 is different from the processing of FIG. 9 according to the first embodiment. Therefore, the detailed description of processing common to the first embodiment is omitted and the processing different from that in the first embodiment will be explained.

Figure 22:
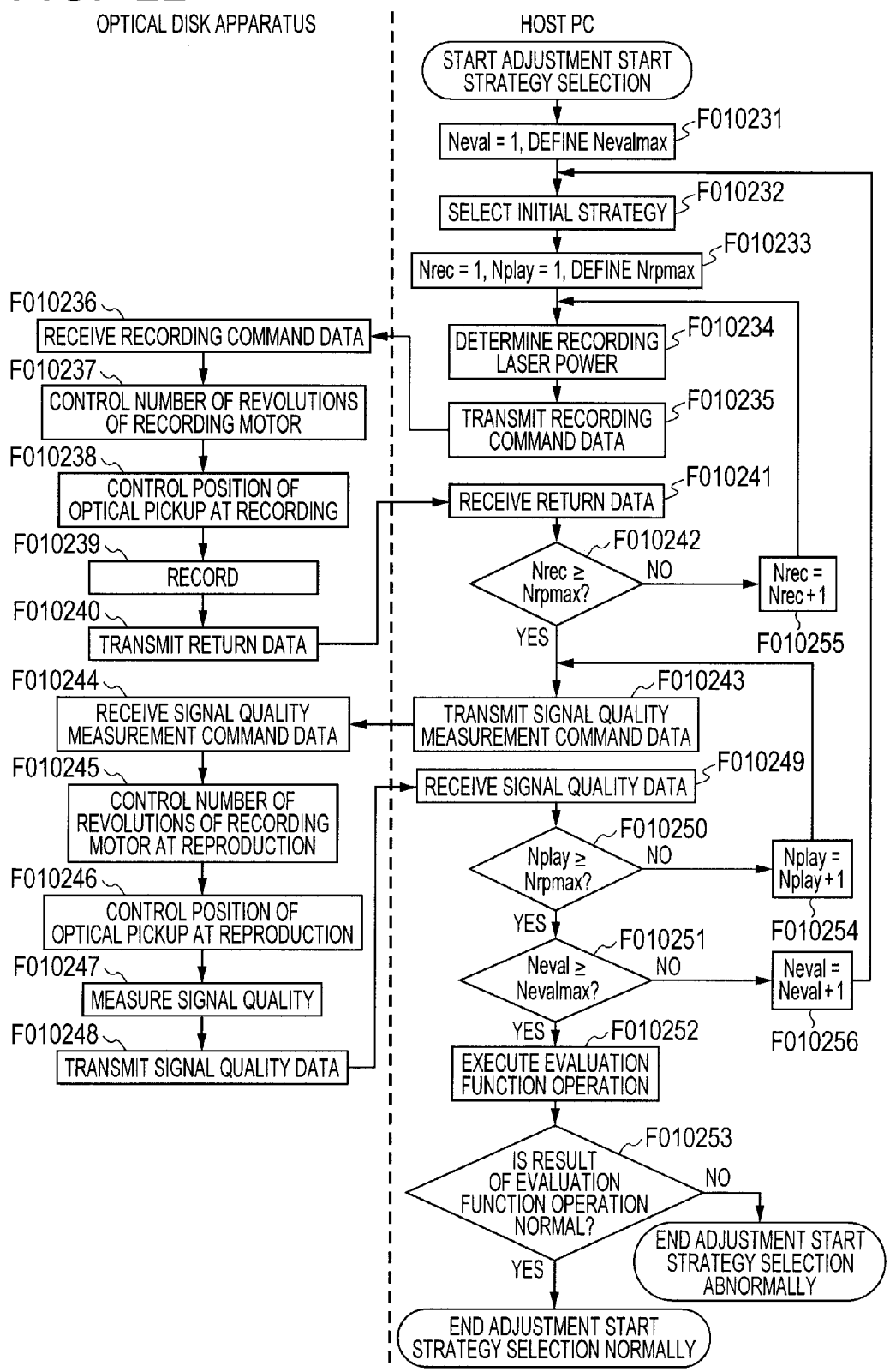
FIG. 22 is a flow diagram showing one example of a flow of processing for selection of an adjustment start strategy at a coarse adjustment in the fifth embodiment.

FIG. 22 is a flow diagram showing one example of a flow of the process of selecting an adjustment start strategy at the coarse adjustment in the fifth embodiment.

First, the host PC 5 resets a coarse adjustment counter Neval to "1" and defines a number-of-times-of-coarse adjustment maximum value Nevalmax (F010231). Next, the host PC 5 calculates a plurality of initial strategies and selects whether signal quality evaluation should be performed by any of the initial strategies (F010232). When Step F010232 is ended, the host PC 5 resets a number-of-times-of-recording counter Nrec and a number-of-times-of-reproduction counter Nplay to "1" respectively and defines the maximum number-of-times-of-recording/reproduction Nrpmax (F010233). When Step F010233 is ended, the host PC 5 determines the recording laser power (F010234).

Thereafter, the host PC 5 executes the transfer of recording command data to the optical disk apparatus 200 (F010235). At Step F010235, the host PC 5 transmits command data to the optical disk apparatus 200 to designate recording laser power, recording data, a recording speed, a recording position, a recording size and a write strategy and perform recording in a constant linear velocity (CLV) mode. Incidentally, the designation of the recording data can be done by generating and designating test recording marks such as random data for use as evaluation data. When the optical disk apparatus 200 is provided with a mode for recording the random data for use as the evaluation data in addition to the above, the host PC 5 designates this mode to enable the execution of recording of data. The designation of the recording position and the recording size can be carried out by designating a recording start address and a recording end address.

Thereafter, the microcontroller 43 of the optical disk apparatus 200 receives the recording command data transmitted at Step F010235 via the communication path S10 and the interface circuit 48 (F010236). When Step F010236 is completed, the microcontroller 43 performs control on the motor's number of revolutions and control on the position of an optical pickup at recording in a manner similar to Steps F010205 through F010207 of FIG. 9 and thereby executes the recording of recording data (F010237 through F010239). At this recording, the microcontroller 43 executes the recording of test recording marks such as random data for use as evaluation data in the optical disk 1 in accordance with the initial strategy designated by the host PC 5 at Step F010202. When the recording is completed at Step F010239, the microcontroller 43 transmits return data including information indicative of whether the recording has been successful, to the host PC 5 (F010240). The host PC 5 receives the return data therein (F010241).

When the reception of the return data by the host PC 5 is completed, the host PC 5 executes a comparison between the number-of-times-of-recording counter Nrec and the maximum number-of-times-of-recording/reproduction Nrpmax (F010242). This comparison is similar to Step F010208 of FIG. 9. If it is determined at Step F010242 that the value of the number-of-times-of-recording counter Nrec is smaller than the maximum number-of-times-of-recording/reproduction Nrpmax, the host PC 5 increments the number-of-times-of-recording counter Nrec by "1" at Step F010255. Thereafter, the host PC 5 returns to Step F010234 where different recording laser power is determined. Further, the host PC 5 performs the recording of a predetermined size on an area different from the area subjected to the recording previously at Steps F010234 through F010239.

If it is determined at Step F010242 that the value of the number-of-times-of-recording counter Nrec is larger than or equal to the maximum number-of-times-of-recording/reproduction Nrpmax, it is determined that the recording based on the predetermined laser power range has been ended. Thus, the host PC 5 executes reproduction processing in subsequent Steps. First, the host PC 5 executes transmission of command data for signal quality measurement to the optical disk apparatus 200 (F010243). In the transmission of the signal quality measurement command data, command data having designated a measurement velocity and a measurement position is transmitted to the optical disk apparatus. The optical disk apparatus 200 receives the command data for the signal quality measurement therein (F010244).

When the reception of the signal quality measurement command data by the optical disk apparatus 200 is completed, the microcontroller 43 performs control on the motor's number of revolutions at reproduction and control on the position of the optical pickup in a manner similar to Steps F010209 through F010211 of FIG. 9 to thereby execute the signal quality measurement (F010245 through F010247). At the signal quality measurement, the microcontroller 43 stores measurement result information in the memory 44 in a manner similar to Step F010211 of FIG. 9 according to the first embodiment. When the storage of the measurement result information in the memory 44 is completed, the microcontroller 43 reads the measurement result information stored in the memory 44 to generate signal quality data and transmits it to the host PC 5 via the interface circuit 48 and the communication path S10 (F010248). The host PC 5 receives the signal quality data therein (F010249).

When Step F010249 is ended, the host PC 5 executes a comparison between the number-of-times-of-reproduction counter Nplay and the maximum number-of-times-of-recording/reproduction Nrpmax (F010250). This comparison is similar to the Step F010212 of FIG. 9. When the value of the number-of-times-of-reproduction counter Nplay is smaller than the maximum number-of-times-of-recording/reproduction Nrpmax, the host PC 5 increments the number-of-times-of-reproduction counter Nplay by "1" and thereafter executes the instruction of a signal quality measurement for another recording data (F010254).

On the other hand, when the value of the number-of-times-of-reproduction counter Nplay is larger than or equal to the maximum number-of-times-of-recording/reproduction Nrpmax, the host PC 5 compares the counter Neval and the maximum value Nevalmax of the number of times that the adjustment start strategy is selected (F010251). If the value of the counter Neval is smaller than the maximum value Nevalmax at Step F010251, the host PC 5 counts up the adjustment start strategy selection counter Neval by "1" (F010256) and returns to the initial strategy selection of Step F010232.

On the other hand, if the value of the counter Neval is larger than or equal to the maximum value Nevalmax at Step F010251, the host PC 5 executes an evaluation function operation and stores the result of the evaluation function operation in the memory 6 (F010252). Its operation method is similar to Step F010214 of FIG. 9.

When the evaluation function operation of Step F010252 is ended, the host PC 5 determines whether the result of the evaluation function operation is normal (F010253). If an evaluation function Feval is 0 at all initial strategies at Step F010253, then the host PC 5 determines that the result of the evaluation function operation is abnormal and causes the adjustment start strategy selection processing (F0102) to be ended abnormally. On the other hand, if there exists even one initial strategy at which the evaluation function Feval is not 0, at Step F010253, the host PC 5 determines that the result of the evaluation function operation is normal, and selects a write strategy corresponding to the maximum evaluation function Feval as an adjustment start strategy and causes the adjustment start strategy selection processing (F0102) to be ended normally.

When the adjustment start strategy selection processing (F0102) is completed in the above procedure, the host PC 5 determines whether the adjustment start strategy is normally ended as shown in FIG. 8 (F0103). When it is determined at Step F0103 that the adjustment start strategy selection has normally been ended, the host PC 5 ends the processing of the coarse adjustment normally. On the other hand, when it is determined that the adjustment start strategy selection has abnormally been ended, the host PC 5 ends the processing of the coarse adjustment abnormally. When the processing of the coarse adjustment is abnormally ended, the coarse adjustment is determined to have abnormally been ended at Step F02 as shown in FIG. 6, and the write strategy adjustment is abnormally ended.

According to the above coarse adjustment, in a manner similar to the first embodiment, a write strategy can be generated at which recording power Pw is adjusted in such a manner that the entire jitter of target edges becomes minimal.

(4) Fine Adjustment I

Figure 23:
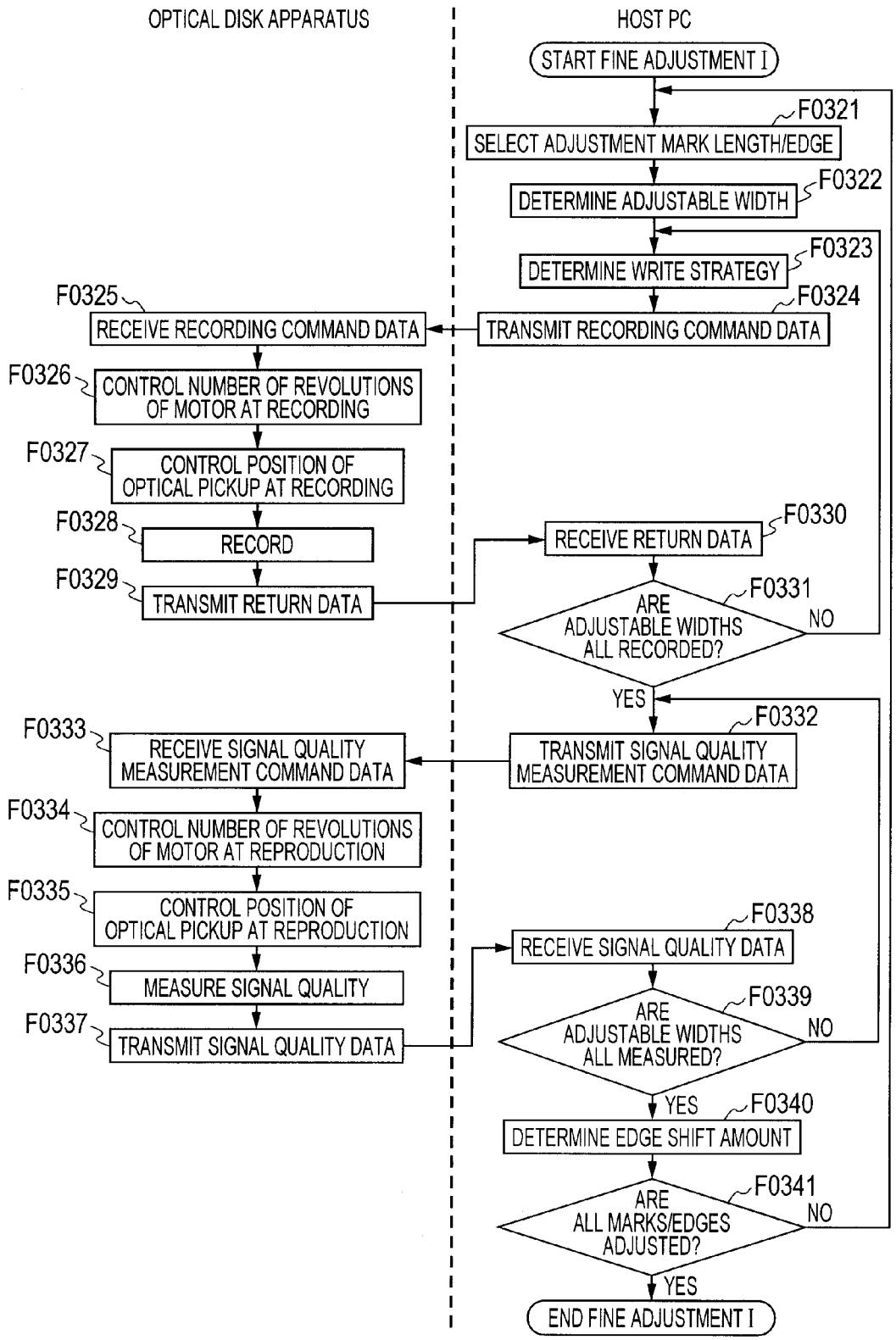
FIG. 23 is a flow diagram depicting one example of a flow of a fine adjustment I according to the fifth embodiment.

FIG. 23 is a flow diagram showing one example of a flow of a fine adjustment I according to the fifth embodiment. The fine adjustment I shown in the same figure corresponds to the fine adjustment I shown in FIG. 10 of the first embodiment, but uses the external host PC 5 seen in FIG. 21.

First, the host PC 5 selects a predetermined target edge out of a plurality of edges specified by combinations of mark lengths, forward space lengths and rearward space lengths of recording marks recorded in the optical disk 1 (F0321). The content of processing at Step F0321 is similar to Step F0101 of FIG. 10.

Next, the host PC 5 determines an adjustable width or span of an edge shift amount (front-end edge shift amount Tld, rear-end edge shift amount Ttr2) related to the target edge selected at Step F0321 (F0322). The content of processing at Step F0322 is similar to Step F0302 of FIG. 10.

After the adjustable width of the edge shift amount has been determined at Step F0322, the host PC 5 decides the edge shift amount (front-end edge shift amount Tld or rear-end edge shift amount Ttr2) related to the selected target edge within the range of the adjustable width, and determines a write strategy (F0323). The content of processing at Step F0323 is similar to Step F0303 of FIG. 10.

When the decision of the write strategy is completed at Step F0323, the host PC 5 executes the transmission of recording command data to the optical disk apparatus 200 (F0324). The write strategy at this time is designated by the write strategy determined by the host PC 5 at Step F0323. The optical disk apparatus 200 receives the recording command data through the communication path S16 (F0325).

When the recording command data is received at Step F0325, the optical disk apparatus 200 performs control on the motor's number of revolutions and control on the position of the optical pickup at recording in a manner similar to Steps F0304 to F0306 of FIG. 10 and executes the recording of test recording marks such as random data for use as evaluation data in the optical disk 1 in accordance with the write strategy determined at Step F0323 (F0326 through F0328). When the recording is completed at Step F0328, the microcontroller 43 transmits return data including information indicative of whether the recording has succeeded to the host PC 5 (F0329). The host PC 5 receives the return data therein (F0330).

Thereafter, the PC 5 determines whether recording has been completed with respect to all adjustable widths determined at Step F0322 (F0331). If it is determined at Step F0331 that the recording has not been completed with respect to all the adjustable widths, the host PC 5 returns to Step F0323 and generates recording strategies corresponding to the recording-uncompleted adjustable widths and performs the recording of evaluation data of a predetermined size again. At this time, the recording area on the optical disk in which data is recorded, is an area different from the recording area on which the recording of data is first performed with the adjustable width.

On the other hand, if it is determined at Step F0331 that the recording has been completed with respect to all the adjustable widths, the host PC 5 executes transmission of command data for signal quality measurement to the optical disk apparatus 200 (F0332). Upon the transmission of the signal quality measurement command data, command data having designated a measurement velocity and a measurement position is transmitted to the optical disk apparatus. The optical disk apparatus 200 receives the command data for the signal quality measurement therein (F0333).

When the reception of the signal quality measurement command data by the optical disk apparatus 200 is completed, the microcontroller 43 performs control on the motor's number of revolutions and control on the position of the optical pickup at reproduction in a manner similar to Steps F0308 through F0310 of FIG. 10 to thereby execute the signal quality measurement (F0334 through F0336). At the signal quality measurement, the microcontroller 43 stores measurement result information in the memory 44. When the storage of the measurement result information in the memory 44 is completed, the microcontroller 43 reads the measurement result information stored in the memory 44 to generate signal quality data and transmits it to the host PC 5 via the interface circuit 48 and the communication path S16 (F0337). The host PC 5 receives the signal quality data therein (F0338).

The host PC 5 having received the signal quality data therein determines whether the signal quality measurement for the evaluation data corresponding to all adjustable widths determined at Step F0322 has been completed (F0339). If it is determined at Step F0339 that the signal quality measurement for the evaluation data corresponding to all the adjustable widths has not been completed, the host PC 5 returns to Step F0332, where it transmits signal quality measurement command data to the optical disk apparatus in such a manner that the reproduction of evaluation data by another write strategy is carried out.

On the other hand, if it is determined that the signal quality measurement for the evaluation data corresponding to all the adjustable widths has been completed, the host PC 5 determines a write strategy that brings about the optimum edge shift amount (F0340). At Step F0340, the host PC 5 reads the measurement result information stored in the memory 6 and determines a write strategy having an adjustable width corresponding to an edge shift amount (front-end edge shift amount Tld, rear-end edge shift amount Ttr2) at which the entire jitter becomes the smallest.

When the process of determining the edge shift amount at Step F0340 is ended, the host PC 5 determines whether adjustments to the edge shift amounts have been made to all target edges (F0341). If it is determined at Step F0341 that the adjustments to the edge shift amounts have not been completed with respect to all the target edges, the host PC 5 returns to the processing subsequent to Step F0321 to adjust unadjusted mark lengths and edges, where similar processing is carried out (F0321 through F0324). On the other hand, if it is determined at Step F0341 that the adjustments to the edge shift amounts have been completed with respect to all the target edges, the processing of the fine adjustment I is ended.

According to the above fine adjustment I, in a manner similar to the first embodiment, a write strategy can be generated at which an edge shift amount is adjusted in such a manner that the entire jitter of target edges becomes minimal.

(5) Fine Adjustment II

Figure 24:
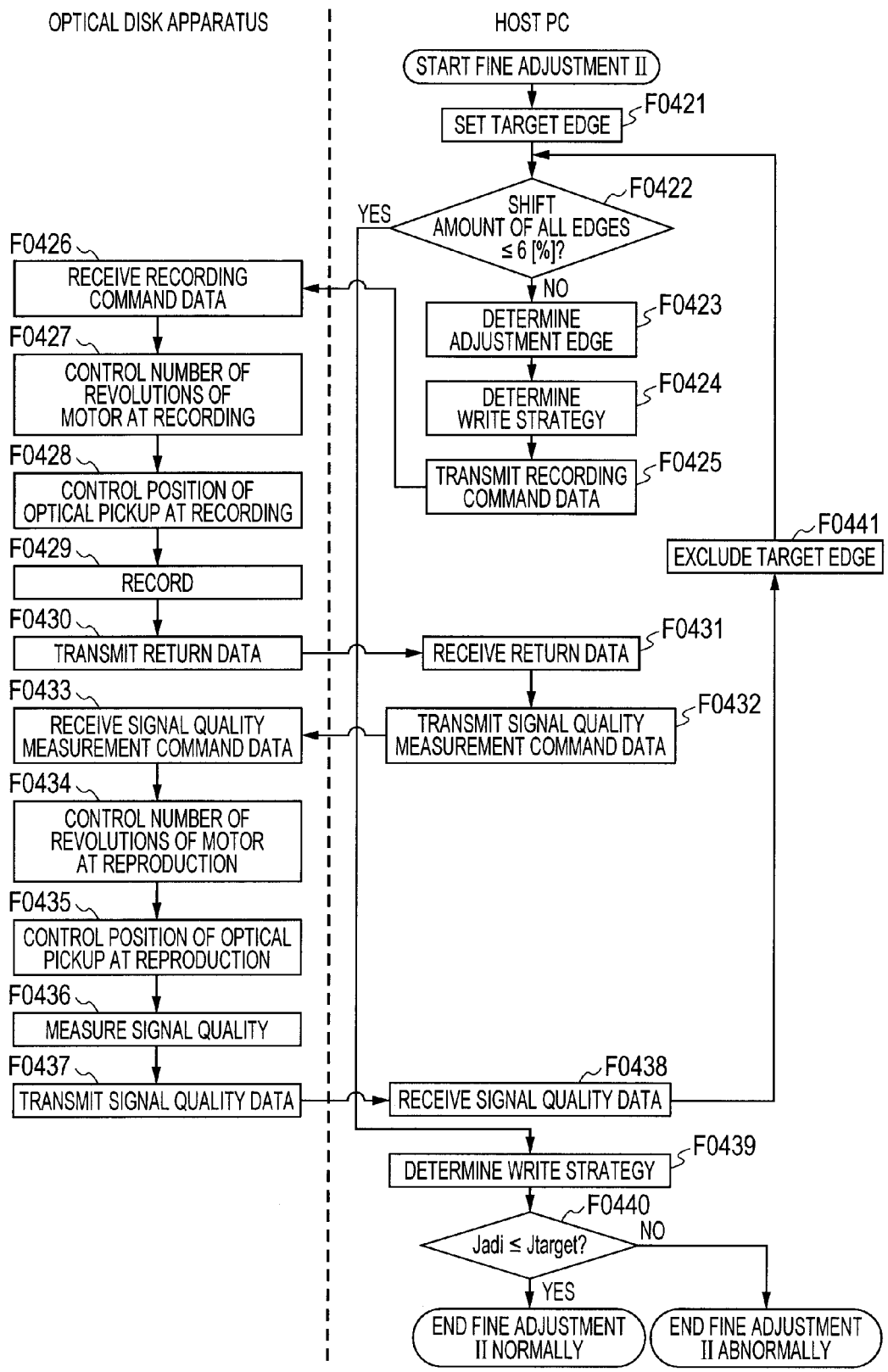
FIG. 24 is a flow diagram illustrating one example of a flow of a fine adjustment II according to the fifth embodiment.

FIG. 24 is a flow diagram showing one example of a flow of a fine adjustment II according to the fifth embodiment. The fine adjustment II shown in the same drawing corresponds to the fine adjustment II shown in FIG. 11 of the first embodiment.

In a manner similar to Steps F0401 and F0402 of FIG. 11 of the first embodiment, the host PC 5 first determines a target edge to which the fine adjustment II is made, and determines whether there is any edge at which the absolute value of a shift value of each of respective edges set as the target edge exceeds a predetermined threshold value within the signal quality measurement result of the first adjustment write strategy selected at the fine adjustment I (F0421 and F0422). The predetermined threshold value is assumed to be 6%, for example in a manner similar to the first embodiment.

If the absolute value of the shift value of all the target edges falls within 6% at Step F0422, the host PC 5 determines the first adjustment write strategy as the optimum strategy and sets it as a second adjustment write strategy (F0439).

On the other hand, if there is a target edge at which the absolute value of the shift value exceeds 6%, the host PC 5 performs the process of adjusting the edge shift amount related to the corresponding edge beginning with Step F0423. First, the host PC 5 selects a desired target edge out of the target edges at each of which the absolute value of its shift value exceeds 6% (F0423). Here, the microcontroller 43 may select, for example, one edge out of the target edges at each of which the absolute value of its shift value exceeds 6%, or may select plural edges.

After Step F0423 is ended, the host PC 5 next generates a write strategy in which the edge shift amount of the first adjustment write strategy has been adjusted (F0424). Concretely, the microcontroller 43 adjusts the edge shift amount in such a manner that the absolute value of the shift value becomes minimum, based the present existing shift value of the edge of the recording mark determined at Step F0403, and the maximum amount of change in shift value at the time that the edge shift amount is changed by one step. Incidentally, at the adjustment to the edge shift amount at Step F0424, edges other than the edges of the recording mark decided at Step F0423 inherit the edge shift amount of the first adjustment write strategy and remain unchanged in the edge shift amount. After the determination of the write strategy has been completed at Step F0424, the host PC 5 executes transmission of recording command data to the optical disk apparatus 200 (F0425). The optical disk apparatus 200 receives the recording command data therein through the communication path S16 (F0426).

When the recording command data is received at Step F0426, the optical disk apparatus 200 performs control on the motor's number of revolutions and control on the position of the optical pickup at recording in a manner similar to Steps F0405 through F0407 of FIG. 11 and executes recording of test recording marks such as random data for use as evaluation data in the optical disk 1 in accordance with the write strategy determined at Step F0424 (F0427 through F0429). When the recording is completed at Step F0429, the microcontroller 43 transmits return data including information indicative of whether the recording has succeeded to the host PC 5 (F0430). The host PC 5 receives the return data therein (F0431).

At Step F0431, the host PC 5 having received the return data therein executes transmission of command data for signal quality measurement to the optical disk apparatus 200 (F0432). Upon the transmission of the signal quality measurement command data, command data having designated a measurement velocity and a measurement position is transmitted to the optical disk apparatus. The optical disk apparatus 200 receives the command data for the signal quality measurement therein (F0433).

When the reception of the signal quality measurement command data by the optical disk apparatus 200 is completed, the microcontroller 43 performs control on the motor's number of revolutions and control on the position of the optical pickup at reproduction in a manner similar to Steps F0408 through F0410 of FIG. 11 to thereby execute the signal quality measurement (F0434 through F0436). At the signal quality measurement, the microcontroller 43 stores measurement result information in the memory 44. When the storage of the measurement result information in the memory 44 is completed, the microcontroller 43 reads the measurement result information stored in the memory 44 to generate signal quality data and transmits it to the host PC 5 via the interface circuit 48 and the communication path S16 (F0437). The host PC 5 receives the signal quality data therein (F0438).

The host PC 5 having received the signal quality data at Step F0438 executes exclusion of the target edge (F0438). A concrete method thereof is similar to Step F413 in FIG. 11 of the first embodiment. When the exclusion of the target edge at Step F0438 is ended, the host PC 5 returns to Step F0422 again, where processing similar to the above is carried out. Incidentally, at Step F0424 subsequent to the second time, the edge shift amount is adjusted on the basis of the write strategy adjusted at the previous Step F0424.

When the processing of Steps F0422 through F0441 is executed plural times, and the absolute values of the shift values of the target edges are all determined to fall within 6%, the host PC 5 proceeds to Step F0439 and sets a write strategy finally adjusted by the processing of Steps F0402 through F0441 as a second write strategy.

When the decision of the write strategy is ended at Step F0439, the host PC 5 compares the value Jadj of the entire jitter of edges of all recording marks to be evaluated, and a target jitter value Jtarget (F0440). When the entire jitter Jadj is smaller than the target jitter value Jtarget at Step F0440, the fine adjustment II is normally ended. On the other hand, when the value Jadj of the entire jitter is larger than the target value Jtarget, the fine adjustment II is abnormally ended. As shown in the flow of FIG. 6, the finer adjustment II is determined to have abnormally been ended at Step F05, and the write strategy adjustment is abnormally ended.

According to the above fine adjustment II, in a manner similar to the first embodiment, it is possible to efficiently generate the write strategy for reducing the phase shift in long mark or the like which was hard to adjust during the fine adjustment I.

(6) Lt Adjustment

Figure 25:
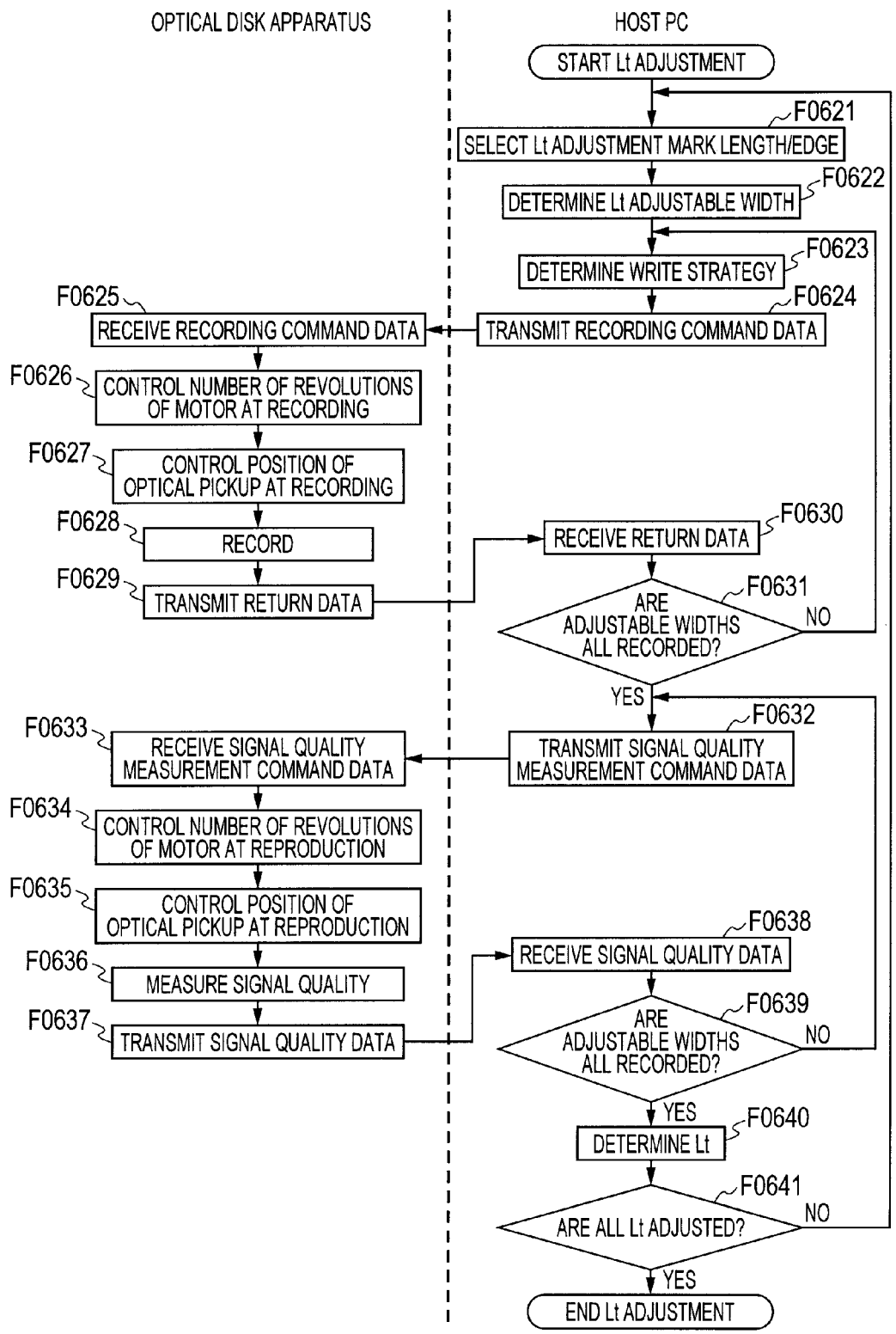
FIG. 25 is a flow diagram showing one example of a flow of an Lt adjustment according to the fifth embodiment.

FIG. 25 is a flow diagram showing one example of a flow of an Lt adjustment according to the fifth embodiment. The Lt adjustment shown in the same drawing corresponds to the Lt adjustment shown in FIG. 12 of the first embodiment.

First, in a manner similar to Steps F0601 to F0602 of FIG. 12 of the first embodiment, the host PC 5 selects a recording mark for executing the Lt adjustment out of recording marks each formed by a write strategy of a laser pulse including a last pulse located at the end of a laser pulse waveform, and determines an adjustable width for a last pulse width Lt about the selected target recording mark (F0621 and F0622). The adjustable width is similar to the first embodiment.

After the adjustable width of the last pulse Lt has been determined at Step F0622, the host PC 5 generates a write strategy at which the last pulse Lt has been adjusted within the range of the adjustable width, in a manner similar to F0603 of FIG. 12 of the first embodiment (F0623).

After the write strategy has been determined at Step F0623, the host PC 5 executes transmission of recording command data to the optical disk apparatus 200 (F0624). The optical disk apparatus 200 receives the recording command data therein through the communication path S16 (F0625).

In a manner similar to Steps F0604 through F0606 of FIG. 12, the optical disk apparatus 200 having the recording command data therein performs control on the motor's number of revolutions and control on the position of the optical pickup at recording and executes the recording of test recording marks such as random data for use as evaluation data in the optical disk 1 in accordance with the write strategy determined at Step F0604 (F0626 through F0628). When the recording has been completed at Step F0628, the microcontroller 43 transmits return data including information indicative of whether the recording has been succeeded, to the host PC 5 (F0629). Then, the host PC 5 receives the return data therein (F0630).

At Step F0630, the host PC 5 having received the return data therein determines whether the recording of the evaluation data has been completed with respect to all the adjustable widths determined at Step F0622 (F0631). When it is determined at Step F0631 that the recording of the evaluation data with respect to all the adjustable widths has not been completed, the host PC 5 returns to Step F0623 and generates a write strategy corresponding to a recording-uncompleted last pulse width Lt and transmits recording command data to the optical disk apparatus 200 in such a manner that the recording of evaluation data of a predetermined size is carried out again. At this time, the recording area on the optical disk in which data is recorded, is an area different from the recording area on which the recording of data is first performed with the adjustable width.

When it is determined at Step F0631 that the recording of the evaluation data has been completed with respect to all the adjustable widths, the host PC 5 executes transmission of command data for signal quality measurement to the optical disk apparatus 200 (F0632). Upon the transmission of the signal quality measurement command data, command data having designated a measurement velocity and a measurement position is transmitted to the optical disk apparatus. The optical disk apparatus 200 receives the command data for the signal quality measurement therein (F0633).

When the reception of the signal quality measurement command data by the optical disk apparatus 200 is completed, the microcontroller 43 performs control on the motor's number of revolutions and control on the position of the optical pickup at reproduction in a manner similar to Steps F0608 through F0610 of FIG. 12 to thereby execute the signal quality measurement (F0634 through F0636). At the signal quality measurement, the microcontroller 43 stores measurement result information in the memory 44. When the storage of the measurement result information in the memory 44 is completed, the microcontroller 43 reads the measurement result information stored in the memory 44 to generate signal quality data and transmits it to the host PC 5 via the interface circuit 48 and the communication path S16 (F0637). The host PC 5 receives the signal quality data therein (F0638).

The host PC 5 having received the signal quality data therein determines whether all signal quality measurements in the range of the adjustable width determined at Step F0622 have been completed (F0639). If it is determined at Step F0639 that all the signal quality measurements in the range of the adjustable width have not been completed, the host PC 5 returns to Step F0632, where it transmits signal quality measurement command data for uncompleted evaluation data.

On the other hand, if it is determined at Step F0639 that all the signal quality measurements in the range of the adjustable width have been completed, the host PC 5 determines a last pulse width Lt (F0640). Its concrete method is similar to Step F0612 of FIG. 12 according to the first embodiment.

When the process of determining Lt at Step F0640 is ended, the host PC 5 determines whether the Lt adjustment has been made to all recording marks each formed by a write strategy of a laser pulse including a last pulse located at the end of a laser pulse waveform (F0641). If it is determined at Step F0641 that the Lt adjustment has not been completed, the host PC 5 proceeds to Step F0621 to adjust a last pulse width Lt about each unadjusted recording mark, where processing similar to the above is carried out. On the other hand, if it is determined at Step F0641 that the Lt adjustment has been completed, the processing of the Lt adjustment is ended.

According to the above Lt adjustment, in a manner similar to the first embodiment, the edge shift amount is adjusted by the fine adjustment I and the fine adjustment II, and further the last pulse width Lt is adjusted in such a manner that the jitter of the specific target edge formed by the laser pulse waveform including the last pulse becomes small. It is therefore possible to generate a write strategy capable of recording higher in quality.

(7) Fine Adjustment II (After Lt Adjustment)

The host PC 5 performs again the fine adjustment II on the third adjustment write strategy at which the last pulse width Lt has been optimized by the Lt adjustment of Step F06 and thereby determines a fourth adjustment write strategy. A concrete processing method thereof is similar to FIG. 24.

(8) Target Beta Adjustment

Figure 26:
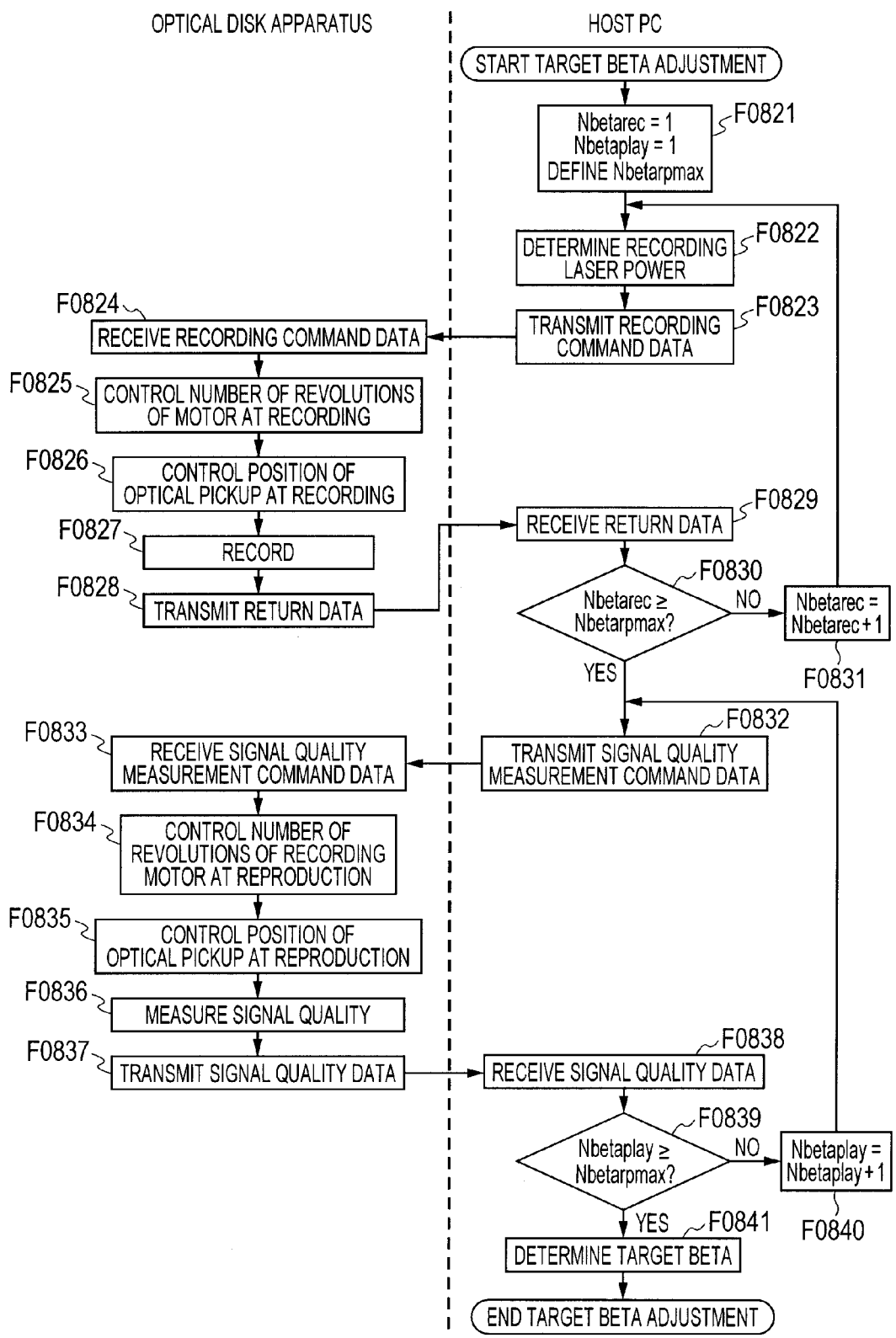
FIG. 26 is a flow diagram depicting one example of a flow of a target beta adjustment according to the fifth embodiment.

FIG. 26 is a flow diagram showing one example of a flow of a target beta adjustment according to the fifth embodiment. The target beta adjustment shown in the same figure corresponds to the target beta adjustment shown in FIG. 14 of the first embodiment.

First, the host PC 5 resets the value of the number-of-times-of-recording counter Nbetarec and the value of the number-of-times-of-reproduction counter Nbetaplay to "1" respectively and defines the maximum number-of-times-of-recording/reproduction Nbetarpmax that defines the number of times that recording and playback are performed (F0821).

In a manner similar to Step F0802 of FIG. 14 of the first embodiment, the host PC 5 next generates a write strategy at which a parameter value of recording power Pw at the fourth adjustment write strategy adjusted at Step F07 is changed to a value corresponding to the selected recording laser power (F0822).

After the write strategy has been determined at Step F0802, the host PC 5 executes transmission of recording command data to the optical disk apparatus 200 (F0823). The optical disk apparatus 200 receives the recording command data therein through the communication path S16 (F0824).

In a manner similar to Steps F0803 through F0805 of FIG. 14, the optical disk apparatus 200 having received the recording command data therein performs control on the motor's number of revolutions and control on the position of the optical pickup at recording, and executes the recording of test recording marks such as random data for use as evaluation data in the optical disk 1 in accordance with the write strategy determined at Step F0822 (F0825 through F0827). When the recording is completed at Step F0827, the microcontroller 43 transmits return data including information indicative of whether the recording has been succeeded, to the host PC 5 (F0828). The host PC 5 receives the return data therein (F0829).

At Step F0829, the host PC 5 having the return data therein executes a comparison between the number-of-times-of-recording counter Nbetarec and the maximum number-of-times-of-recording/reproduction Nbetarpmax (F0830). If the value of the number-of-times-of-recording counter Nbetarec is smaller than the maximum number-of-times-of-recording/reproduction Nbetarpmax at Step F0830, the host PC 5 increments the number-of-times-of-recording counter Nbetarec by "1" (F0831) and returns to Step F0822 to change the recording power Pw, and transmits recording common data in such a manner that the recording of evaluation data of a predetermined size is performed again (F0822 and F0823). At this time, the recording area on the optical disk in which data is recorded, is an area different from the recording area in which data is first recorded with the recording power Pw.

On the other hand, if the value of the number-of-times-of-recording counter Nbetarec is larger than or equal to the maximum number-of-times-of-recording/reproduction Nbetarpmax at Step F0830, the host PC 5 determines that recording based on the predetermined laser power range has been ended, and executes transmission of command data for signal quality measurement to the optical disk apparatus 200 (F0832). At the transmission of the signal quality measurement command data, command data having designated a measurement velocity and a measurement position is transmitted to the optical disk apparatus. The optical disk apparatus 200 receives therein the command data for the signal quality measurement (F0833).

When the reception of the signal quality measurement command data by the optical disk apparatus 200 is completed, the microcontroller 43 performs control on the motor's number of revolutions and control on the position of the optical pickup at reproduction in a manner similar to Steps F0807 through F0809 of FIG. 14 to thereby execute the signal quality measurement (F0834 through F0836). At the signal quality measurement, the microcontroller 43 stores measurement result information in the memory 44. When the storage of the measurement result information in the memory 44 is completed, the microcontroller 43 reads the measurement result information stored in the memory 44 to generate signal quality data and transmits it to the host PC 5 via the interface circuit 48 and the communication path S16 (F0837). The host PC 5 receives the signal quality data therein (F0838).

The host PC 5 having received the signal quality data therein performs a comparison between the number-of-times-of-reproduction counter Nbetaplay and the maximum number-of-times-of-recording/reproduction Nbetarpmax (F0839). If the value of the number-of-times-of-reproduction counter Nbetaplay is determined to be smaller than the maximum number-of-times-of-recording/reproduction Nbetarpmax at Step F0838, the host PC 5 increments the number-of-times-of-reproduction counter Nbetaplay by "1" (F0840) and transmits signal quality measurement command data to execute a signal quality measurement for evaluation data recorded based on a write strategy of another recording power Pw (F0832).

On the other hand, if it is determined at Step F0839 that the value of the number-of-times-of-reproduction counter Nbetaplay is larger than or equal to the maximum number-of-times-of-recording/reproduction Nbetarpmax, signal quality measurement results based on all recording laser power (recording power Pw) determined at Step F0822 are acquired. Therefore, the microcontroller 43 then starts the process of determining a target beta (F0841). The content of processing related to the determination of the target beta at Step F0841 is similar to FIGS. 15, 16 and 17 according to the first embodiment except that the principal body of processing is replaced with the host PC 5, and its detailed description will therefore be omitted. When the target beta is decided at Step F0841, the target beta determination process is ended.

According to the target beta determination process as described above, in a manner similar to the first embodiment, the target beta is determined after the fine adjustment I and the fine adjustment II even if the recording laser power set at the coarse adjustment is shifted from the optimum value by the fine adjustment I and the fine adjustment II. It is thus possible to generate the write strategy corresponding to the optimum recording laser power.

According to the fifth embodiment as described above, part of the processing executed by the microcontroller 43 in the first embodiment is executed by the host PC 5. It is thus possible to lighten a load onto the processing of the microcontroller 43 and reduce the circuit area of the signal processing LSI 4 of the first embodiment to a smaller circuit area of the signal processing LSI 14 of the second embodiment. The adjustment processing of each write strategy referred to above is performed before the shipment of each product, and the adjusted write strategy is stored in its corresponding storage area of ROM 431 or the like in the optical disk apparatus 200. Thus, since it is actually not necessary to perform the adjustment processing of each write strategy at the stage of writing of the data into the mounted optical disk by the optical disk apparatus 200, there can be provided an optical disk apparatus more convenient for a user.

While the invention made above by the present inventors has been described specifically on the basis of the preferred embodiments, the present invention is not limited to the embodiments referred to above. It is needless to say that various changes can be made thereto within the scope not departing from the gist thereof.

For example, the first through fifth embodiments respectively show, as one example, the case in which the AFE 41, the signal quality measuring circuit 42, the microcontroller 43, the memory 44, the position control circuit 45, the laser pulse control circuit 46 and the motor control circuit 47 are all configured within the signal processing LSI 4, but are not limited to it. Some or all of these may be configured as dedicated hardware. Some or all of the processing by the microcontroller 43 may be achieved by dedicated hardware.

The first through fifth embodiments respectively have shown, as one example, the case in which each standard initial strategy is stored in the memory 44 in advance, but are not limited to it. Each of the optical disk apparatuses 100 and 200 can also read a recommended strategy recorded in disk management information of the mounted optical disk 1 and adjust it as a standard initial strategy.

The first through fifth embodiments respectively have used the jitters and the shift values as indices for signal quality at the coarse adjustment, the fine adjustment I, the fine adjustment II and the target beta adjustment, but are not limited to them. An error rate can also be used as a signal quality index.

The first through fifth embodiments respectively have shown, as one example, the case in which the test recording marks comprising random data is written into the optical disk 1 as the evaluation data for measuring the signal quality, but are not limited to it. Data patterns capable of recording all combinations of mark lengths and space lengths can also be used as test recording marks.

The fifth embodiment has shown, as one example, the case in which the processing of FIG. 6 is performed as the method of adjusting each write strategy by the host PC5 and the optical disk apparatus 200, but is not limited to it. It is also possible to perform the processing of FIGS. 18, 19, 20 and so on shown in the second through fourth embodiments, for example.

What is claimed is:

1. A semiconductor device configured to control writing and reading of data into and from an optical disk, the semiconductor device comprising:
    a data processing control unit which executes data processing for the control; and
    a measurement unit which generates evaluation information for evaluating recording quality related to the writing into the optical disk, based on a reproduction signal read from the optical disk,
    wherein the evaluation information comprises error information corresponding to a shift in the phase of the reproduction signal with respect to a channel clock signal for data reproduction, and
    wherein the data processing control unit is configured to:
        adjust a plurality of recording strategies in such a manner that a value of the error information related to a plurality of test recording marks becomes minimum as a whole, and then
        adjust a write strategy in such a manner that a value of the error information related to a desired recording mark is reduced.

2. The semiconductor device according to claim 1,
wherein the desired recording mark is a recording mark for which a value of the error information is greater than or equal to a predetermined threshold value, of the test recording marks recorded by the plurality of recording strategies adjusted by the data processing control unit.

3. The semiconductor device according to claim 2,
wherein the data processing control unit is configured to adjust the write strategy by adjusting a parameter for shifting each edge of the desired recording mark at each of the recording strategies adjusted by the data processing control unit.

4. The semiconductor device according to claim 3,
wherein the error information comprises a phase shift value indicative of an amount of a shift in an edge of the reproduction signal and a shift direction thereof, and
wherein the data processing control unit is configured to change the parameter in such a manner that an edge of the desired recording mark is shifted in a direction opposite to the shift direction according to the amount of the shift in the edge of the reproduction signal and thereby reducing the phase shift value.

5. The semiconductor device according to claim 3,
wherein the data processing control unit is further configured to adjust a parameter defining a pulse width of an unadjusted last pulse of the write strategy in such a manner that a value of the error information related to a recording mark formed by a laser pulse including a last pulse located at an end of a laser pulse waveform is reduced.

6. The semiconductor device according to claim 5,
wherein the data processing control unit is configured to further adjust the write strategy in such a manner that a value of the error information related to the desired recording mark is reduced, after adjusting said parameter defining a pulse width.

7. The semiconductor device according to claim 3,
wherein the error information comprises a jitter of a reproduction signal, and
wherein the data processing control unit is configured to:
    generate a plurality of recording strategies at which parameters for defining laser power, based on initial recording strategies are changed, and
    select a second write strategy at which jitters related to a plurality of test recording marks used in the plurality of recording strategies generated by the data processing control unit become minimum as a whole.

8. The semiconductor device according to claim 7,
wherein the data processing control unit is further configured to:
    generate a plurality of recording strategies at which parameters for shifting edges of the test recording marks are changed, based on the second write strategy, and
    select a third write strategy at which jitters related to a plurality of test recording marks based on the plurality of recording strategies generated by the data processing control unit become minimum as a whole.

9. The semiconductor device according to claim 3,
wherein the evaluation information comprises a beta value of the reproduction signal, and
wherein the data processing control unit is configured to:
calculate a degree of allowance indicative of a range of a beta value capable of taking on a jitter that becomes not greater than a jitter set as a target of recording quality, based on a reproduction signal of data recorded by a write strategy at which a parameter for shifting each edge of the desired recording mark is adjusted and a parameter for defining laser power is changed, and
determine a parameter for defining laser power according to the degree of the allowance.

10. The semiconductor device according to claim 9,
wherein the evaluation information comprises a PI error of the reproduction signal, and
wherein the data processing control unit is further configured to:
calculate a degree of allowance indicative of a range of a beta value capable of taking on an PI error that becomes not greater than an PI error set as a target of recording quality, based on a reproduction signal of data recorded by a write strategy at which a parameter for shifting each edge of the desired recording mark is adjusted and a parameter for defining laser power is changed, and
determine a parameter for defining laser power according to the degree of the allowance.

11. A write strategy generating method comprising the steps of:
receiving evaluation information for evaluating recording quality related to writing into an optical disk to generate a write strategy, wherein the evaluation information includes error information generated according to a reproduction signal read from the optical disk and corresponds to a shift in a phase of the reproduction signal with respect to a channel clock signal for data reproduction;
selecting a first write strategy at which a value of the error information included in the evaluation information and related to each of a plurality of test recording marks recorded in accordance with a plurality of recording strategies, becomes minimum as a whole; and
generating a second write strategy by adjusting a parameter of the first write strategy in such a manner that a value of the error information included in the evaluation information and related to a desired recording mark, is reduced.

12. The write strategy generating method according to claim 11,
wherein the desired recording mark is a recording mark for which a value of the error information is greater than or equal to a predetermined threshold value, of the test recording marks recorded in accordance with the first write strategy.

13. The write strategy generating method according to claim 12,
wherein the step of generating the second write strategy comprises adjusting a parameter for shifting an edge of the desired recording mark.

14. The write strategy generating method according to claim 13,
wherein the error information includes a phase shift value indicative of an amount of a shift in an edge of the reproduction signal and a shift direction thereof, and
wherein the step of generating the second write strategy comprises changing a parameter for reducing the phase shift value by shifting the edge of the desired recording mark in such a manner that the edge of the desired recording mark is shifted in a direction opposite to the shift direction according to the amount of the shift in the edge of the reproduction signal.

15. The write strategy generating method according to claim 13, further comprising the step of:
adjusting a parameter defining a pulse width of an unadjusted last pulse in the second write strategy, in such a manner that a value of the error information related to a recording mark formed by a laser pulse including a last pulse located at an end of a laser pulse waveform is reduced.

16. The write strategy generating method according to claim 15, further comprising the step of:
adjusting the parameter in such a manner that a value of error information related to a recording mark, for which a value of the error information is greater than or equal to a predetermined threshold value, of recording marks recorded by the second write strategy after adjusting said parameter defining a pulse width, is reduced.

17. The write strategy generating method according to claim 13,
wherein the error information includes a jitter of a reproduction signal;
wherein the first write strategy is selected such that jitters related to edges of a plurality of test recording marks, which test recording marks are recorded in accordance with a plurality of recording strategies at each of which a parameter defining laser power at each of a plurality of initial write strategies is changed and generated, become minimum as a whole; and
wherein the second write strategy is generated such that jitters related to a plurality of test recording marks, which test recording marks are recorded in accordance with a plurality of recording strategies generated by changing parameters for shifting edges of the plurality of test recording marks in the first write strategy, become minimum as a whole.

18. The write strategy generating method according to claim 13,
wherein the evaluation information includes a beta value of the reproduction signal, and
wherein the write strategy generating method further comprises the steps of:
calculating a degree of allowance indicative of a range of a beta value capable of taking on a jitter that becomes not greater than a jitter set as a target of recording quality, based on the reproduction signal of data recorded by a write strategy in which a parameter for shifting the edge of the desired recording mark is adjusted and a parameter for defining laser power is changed, and
determining a parameter for defining laser power according to the degree of the allowance.

19. A memory having stored therein a write strategy generating program for generating a new write strategy, based on evaluation information for evaluating recording quality, generated according to a reproduction signal read from an optical disk,
wherein the evaluation information includes error information corresponding to a shift in a phase of the reproduction signal with respect to a channel clock signal for data reproduction, and wherein the write strategy generating program includes:
- a first program code for adjusting first parameters defining a laser pulse waveform for writing in a write strategy, in such a manner that a value of the error information related to a plurality of test recording marks becomes minimum as a whole, and
- a second program code for adjusting a second parameter in such a manner that a value of the error information related to a desired recording mark is reduced, the desired recording mark being a recording mark for which a value of the error information is greater than or equal to a predetermined threshold value of the plurality of test recording marks.

20. The memory according to claim 19,
wherein the second program code shifts an edge of the desired recording mark.

* * * * *